United States Patent
Lawrence-Apfelbaum et al.

(10) Patent No.: US 9,503,691 B2
(45) Date of Patent: Nov. 22, 2016

(54) METHODS AND APPARATUS FOR ENHANCED ADVERTISING AND PROMOTIONAL DELIVERY IN A NETWORK

(75) Inventors: Marc Lawrence-Apfelbaum, New York, NY (US); William Webb, Winchester, VA (US); Howard Pfeffer, Reston, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 1595 days.

(21) Appl. No.: 12/070,559

(22) Filed: Feb. 19, 2008

(65) Prior Publication Data

US 2009/0210899 A1   Aug. 20, 2009

(51) Int. Cl.
*H04N 21/422* (2011.01)
*H04N 21/431* (2011.01)
*H04N 21/44* (2011.01)
(Continued)

(52) U.S. Cl.
CPC ...... *H04N 7/17318* (2013.01); *H04L 12/2801* (2013.01); *H04N 21/25891* (2013.01); *H04N 21/2668* (2013.01); *H04N 21/2747* (2013.01); *H04N 21/4334* (2013.01); *H04N 21/4335* (2013.01); *H04N 21/44222* (2013.01); *H04N 21/4751* (2013.01); *H04N 21/4755* (2013.01); *H04N 21/4756* (2013.01); *H04N 21/4758* (2013.01); *H04N 21/47202* (2013.01);
(Continued)

(58) Field of Classification Search
None
See application file for complete search history.

(56) References Cited

U.S. PATENT DOCUMENTS 3,388,376 A   6/1968   Magee
4,355,415 A   10/1982  George et al.
(Continued)

FOREIGN PATENT DOCUMENTS

CA   2376550   8/2008
CA   2438497   11/2013
(Continued)

OTHER PUBLICATIONS

"3 Point Digital to Showcase Revolutionary Video-On-Demand at Streaming Media West '99", http://www.vsoft.com/press 1999nhtm, Dec. 3, 1999.
(Continued)

*Primary Examiner* — Brian T Pendleton
*Assistant Examiner* — Jean D Saint Cyr
(74) *Attorney, Agent, or Firm* — Gazdzinski & Associates, PC

(57) ABSTRACT

Methods and apparatus for enhanced advertising selection and delivery in a communications network. In one embodiment, the network comprises a cable television network, and the methods and apparatus enable a viewer to individually select and view advertisements during real-time broadcast program settings, as well as during "trick mode" operation in recorded program settings. Guess-work associated with skipping commercials via manual fast-forwarding through recorded content is eliminated, and a viewer is presented with several options regarding which advertisements to view and when to view them. In one variant, decoupling of advertising or promotions from a previously recorded program is provided, thus affording the network operator flexibility to insert various advertising content options, or selectively replace dated or expired advertisements, or those having less correlation to a current program content stream. In another variant, advertising or commercial skipping is substantially frustrated by presenting a viewer with several viewing options.

29 Claims, 18 Drawing Sheets

(51) Int. Cl.

| | | |
|---|---|---|
| *H04N 7/173* | (2011.01) | |
| *H04L 12/28* | (2006.01) | |
| *H04N 21/258* | (2011.01) | |
| *H04N 21/2668* | (2011.01) | |
| *H04N 21/2747* | (2011.01) | |
| *H04N 21/433* | (2011.01) | |
| *H04N 21/4335* | (2011.01) | |
| *H04N 21/442* | (2011.01) | |
| *H04N 21/472* | (2011.01) | |
| *H04N 21/475* | (2011.01) | |
| *H04N 21/658* | (2011.01) | |
| *H04N 21/81* | (2011.01) | |
| *H04N 21/858* | (2011.01) | |

(52) U.S. Cl.
CPC ........ *H04N21/6582* (2013.01); *H04N 21/812* (2013.01); *H04N 21/8586* (2013.01)

(56) References Cited

U.S. PATENT DOCUMENTS

| | | |
|---|---|---|
| 4,384,610 A | 5/1983 | Cook et al. |
| 4,534,056 A | 8/1985 | Feilchenfeld et al. |
| 4,546,382 A | 10/1985 | McKenna et al. |
| 4,577,177 A | 3/1986 | Marubashi |
| 4,602,279 A | 7/1986 | Freeman |
| 4,694,490 A | 9/1987 | Harvey et al. |
| 4,696,578 A | 9/1987 | Manuria et al. |
| 4,708,224 A | 11/1987 | Schrooder |
| 4,749,062 A | 6/1988 | Tsuji et al. |
| 4,902,732 A | 2/1990 | Itoh et al. |
| 4,905,080 A | 2/1990 | Watanabe et al. |
| 4,908,707 A | 3/1990 | Kinghorn |
| 4,930,120 A | 5/1990 | Baxter et al. |
| 4,930,158 A | 5/1990 | Vogel |
| 4,959,720 A | 9/1990 | Duffield et al. |
| 4,975,909 A | 12/1990 | Masson |
| 4,977,455 A | 12/1990 | Young |
| 4,979,593 A | 12/1990 | Watanabe et al. |
| 4,995,479 A | 2/1991 | Fujiwara et al. |
| 5,042,620 A | 8/1991 | Yoneda et al. |
| 5,047,867 A | 9/1991 | Strubbe et al. |
| 5,056,629 A | 10/1991 | Tsuji et al. |
| 5,086,450 A | 2/1992 | Kitagawa et al. |
| 5,155,591 A | 10/1992 | Wachob |
| 5,159,163 A | 10/1992 | Bahjat et al. |
| 5,172,413 A | 12/1992 | Bradley et al. |
| 5,200,583 A | 4/1993 | Kupersmith et al. |
| 5,200,822 A | 4/1993 | Bronfin et al. |
| 5,253,066 A | 10/1993 | Vogel |
| 5,255,341 A | 10/1993 | Nakajima |
| 5,285,272 A | 2/1994 | Bradley et al. |
| 5,287,266 A | 2/1994 | Malec et al. |
| 5,290,710 A | 3/1994 | Haj-Ali-Ahmadi et al. |
| 5,295,064 A | 3/1994 | Malec et al. |
| 5,335,277 A | 8/1994 | Harvey et al. |
| 5,357,276 A | 10/1994 | Banker et al. |
| 5,371,532 A | 12/1994 | Gelman et al. |
| 5,371,551 A | 12/1994 | Logan et al. |
| 5,373,315 A | 12/1994 | Dufresne et al. |
| 5,394,182 A | 2/1995 | Klappert et al. |
| 5,412,720 A | 5/1995 | Hoarty |
| 5,414,455 A | 5/1995 | Hooper et al. |
| 5,442,389 A | 8/1995 | Blahut et al. |
| 5,461,415 A | 10/1995 | Wolf et al. |
| 5,463,209 A | 10/1995 | Figh et al. |
| 5,479,266 A | 12/1995 | Young et al. |
| 5,479,268 A | 12/1995 | Young et al. |
| 5,481,294 A | 1/1996 | Thomas et al. |
| 5,485,897 A | 1/1996 | Matsumoto et al. |
| 5,497,185 A | 3/1996 | Dufresne et al. |
| 5,512,934 A | 4/1996 | Kochanski |
| 5,517,257 A | 5/1996 | Dunn et al. |
| 5,524,195 A | 6/1996 | Clanton, III et al. |
| 5,528,282 A | 6/1996 | Voeten et al. |
| 5,528,284 A | 6/1996 | Iwami et al. |
| 5,534,911 A | 7/1996 | Levitan |
| 5,535,206 A | 7/1996 | Bestler et al. |
| 5,551,532 A | 9/1996 | Kupersmith |
| 5,583,561 A | 12/1996 | Baker et al. |
| 5,583,563 A | 12/1996 | Wanderscheid et al. |
| 5,585,838 A | 12/1996 | Lawler et al. |
| 5,589,892 A | 12/1996 | Knee et al. |
| 5,592,551 A | 1/1997 | Lett et al. |
| 5,600,364 A | 2/1997 | Hendricks et al. |
| 5,606,154 A | 2/1997 | Doigan et al. |
| 5,619,247 A | 4/1997 | Russo |
| 5,619,249 A | 4/1997 | Billock et al. |
| 5,625,405 A | 4/1997 | DuLac et al. |
| 5,652,615 A | 7/1997 | Bryant et al. |
| 5,657,072 A | 8/1997 | Aristides et al. |
| 5,659,350 A | 8/1997 | Hendricks et al. |
| 5,671,225 A | 9/1997 | Hooper et al. |
| 5,675,647 A | 10/1997 | Garneau et al. |
| 5,682,597 A | 10/1997 | Ganek et al. |
| 5,684,714 A | 11/1997 | Yogeshwar et al. |
| 5,684,963 A | 11/1997 | Clement |
| 5,689,094 A | 11/1997 | Friedli et al. |
| 5,701,383 A | 12/1997 | Russo et al. |
| 5,708,961 A | 1/1998 | Hylton et al. |
| 5,710,970 A | 1/1998 | Walters et al. |
| 5,721,878 A | 2/1998 | Ottesen et al. |
| 5,724,646 A | 3/1998 | Ganek et al. |
| 5,729,280 A | 3/1998 | Inoue et al. |
| 5,729,648 A | 3/1998 | Boyce et al. |
| 5,748,254 A | 5/1998 | Harrison et al. |
| 5,749,443 A | 5/1998 | Romao |
| 5,751,282 A | 5/1998 | Girard et al. |
| 5,758,257 A | 5/1998 | Herz et al. |
| 5,761,607 A | 6/1998 | Gudesen |
| 5,771,354 A | 6/1998 | Crawford |
| 5,771,435 A | 6/1998 | Brown |
| 5,774,170 A | 6/1998 | Hite et al. |
| 5,778,181 A | 7/1998 | Hidary et al. |
| 5,778,187 A | 7/1998 | Monteiro et al. |
| 5,781,228 A | 7/1998 | Sposato |
| 5,793,409 A | 8/1998 | Tetsumura |
| 5,793,971 A | 8/1998 | Fujita et al. |
| 5,794,217 A | 8/1998 | Allen |
| 5,805,154 A | 9/1998 | Brown |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,642 A | 9/1998 | Leroy |
| 5,815,148 A | 9/1998 | Tanaka |
| 5,818,438 A | 10/1998 | Howe et al. |
| 5,818,440 A | 10/1998 | Allibhoy et al. |
| 5,818,510 A | 10/1998 | Cobbley et al. |
| 5,819,034 A | 10/1998 | Joseph et al. |
| 5,822,530 A | 10/1998 | Brown |
| 5,826,168 A | 10/1998 | Inoue et al. |
| 5,832,231 A | 11/1998 | Raman et al. |
| 5,835,125 A | 11/1998 | Bhagavath |
| 5,841,468 A | 11/1998 | Wright |
| 5,844,181 A | 12/1998 | Amo et al. |
| 5,844,897 A | 12/1998 | Asamizuya |
| 5,847,703 A | 12/1998 | Teicher et al. |
| 5,850,218 A | 12/1998 | LaJoie et al. |
| 5,861,881 A | 1/1999 | Freeman et al. |
| 5,864,176 A | 1/1999 | Babock et al. |
| 5,887,139 A | 3/1999 | Madison et al. |
| 5,887,243 A | 3/1999 | Harvey et al. |
| 5,896,454 A | 4/1999 | Cookson et al. |
| 5,897,635 A | 4/1999 | Torres et al. |
| 5,909,638 A | 6/1999 | Allen |
| 5,914,945 A | 6/1999 | Abu-Amara et al. |
| 5,917,538 A | 6/1999 | Asamizuya |
| 5,918,222 A | 6/1999 | Fukui et al. |
| 5,918,665 A | 7/1999 | Babcock et al. |
| 5,930,473 A | 7/1999 | Teng et al. |
| 5,930,893 A | 8/1999 | Eaton |

(56) References Cited

U.S. PATENT DOCUMENTS

| | | |
|---|---|---|
| 5,932,853 A | 8/1999 | Friedli et al. |
| 5,940,370 A | 8/1999 | Curtis et al. |
| 5,955,710 A | 9/1999 | DiFranza |
| 5,960,411 A | 9/1999 | Hartman et al. |
| 5,970,206 A | 10/1999 | Yuen et al. |
| 5,974,299 A | 10/1999 | Massetti |
| 5,979,757 A | 11/1999 | Tracy et al. |
| 5,984,051 A | 11/1999 | Morgan et al. |
| 5,991,308 A | 11/1999 | Fuhrmann et al. |
| 5,995,708 A | 11/1999 | Corey |
| 6,002,393 A | 12/1999 | Hite et al. |
| 6,005,603 A | 12/1999 | Flavin |
| 6,005,643 A | 12/1999 | Morimoto et al. |
| 6,009,098 A | 12/1999 | Asamizuya |
| 6,011,839 A | 1/2000 | Friedli et al. |
| 6,016,509 A | 1/2000 | Dedrick |
| 6,029,045 A | 2/2000 | Picco et al. |
| 6,047,327 A | 4/2000 | Tso et al. |
| 6,052,145 A | 4/2000 | Macrae et al. |
| 6,057,832 A | 5/2000 | Lev et al. |
| 6,058,380 A | 5/2000 | Anderson et al. |
| 6,069,023 A | 5/2000 | Bernier et al. |
| 6,073,160 A | 6/2000 | Grantham et al. |
| 6,073,727 A | 6/2000 | DiFranza et al. |
| 6,078,928 A | 6/2000 | Schnase et al. |
| 6,081,830 A | 6/2000 | Schindler |
| 6,082,500 A | 7/2000 | Amo et al. |
| 6,088,722 A | 7/2000 | Herz et al. |
| 6,091,883 A | 7/2000 | Artigalas et al. |
| 6,097,431 A | 8/2000 | Anderson et al. |
| 6,112,192 A | 8/2000 | Capek |
| 6,134,532 A | 10/2000 | Lazarus et al. |
| 6,137,793 A | 10/2000 | Gorman et al. |
| 6,160,989 A | 12/2000 | Hendricks et al. |
| 6,161,142 A | 12/2000 | Wolfe et al. |
| 6,167,188 A | 12/2000 | Young et al. |
| 6,167,432 A | 12/2000 | Jiang |
| 6,169,570 B1 | 1/2001 | Suzuki |
| 6,177,931 B1 | 1/2001 | Alexander et al. |
| 6,181,697 B1 | 1/2001 | Nurenberg et al. |
| 6,182,050 B1 | 1/2001 | Ballard |
| 6,202,008 B1 | 3/2001 | Beckert et al. |
| 6,202,210 B1 | 3/2001 | Ludtke |
| 6,202,799 B1 | 3/2001 | Drop |
| 6,206,142 B1 | 3/2001 | Meacham |
| 6,208,335 B1 | 3/2001 | Gordon et al. |
| 6,216,129 B1 | 4/2001 | Eldering |
| 6,219,710 B1 | 4/2001 | Gray et al. |
| 6,223,160 B1 | 4/2001 | Kostka et al. |
| 6,233,389 B1 | 5/2001 | Barton et al. |
| 6,236,968 B1 | 5/2001 | Kanevsky et al. |
| 6,240,401 B1 | 5/2001 | Oren et al. |
| 6,259,701 B1 | 7/2001 | Shur et al. |
| 6,292,624 B1 | 9/2001 | Saib et al. |
| 6,321,257 B1 | 11/2001 | Kotola et al. |
| 6,324,338 B1 | 11/2001 | Wood et al. |
| 6,327,418 B1 | 12/2001 | Barton |
| 6,341,668 B1 | 1/2002 | Fayette et al. |
| 6,343,313 B1 | 1/2002 | Salesky et al. |
| 6,343,647 B2 | 2/2002 | Kim et al. |
| 6,349,797 B1 | 2/2002 | Newville et al. |
| 6,369,840 B1 | 4/2002 | Barnett et al. |
| 6,378,035 B1 | 4/2002 | Parry et al. |
| 6,378,129 B1 | 4/2002 | Zetts |
| 6,397,976 B1 | 6/2002 | Hale et al. |
| 6,421,305 B1 | 7/2002 | Gioscia et al. |
| 6,434,562 B1 | 8/2002 | Pennywitt et al. |
| 6,446,261 B1 | 9/2002 | Rosser |
| RE37,881 E | 10/2002 | Haines |
| 6,460,036 B1 | 10/2002 | Herz |
| 6,463,585 B1 | 10/2002 | Hendricks et al. |
| 6,466,232 B1 | 10/2002 | Newell et al. |
| 6,467,089 B1 | 10/2002 | Aust et al. |
| 6,504,571 B1 | 1/2003 | Narayanaswami et al. |
| 6,519,062 B1 | 2/2003 | Yoo |
| 6,523,696 B1 | 2/2003 | Saito |
| 6,549,718 B1 | 4/2003 | Grooters et al. |
| 6,560,203 B1 | 5/2003 | Beser et al. |
| 6,560,578 B2 | 5/2003 | Eldering |
| 6,571,279 B1 | 5/2003 | Herz et al. |
| 6,574,617 B1 | 6/2003 | Immerman et al. |
| 6,587,835 B1 | 7/2003 | Treyz et al. |
| 6,591,420 B1 | 7/2003 | McPherson et al. |
| 6,598,228 B2 | 7/2003 | Hejna, Jr. |
| 6,604,138 B1 | 8/2003 | Viirine et al. |
| 6,611,654 B1 | 8/2003 | Shteyn |
| 6,615,039 B1 | 9/2003 | Eldering |
| 6,615,175 B1 | 9/2003 | Gazdzinski |
| 6,615,251 B1 | 9/2003 | Klug et al. |
| 6,622,305 B1 | 9/2003 | Willard |
| 6,640,145 B2 | 10/2003 | Hoffberg et al. |
| 6,647,548 B1 | 11/2003 | Lu et al. |
| 6,651,045 B1 | 11/2003 | Macaulay |
| 6,671,736 B2 | 12/2003 | Virine et al. |
| 6,681,393 B1 | 1/2004 | Bauminger et al. |
| 6,687,735 B1 | 2/2004 | Logston et al. |
| 6,694,145 B2 | 2/2004 | Riikonen et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,741,980 B1 | 5/2004 | Langseth et al. |
| 6,757,796 B1 | 6/2004 | Hofmann |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,434 B1 | 8/2004 | Goodwin |
| 6,775,778 B1 | 8/2004 | Laczko et al. |
| 6,782,550 B1 | 8/2004 | Cao |
| 6,788,676 B2 | 9/2004 | Partanen et al. |
| 6,792,577 B1 | 9/2004 | Kimoto |
| 6,801,792 B1 | 10/2004 | Schuster et al. |
| 6,802,077 B1 | 10/2004 | Schlarb |
| 6,810,528 B1 | 10/2004 | Chatani |
| 6,813,776 B2 | 11/2004 | Chernock et al. |
| 6,817,028 B1 | 11/2004 | Jerding et al. |
| 6,826,267 B2 | 11/2004 | Daum et al. |
| 6,857,132 B1 | 2/2005 | Rakib |
| 6,859,845 B2 | 2/2005 | Mate |
| 6,898,762 B2 | 5/2005 | Ellis et al. |
| 6,909,726 B1 | 6/2005 | Sheeran |
| 6,909,837 B1 | 6/2005 | Unger |
| 6,914,446 B1 | 7/2005 | Tustaniwskyj et al. |
| 6,915,528 B1 | 7/2005 | McKenna |
| 6,925,257 B2 | 8/2005 | Yoo |
| 6,934,880 B2 | 8/2005 | Hofner |
| 6,944,150 B1 | 9/2005 | McConnell et al. |
| 6,959,288 B1 | 10/2005 | Medina |
| 6,978,370 B1 | 12/2005 | Kocher |
| 6,990,312 B1 | 1/2006 | Gioscia et al. |
| 6,990,680 B1 | 1/2006 | Wugofski |
| 7,004,243 B1 | 2/2006 | Babcock et al. |
| 7,006,881 B1 | 2/2006 | Hoffberg et al. |
| 7,009,972 B2 | 3/2006 | Maher et al. |
| 7,016,376 B1 | 3/2006 | Goldenberg |
| 7,017,179 B1 | 3/2006 | Asamoto et al. |
| 7,020,892 B2 | 3/2006 | Levesque et al. |
| 7,024,678 B2 | 4/2006 | Gordon et al. |
| 7,025,209 B2 | 4/2006 | Hawkins |
| 7,027,460 B2 | 4/2006 | Iyer et al. |
| 7,028,009 B2 | 4/2006 | Wang |
| 7,028,329 B1 | 4/2006 | Mizutani |
| 7,039,048 B1 | 5/2006 | Monta et al. |
| 7,039,928 B2 | 5/2006 | Kamada et al. |
| 7,054,843 B2 | 5/2006 | Chara |
| 7,054,902 B2 | 5/2006 | Toporek et al. |
| 7,058,685 B1 | 6/2006 | Van Zee et al. |
| 7,058,810 B2 | 6/2006 | Kumazawa et al. |
| 7,068,639 B1 | 6/2006 | Varma et al. |
| 7,069,577 B2 | 6/2006 | Geile |
| 7,073,193 B2 | 7/2006 | Marsh |
| 7,075,945 B2 | 7/2006 | Arsenault et al. |
| 7,080,397 B2 | 7/2006 | Cochran et al. |
| 7,099,308 B2 | 8/2006 | Merrill et al. |
| 7,100,183 B2 | 8/2006 | Kunkel et al. |

(56) References Cited

U.S. PATENT DOCUMENTS

| | | |
|---|---|---|
| 7,103,906 B1 | 9/2006 | Katz et al. |
| 7,106,382 B2 | 9/2006 | Shiotsu |
| 7,109,848 B2 | 9/2006 | Schybergson |
| 7,124,195 B2 | 10/2006 | Roach |
| 7,136,573 B2 | 11/2006 | Kikuchi et al. |
| 7,136,853 B1 | 11/2006 | Kohda et al. |
| 7,143,431 B1 | 11/2006 | Eager et al. |
| 7,146,627 B1 | 12/2006 | Ismail et al. |
| 7,146,630 B2 | 12/2006 | Dravida |
| 7,149,772 B1 | 12/2006 | Kalavade |
| 7,152,237 B2 | 12/2006 | Flickinger et al. |
| 7,155,508 B2 | 12/2006 | Sankuratripati et al. |
| 7,171,485 B2 | 1/2007 | Roach |
| 7,174,126 B2 | 2/2007 | McElhatten |
| 7,174,127 B2 | 2/2007 | Otten et al. |
| 7,174,385 B2 | 2/2007 | Li |
| 7,184,526 B1 | 2/2007 | Cook |
| 7,194,001 B2 | 3/2007 | Leatherbury |
| 7,194,009 B2 | 3/2007 | Eng |
| 7,197,472 B2 | 3/2007 | Conkwright et al. |
| 7,203,185 B1 | 4/2007 | Dhara et al. |
| 7,203,311 B1 | 4/2007 | Kahn |
| 7,209,458 B2 | 4/2007 | Ahvonen et al. |
| 7,209,892 B1 | 4/2007 | Galuten |
| 7,213,742 B1 | 5/2007 | Birch |
| 7,216,170 B2 | 5/2007 | Ludvig et al. |
| 7,222,078 B2 | 5/2007 | Abelow |
| 7,228,555 B2 | 6/2007 | Schlack |
| 7,231,669 B2 | 6/2007 | Leung |
| 7,233,948 B1 | 6/2007 | Shamoon |
| 7,237,250 B2 | 6/2007 | Kanojia et al. |
| 7,240,196 B2 | 7/2007 | Cooper |
| 7,242,960 B2 | 7/2007 | Van Rooyen |
| 7,246,150 B1 | 7/2007 | Donoho et al. |
| 7,246,172 B2 | 7/2007 | Yoshiba et al. |
| 7,254,608 B2 | 8/2007 | Yeager et al. |
| 7,257,308 B2 | 8/2007 | Plourde |
| 7,263,187 B2 | 8/2007 | Pedlow, Jr. |
| 7,263,188 B2 | 8/2007 | Kohno |
| 7,266,198 B2 | 9/2007 | Medvinsky |
| 7,266,832 B2 | 9/2007 | Miller |
| 7,266,836 B2 | 9/2007 | Anttila et al. |
| 7,269,854 B2 | 9/2007 | Simmons |
| 7,280,737 B2 | 10/2007 | Smith |
| 7,281,261 B2 | 10/2007 | Jaff et al. |
| 7,301,944 B1 | 11/2007 | Redmond |
| 7,305,357 B2 | 12/2007 | Hamilton |
| 7,305,691 B2 | 12/2007 | Cristofalo |
| 7,315,886 B1 | 1/2008 | Meenan et al. |
| 7,317,728 B2 | 1/2008 | Acharya |
| 7,320,134 B1 | 1/2008 | Tomsen |
| 7,325,073 B2 | 1/2008 | Shao et al. |
| 7,327,692 B2 | 2/2008 | Ain et al. |
| 7,330,483 B1 | 2/2008 | Peters et al. |
| 7,337,147 B2 | 2/2008 | Chen |
| 7,337,459 B1 | 2/2008 | Tsutsui |
| 7,340,760 B2 | 3/2008 | Wachtfogel |
| 7,352,775 B2 | 4/2008 | Powell |
| 7,355,980 B2 | 4/2008 | Bauer et al. |
| 7,356,751 B1 | 4/2008 | Levitan |
| 7,360,233 B2 | 4/2008 | Russ et al. |
| 7,363,371 B2 | 4/2008 | Kirkby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,376,386 B2 | 5/2008 | Phillips et al. |
| 7,383,228 B2 | 6/2008 | Lisanke et al. |
| 7,386,621 B1 | 6/2008 | Hlasny |
| 7,438,233 B2 | 10/2008 | Leiper |
| 7,457,520 B2 | 11/2008 | Rossetti |
| 7,486,869 B2 | 2/2009 | Alexander |
| 7,533,376 B2 | 5/2009 | Anwar et al. |
| 7,567,262 B1 | 7/2009 | Clemens et al. |
| 7,567,988 B2 | 7/2009 | Wolf et al. |
| 7,577,118 B2 | 8/2009 | Haumonte |
| 7,592,912 B2 | 9/2009 | Hasek |
| 7,602,820 B2 | 10/2009 | Helms |
| 7,603,529 B1 | 10/2009 | MacHardy |
| 7,647,618 B1 | 1/2010 | Hunter et al. |
| 7,690,020 B2 | 3/2010 | Lebar |
| 7,693,171 B2 | 4/2010 | Gould |
| 7,712,125 B2 | 5/2010 | Herigstad et al. |
| 7,720,432 B1 | 5/2010 | Colby et al. |
| 7,721,314 B2 | 5/2010 | Sincaglia |
| 7,730,509 B2 | 6/2010 | Boulet |
| 7,742,074 B2 | 6/2010 | Minatogawa |
| 7,769,629 B1 | 8/2010 | Kriza et al. |
| 7,805,515 B2 | 9/2010 | Riley |
| 7,809,942 B2 | 10/2010 | Baran et al. |
| 7,843,876 B2 | 11/2010 | Holt et al. |
| 7,849,491 B2 | 12/2010 | Perlman |
| 7,878,908 B2 | 2/2011 | Sloate et al. |
| 7,900,229 B2 | 3/2011 | Dureau |
| 7,908,626 B2 | 3/2011 | Williamson et al. |
| 7,984,473 B1 | 7/2011 | Casile et al. |
| 8,006,262 B2 | 8/2011 | Rodriguez et al. |
| 8,006,273 B2 | 8/2011 | Rodriguez |
| 8,015,583 B2 | 9/2011 | Bates et al. |
| 8,028,322 B2 | 9/2011 | Riedl et al. |
| 8,042,131 B2 | 10/2011 | Flickinger |
| 8,055,585 B2 | 11/2011 | Wu |
| 8,065,703 B2 | 11/2011 | Wilson |
| 8,127,331 B2 | 2/2012 | Heilbron et al. |
| 8,181,206 B2 | 5/2012 | Hasek |
| 8,205,226 B2 | 6/2012 | Ko et al. |
| 8,214,256 B2 | 7/2012 | Riedl et al. |
| 8,280,982 B2 | 10/2012 | Lajoie et al. |
| 8,347,341 B2 | 1/2013 | Markley et al. |
| 8,396,055 B2 | 3/2013 | Patel |
| 8,424,048 B1 | 4/2013 | Lyren et al. |
| 8,438,243 B2 | 5/2013 | LaJoie et al. |
| 8,561,113 B2 | 10/2013 | Cansler et al. |
| 8,583,758 B2 | 11/2013 | Casey et al. |
| 8,584,182 B2 | 11/2013 | Berberet et al. |
| 2000/0001160 | 5/2001 | Shoff et al. |
| 2001/0003194 A1 | 6/2001 | Shimura |
| 2001/0004768 A1 | 6/2001 | Hodge et al. |
| 2001/0013123 A1 | 8/2001 | Freeman et al. |
| 2001/0030975 A1 | 10/2001 | Limb et al. |
| 2002/0004870 A1 | 1/2002 | Kobayashi |
| 2002/0019984 A1 | 2/2002 | Rakib |
| 2002/0026496 A1 | 2/2002 | Boyer et al. |
| 2002/0027883 A1 | 3/2002 | Belaiche |
| 2002/0032754 A1 | 3/2002 | Logston et al. |
| 2002/0046406 A1 | 4/2002 | Chelehmal et al. |
| 2002/0049800 A1 | 4/2002 | Kobayashi et al. |
| 2002/0049902 A1 | 4/2002 | Rhodes |
| 2002/0056118 A1 | 5/2002 | Hunter et al. |
| 2002/0056125 A1 | 5/2002 | Hodge et al. |
| 2002/0059619 A1 | 5/2002 | Lebar |
| 2002/0059621 A1 | 5/2002 | Thomas et al. |
| 2002/0059635 A1 | 5/2002 | Hoang |
| 2002/0066033 A1 | 5/2002 | Dobbins et al. |
| 2002/0069404 A1 | 6/2002 | Copeman et al. |
| 2002/0073327 A1 | 6/2002 | Vellandi |
| 2002/0073419 A1 | 6/2002 | Yen et al. |
| 2002/0078441 A1 | 6/2002 | Drake et al. |
| 2002/0078444 A1 | 6/2002 | Krewin et al. |
| 2002/0083456 A1 | 6/2002 | Bates et al. |
| 2002/0085516 A1 | 7/2002 | Bridgelall |
| 2002/0087975 A1 | 7/2002 | Schlack |
| 2002/0087976 A1 | 7/2002 | Kaplan et al. |
| 2002/0099642 A1 | 7/2002 | Schwankl et al. |
| 2002/0100055 A1* | 7/2002 | Zeidman ............... 725/110 |
| 2002/0100063 A1 | 7/2002 | Herigstad et al. |
| 2002/0104019 A1 | 8/2002 | Chatani et al. |
| 2002/0104083 A1 | 8/2002 | Hendricks et al. |
| 2002/0112240 A1 | 8/2002 | Bacso et al. |
| 2002/0120498 A1 | 8/2002 | Gordon |
| 2002/0123928 A1 | 9/2002 | Eldering et al. |
| 2002/0124182 A1 | 9/2002 | Bacso et al. |
| 2002/0143565 A1 | 10/2002 | Headings et al. |
| 2002/0144262 A1* | 10/2002 | Plotnick et al. ............ 725/32 |
| 2002/0144263 A1 | 10/2002 | Eldering et al. |

(56) References Cited

U.S. PATENT DOCUMENTS

| | | |
|---|---|---|
| 2002/0147771 A1 | 10/2002 | Traversat et al. |
| 2002/0147984 A1 | 10/2002 | Tomsen et al. |
| 2002/0152299 A1 | 10/2002 | Traversat et al. |
| 2002/0152458 A1 | 10/2002 | Eyer et al. |
| 2002/0166119 A1 | 11/2002 | Cristofalo |
| 2002/0166121 A1 | 11/2002 | Rovira |
| 2002/0169961 A1 | 11/2002 | Giles et al. |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2002/0188689 A1 | 12/2002 | Michael |
| 2002/0188744 A1 | 12/2002 | Mani |
| 2002/0188869 A1 | 12/2002 | Patrick |
| 2002/0191950 A1 | 12/2002 | Wang |
| 2002/0194498 A1 | 12/2002 | Blight et al. |
| 2002/0196940 A1 | 12/2002 | Isaacson et al. |
| 2003/0004810 A1 | 1/2003 | Eldering |
| 2003/0005446 A1 | 1/2003 | Jaff et al. |
| 2003/0005447 A1 | 1/2003 | Rodriguez |
| 2003/0005453 A1 | 1/2003 | Rodriguez et al. |
| 2003/0018977 A1 | 1/2003 | McKenna |
| 2003/0020744 A1 | 1/2003 | Ellis et al. |
| 2003/0022990 A1 | 1/2003 | Hirota et al. |
| 2003/0023690 A1 | 1/2003 | Lohtia |
| 2003/0028893 A1 | 2/2003 | Addington |
| 2003/0030751 A1 | 2/2003 | Lupulescu et al. |
| 2003/0033199 A1 | 2/2003 | Coleman |
| 2003/0037330 A1 | 2/2003 | Makofka |
| 2003/0037335 A1 | 2/2003 | Gatto et al. |
| 2003/0037338 A1 | 2/2003 | Suzuki |
| 2003/0049021 A1 | 3/2003 | Kamieniecki |
| 2003/0053476 A1 | 3/2003 | Sorenson et al. |
| 2003/0056217 A1 | 3/2003 | Brooks |
| 2003/0058887 A1 | 3/2003 | Dworkin et al. |
| 2003/0070052 A1 | 4/2003 | Lai |
| 2003/0074661 A1* | 4/2003 | Krapf et al. .............. 725/34 |
| 2003/0093311 A1 | 5/2003 | Knowlson |
| 2003/0093515 A1 | 5/2003 | Kauffman |
| 2003/0093784 A1 | 5/2003 | Dimitrova et al. |
| 2003/0093790 A1 | 5/2003 | Logan et al. |
| 2003/0093792 A1 | 5/2003 | Labeeb |
| 2003/0093806 A1 | 5/2003 | Dureau et al. |
| 2003/0097574 A1 | 5/2003 | Upton |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson |
| 2003/0110503 A1 | 6/2003 | Perkes |
| 2003/0115267 A1 | 6/2003 | Hinton et al. |
| 2003/0115601 A1 | 6/2003 | Palazzo et al. |
| 2003/0135513 A1 | 7/2003 | Quinn et al. |
| 2003/0135628 A1 | 7/2003 | Fletcher et al. |
| 2003/0145323 A1 | 7/2003 | Hendricks et al. |
| 2003/0149884 A1 | 8/2003 | Hernandez et al. |
| 2003/0149975 A1 | 8/2003 | Eldering et al. |
| 2003/0149988 A1 | 8/2003 | Ellis et al. |
| 2003/0149990 A1 | 8/2003 | Anttila et al. |
| 2003/0149993 A1 | 8/2003 | Son et al. |
| 2003/0165241 A1 | 9/2003 | Fransdonk |
| 2003/0166401 A1 | 9/2003 | Combes et al. |
| 2003/0177490 A1* | 9/2003 | Hoshino et al. .............. 725/34 |
| 2003/0208767 A1 | 11/2003 | Williamson et al. |
| 2003/0208768 A1 | 11/2003 | Urdang et al. |
| 2003/0217137 A1 | 11/2003 | Roese et al. |
| 2003/0217365 A1 | 11/2003 | Caputo |
| 2003/0225777 A1* | 12/2003 | Marsh .............. 707/101 |
| 2003/0226150 A1 | 12/2003 | Berberet |
| 2003/0229898 A1 | 12/2003 | Babu et al. |
| 2003/0229900 A1 | 12/2003 | Reisman |
| 2003/0231661 A1 | 12/2003 | DePietro |
| 2003/0236839 A1 | 12/2003 | Demsky et al. |
| 2003/0237090 A1 | 12/2003 | Boston et al. |
| 2004/0015608 A1 | 1/2004 | Ellis et al. |
| 2004/0025181 A1 | 2/2004 | Addington et al. |
| 2004/0025190 A1 | 2/2004 | McCalla et al. |
| 2004/0034873 A1 | 2/2004 | Zenoni |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0047599 A1 | 3/2004 | Grzeczkowski |
| 2004/0060076 A1 | 3/2004 | Song |
| 2004/0073915 A1 | 4/2004 | Dureau |
| 2004/0078809 A1 | 4/2004 | Drazin |
| 2004/0093394 A1* | 5/2004 | Weber et al. .............. 709/219 |
| 2004/0103429 A1* | 5/2004 | Carlucci .............. H04N 7/163 725/32 |
| 2004/0104842 A1 | 6/2004 | Drury et al. |
| 2004/0117817 A1 | 6/2004 | Kwon et al. |
| 2004/0117846 A1 | 6/2004 | Karaoguz et al. |
| 2004/0123125 A1 | 6/2004 | Zuili |
| 2004/0133467 A1 | 7/2004 | Siler |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0153525 A1 | 8/2004 | Borella |
| 2004/0163111 A1 | 8/2004 | Palazzo et al. |
| 2004/0163129 A1 | 8/2004 | Chapman et al. |
| 2004/0172531 A1 | 9/2004 | Little et al. |
| 2004/0177383 A1 | 9/2004 | Martinolich et al. |
| 2004/0181811 A1 | 9/2004 | Rakib |
| 2004/0250273 A1 | 12/2004 | Swix et al. |
| 2004/0255335 A1 | 12/2004 | Fickle et al. |
| 2004/0261099 A1 | 12/2004 | Durden |
| 2004/0264511 A1 | 12/2004 | Futch et al. |
| 2004/0268386 A1 | 12/2004 | Logan et al. |
| 2005/0021940 A1 | 1/2005 | Ma |
| 2005/0022237 A1 | 1/2005 | Nomura |
| 2005/0022242 A1 | 1/2005 | Rosetti |
| 2005/0022247 A1 | 1/2005 | Bitran |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0038904 A1 | 2/2005 | Dougall |
| 2005/0039205 A1 | 2/2005 | Riedl |
| 2005/0049886 A1 | 3/2005 | Grannan et al. |
| 2005/0055220 A1 | 3/2005 | Lee et al. |
| 2005/0060742 A1 | 3/2005 | Riedl |
| 2005/0060745 A1 | 3/2005 | Riedl |
| 2005/0071882 A1 | 3/2005 | Rodriguez et al. |
| 2005/0086683 A1 | 4/2005 | Meyerson |
| 2005/0086691 A1 | 4/2005 | Dudkiewicz et al. |
| 2005/0091681 A1 | 4/2005 | Borden et al. |
| 2005/0102529 A1 | 5/2005 | Buddhikot et al. |
| 2005/0105396 A1 | 5/2005 | Schybergson |
| 2005/0108763 A1 | 5/2005 | Baran et al. |
| 2005/0111467 A1 | 5/2005 | Ng et al. |
| 2005/0114900 A1 | 5/2005 | Ladd |
| 2005/0144635 A1 | 6/2005 | Boortz |
| 2005/0153778 A1 | 7/2005 | Nelson et al. |
| 2005/0166224 A1* | 7/2005 | Ficco .............. 725/35 |
| 2005/0177855 A1 | 8/2005 | Maynard et al. |
| 2005/0179938 A1 | 8/2005 | Kayashima et al. |
| 2005/0204019 A1 | 9/2005 | Flynn et al. |
| 2005/0210502 A1 | 9/2005 | Flickinger et al. |
| 2005/0216942 A1 | 9/2005 | Barton |
| 2005/0223409 A1 | 10/2005 | Rautila et al. |
| 2005/0229209 A1 | 10/2005 | Hildebolt et al. |
| 2005/0229213 A1 | 10/2005 | Ellis et al. |
| 2005/0235318 A1 | 10/2005 | Grauch et al. |
| 2005/0239402 A1 | 10/2005 | Gioscia et al. |
| 2005/0251454 A1 | 11/2005 | Wood |
| 2005/0261970 A1 | 11/2005 | Vucina et al. |
| 2005/0262542 A1 | 11/2005 | DeWeese et al. |
| 2005/0273819 A1 | 12/2005 | Knudson et al. |
| 2005/0273828 A1 | 12/2005 | Barton |
| 2005/0278741 A1 | 12/2005 | Robarts et al. |
| 2005/0278760 A1 | 12/2005 | Dewar et al. |
| 2005/0289588 A1 | 12/2005 | Kinnear |
| 2005/0289618 A1 | 12/2005 | Hardin |

(56) References Cited

U.S. PATENT DOCUMENTS

| | | |
|---|---|---|
| 2006/0010226 A1 | 1/2006 | Hurtta et al. |
| 2006/0013557 A1 | 1/2006 | Poslinski |
| 2006/0015580 A1 | 1/2006 | Gabriel et al. |
| 2006/0015925 A1 | 1/2006 | Logan |
| 2006/0019702 A1 | 1/2006 | Anttila et al. |
| 2006/0020786 A1 | 1/2006 | Helms |
| 2006/0021004 A1 | 1/2006 | Moran et al. |
| 2006/0021019 A1 | 1/2006 | Hinton et al. |
| 2006/0031883 A1 | 2/2006 | Ellis et al. |
| 2006/0031892 A1 | 2/2006 | Cohen |
| 2006/0036750 A1 | 2/2006 | Ladd |
| 2006/0047603 A1 | 3/2006 | Fontijn |
| 2006/0047745 A1 | 3/2006 | Knowles et al. |
| 2006/0047957 A1 | 3/2006 | Helms |
| 2006/0080408 A1 | 4/2006 | Istvan et al. |
| 2006/0088063 A1 | 4/2006 | Hartung et al. |
| 2006/0089911 A1 | 4/2006 | Dandekar |
| 2006/0095940 A1 | 5/2006 | Yearwood |
| 2006/0107302 A1* | 5/2006 | Zdepski ........... H04N 21/23424 725/135 |
| 2006/0116966 A1 | 6/2006 | Pedersen et al. |
| 2006/0117341 A1 | 6/2006 | Park |
| 2006/0117365 A1 | 6/2006 | Ueda et al. |
| 2006/0130099 A1 | 6/2006 | Rooyen |
| 2006/0130107 A1 | 6/2006 | Gonder |
| 2006/0130113 A1 | 6/2006 | Carlucci |
| 2006/0130120 A1 | 6/2006 | Brandyberry et al. |
| 2006/0136964 A1 | 6/2006 | Diez et al. |
| 2006/0149850 A1 | 7/2006 | Bowman |
| 2006/0161635 A1 | 7/2006 | Lamkin et al. |
| 2006/0163340 A1 | 7/2006 | Leiper |
| 2006/0167808 A1 | 7/2006 | Greene |
| 2006/0168616 A1 | 7/2006 | Candelore |
| 2006/0171390 A1 | 8/2006 | La Joie |
| 2006/0171423 A1 | 8/2006 | Helms |
| 2006/0173787 A1 | 8/2006 | Weber |
| 2006/0176884 A1 | 8/2006 | Fair et al. |
| 2006/0187900 A1 | 8/2006 | Akbar |
| 2006/0190336 A1 | 8/2006 | Pisaris-Henderson et al. |
| 2006/0195553 A1 | 8/2006 | Nakamura |
| 2006/0200559 A1 | 9/2006 | Ling et al. |
| 2006/0200761 A1 | 9/2006 | Judd et al. |
| 2006/0200865 A1 | 9/2006 | Leake |
| 2006/0206565 A1 | 9/2006 | Ganesan |
| 2006/0206712 A1 | 9/2006 | Dillaway et al. |
| 2006/0209799 A1 | 9/2006 | Gallagher et al. |
| 2006/0218604 A1 | 9/2006 | Riedl |
| 2006/0222321 A1 | 10/2006 | Russ |
| 2006/0242267 A1 | 10/2006 | Grossman |
| 2006/0248209 A1 | 11/2006 | Chiu et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253545 A1 | 11/2006 | Lakamp |
| 2006/0253584 A1 | 11/2006 | Dixon et al. |
| 2006/0253864 A1 | 11/2006 | Easty |
| 2006/0259924 A1 | 11/2006 | Boortz |
| 2006/0259927 A1 | 11/2006 | Acharya et al. |
| 2006/0277569 A1* | 12/2006 | Smith .......................... 725/35 |
| 2006/0282319 A1 | 12/2006 | Maggio |
| 2006/0291506 A1 | 12/2006 | Cain |
| 2006/0291507 A1 | 12/2006 | Sarosi et al. |
| 2006/0293954 A1 | 12/2006 | Anderson et al. |
| 2006/0294259 A1 | 12/2006 | Matefi et al. |
| 2006/0294371 A1 | 12/2006 | Fanning |
| 2007/0019645 A1 | 1/2007 | Menon |
| 2007/0022032 A1 | 1/2007 | Anderson et al. |
| 2007/0022459 A1 | 1/2007 | Gaebel |
| 2007/0022469 A1 | 1/2007 | Cooper et al. |
| 2007/0033531 A1 | 2/2007 | Marsh |
| 2007/0049245 A1 | 3/2007 | Lipman |
| 2007/0061331 A1 | 3/2007 | Ramer et al. |
| 2007/0061336 A1 | 3/2007 | Ramer et al. |
| 2007/0067851 A1 | 3/2007 | Fernando et al. |
| 2007/0076728 A1 | 4/2007 | Rieger et al. |
| 2007/0077921 A1 | 4/2007 | Hayashi et al. |
| 2007/0078714 A1 | 4/2007 | Ott et al. |
| 2007/0083899 A1 | 4/2007 | Compton et al. |
| 2007/0088801 A1 | 4/2007 | Levkovitz et al. |
| 2007/0088832 A1 | 4/2007 | Tsang et al. |
| 2007/0089127 A1 | 4/2007 | Flickinger et al. |
| 2007/0094691 A1 | 4/2007 | Gazdzinski |
| 2007/0101359 A1 | 5/2007 | Schiller et al. |
| 2007/0107035 A1 | 5/2007 | Howe et al. |
| 2007/0112685 A1 | 5/2007 | Yamamichi |
| 2007/0113243 A1* | 5/2007 | Brey .............................. 725/32 |
| 2007/0115389 A1 | 5/2007 | McCarthy et al. |
| 2007/0121612 A1 | 5/2007 | Nadeau et al. |
| 2007/0121678 A1 | 5/2007 | Brooks |
| 2007/0123253 A1 | 5/2007 | Simongini et al. |
| 2007/0124416 A1 | 5/2007 | Casey et al. |
| 2007/0124488 A1 | 5/2007 | Baum et al. |
| 2007/0124781 A1 | 5/2007 | Casey et al. |
| 2007/0129987 A1 | 6/2007 | Hauser et al. |
| 2007/0136743 A1 | 6/2007 | Hasek |
| 2007/0136777 A1 | 6/2007 | Hasek |
| 2007/0150919 A1 | 6/2007 | Morishita |
| 2007/0157260 A1 | 7/2007 | Walker |
| 2007/0166687 A1 | 7/2007 | Bell et al. |
| 2007/0168429 A1 | 7/2007 | Apfel et al. |
| 2007/0171274 A1 | 7/2007 | Yim |
| 2007/0204300 A1 | 8/2007 | Markley |
| 2007/0204310 A1 | 8/2007 | Hua et al. |
| 2007/0204311 A1 | 8/2007 | Hasek |
| 2007/0204314 A1 | 8/2007 | Hasek |
| 2007/0209054 A1 | 9/2007 | Cassanova |
| 2007/0209059 A1 | 9/2007 | Moore et al. |
| 2007/0217436 A1 | 9/2007 | Markley |
| 2007/0219910 A1 | 9/2007 | Martinez |
| 2007/0220605 A1 | 9/2007 | Chien |
| 2007/0233857 A1 | 10/2007 | Cheng et al. |
| 2007/0244760 A1 | 10/2007 | Bodnar et al. |
| 2007/0247395 A1 | 10/2007 | Barraclough et al. |
| 2007/0250880 A1 | 10/2007 | Hainline |
| 2007/0261116 A1 | 11/2007 | Prafullchandra et al. |
| 2007/0276925 A1 | 11/2007 | La Joie |
| 2007/0276926 A1 | 11/2007 | La Joie |
| 2007/0280110 A1 | 12/2007 | Murphy |
| 2007/0294720 A1 | 12/2007 | Cohen |
| 2008/0009268 A1 | 1/2008 | Ramer et al. |
| 2008/0040758 A1 | 2/2008 | Beetcher |
| 2008/0052157 A1 | 2/2008 | Kadambi et al. |
| 2008/0072249 A1* | 3/2008 | Hovnanian et al. ............ 725/34 |
| 2008/0092181 A1 | 4/2008 | Britt |
| 2008/0098422 A1* | 4/2008 | Rodriguez et al. ............. 725/32 |
| 2008/0115161 A1* | 5/2008 | Kurzion ................ G06Q 30/02 725/32 |
| 2008/0115169 A1 | 5/2008 | Ellis et al. |
| 2008/0147497 A1 | 6/2008 | Tischer |
| 2008/0155589 A1* | 6/2008 | McKinnon et al. ............ 725/34 |
| 2008/0163305 A1 | 7/2008 | Johnson et al. |
| 2008/0192820 A1 | 8/2008 | Brooks |
| 2008/0221986 A1* | 9/2008 | Soicher .................. G06Q 30/02 705/14.36 |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0273591 A1 | 11/2008 | Brooks |
| 2008/0282299 A1 | 11/2008 | Koat et al. |
| 2008/0313671 A1 | 12/2008 | Batrouny et al. |
| 2008/0313691 A1 | 12/2008 | Cholas et al. |
| 2009/0019134 A1 | 1/2009 | Bellifemine et al. |
| 2009/0030802 A1 | 1/2009 | Plotnick et al. |
| 2009/0034521 A1 | 2/2009 | Kato |
| 2009/0098861 A1 | 4/2009 | Kalliola et al. |
| 2009/0100459 A1 | 4/2009 | Riedl |
| 2009/0132346 A1 | 5/2009 | Duggal et al. |
| 2009/0187939 A1 | 7/2009 | LaJoie |
| 2009/0210899 A1 | 8/2009 | Lawrence-Apfelbaum et al. |
| 2009/0235319 A1 | 9/2009 | Mao et al. |
| 2009/0282241 A1 | 11/2009 | Prafullchandra et al. |
| 2009/0319379 A1 | 12/2009 | Joao |
| 2009/0320059 A1 | 12/2009 | Bolyukh |
| 2010/0042478 A1 | 2/2010 | Reisman |

(56) References Cited

U.S. PATENT DOCUMENTS

| | | | |
|---|---|---|---|
| 2010/0083362 | A1 | 4/2010 | Francisco |
| 2010/0107194 | A1 | 4/2010 | McKissick et al. |
| 2010/0146539 | A1 | 6/2010 | Hicks et al. |
| 2010/0175584 | A1 | 7/2010 | Kusaka et al. |
| 2010/0251304 | A1 | 9/2010 | Donoghue |
| 2010/0251305 | A1 | 9/2010 | Kimble |
| 2011/0015989 | A1 | 1/2011 | Tidwell |
| 2011/0016479 | A1 | 1/2011 | Tidwell |
| 2011/0016482 | A1 | 1/2011 | Tidwell |
| 2011/0041146 | A1 | 2/2011 | Lewis |
| 2011/0103374 | A1 | 5/2011 | Lajoie et al. |
| 2013/0227608 | A1 | 8/2013 | Evans et al. |
| 2015/0348129 | A1* | 12/2015 | Inoue ..................... G06Q 30/02 705/14.66 |

FOREIGN PATENT DOCUMENTS

| | | |
|---|---|---|
| EP | 1134951 A2 | 9/2001 |
| JP | 52018653 | 2/1977 |
| JP | 52039237 | 3/1977 |
| JP | 01226681 | 9/1989 |
| JP | 03272977 | 12/1991 |
| JP | 05017083 | 1/1993 |
| JP | 05058564 | 3/1993 |
| JP | 05201624 | 8/1993 |
| JP | 20020335507 | 11/2002 |
| JP | 2005519365 | 6/2005 |
| JP | 2005519501 | 6/2005 |
| JP | 2005339093 | 12/2005 |
| KR | 1020060009376 | 1/2006 |
| WO | WO 96/17306 | 6/1996 |
| WO | WO 99/29107 | 10/1999 |
| WO | WO 99/63759 | 12/1999 |
| WO | WO 00/18120 | 3/2000 |
| WO | WO 00/72592 | 11/2000 |
| WO | WO 01/10125 | 2/2001 |
| WO | WO01060071 | 8/2001 |
| WO | WO01091474 | 11/2001 |
| WO | WO2005015422 | 2/2005 |

OTHER PUBLICATIONS

"Videodick 2.0 is Now Available on Sun Servers", p. 1, http://www.vsoft.com/press1999d.htm, Apr. 19, 1999.
"Vsoft to Implement Its Advanced Videoclick Interactive TV Software on Power TV Based Digital Cable Set-Top Boxes", pp. 1-2, http://www.vsoft.com/press1999m.htm, Dec. 13, 1999.
"Vsoft to Present First Set-Top Box Implementation of Its Digital Video Software Platform, Targeted to Service Providers of Digital Video Services for Home Video", p. 1, http://www.vsoft.com/press1999j.htm, Sep. 8, 1999.
Bodzinga et al., "Enhancing the IPTV Service Architecture to Enable Service Innovation", International Engineering Consortium, May 1, 2006.
Carnoy, David, "Anthony Wood and Mike Ramsey at War," Success, Mar. 1999, pp. 52-57.
DK. Kahaner (Mar. 16, 1991) "Hitachi 1991 Technology Exhibition, Tokyo," Asian Technology Information Program, pp. 1-14.
Furchgott, Roy, "Don't People Want to Control Their TV's?" The New York Times, Aug. 24, 2000, p. G1.
Hamilton, David P., "Driving Force", The Wall Street Journal, Jun. 26, 2000, p. R12.
Karen Jacobs (Dec. 7, 1999) "Elevator Maker to Add Commercial Touch," The Wall Street Journal, pp. 1-2.
Kenji Yoneda, et al. (Dec. 1997) "Multi-Objective Elevator Supervisory-Control System with individual Floor-Situation Control," Hitachi Review, p. 1.
Kevin C. Almeroth, IEEE Journal on Selected Areas in Communications, The Use of Multicast Delivery to Provide a Scalable and Interactive Video-On-Demand Service, pp. 1110-1122, vol. 14: No. 6, 1996.
Lewis Perdue (Jul. 20, 1999) "Forget Elevator Music, Here Comes Elevator Internet," Internet VC Watch. pp. 1-2.
Lewis, Michael, "Boom Box", The New York Times Magazine, Aug. 13, 2000, p. 36.
Margo Lipschitz Sugarman, "A Picture of the Future" pp. 1-2, http://www.vsoft.com/prints/picture.sub.--of.sub.--the.sub.--future.htm, Dec. 20, 1999.
Maxwell, Kim, Residential Broadband: An Insider's Guide to the Battle for the Last Mile, 1999, pp. 43-46, 308-312, John Wiley & Sons, Inc., New York.
Metadata Specifications, CableLabs Asset Distribution Interface Specification, Version 1.1 MD-SP-ADI 1-104-060505, dated May 5, 2006.
Motorola next-Generation CMTS Architecture Protecting Network Investments While Migrating to Next-Generation CMTS Platforms white paper, 10 pages, no date Copyrgt 2004 Motorola, Inc.
Open Cable™ Specification entitled "*Enhanced TV Binary Interchange Format 1.0*" OC-SP-ETV-BIF1.0-106-110128 dated Jan. 28, 2011 408 pages.
Parsons, Patrick R., et al., The Cable and Satellite Television Industries, 1998, pp. 162-163, 170-172, Allyn and Bacon, Boston.
SAML Binding: S. Cantor et al. Bindings for the OASIS Security Assertion Markup Language (SAML) V2.0 OASIS Standard, Mar. 2005. Document ID saml-bindings-2.0-os (http://docs.oasis-open.org/security/saml/v2.0/saml-bindings-2.0-os.pdf).
Security Assertion Markup Language (SAML) Specification (Version 2.0 released in 2005) as SAML Core: S. Cantor et al. Assertions and Protocols for the OASIS Security Assertion Markup Language (SAML) V2.0. OASIS Standard, Mar. 2005. Document ID saml-core-2.0-os (http://docs.oasis-open.org/security/saml/v2.0/saml-core-2.0-os.pdf).
Stevens Institute of Technology, Spring 1999 Final Report, pp. 1-12.
Tandberg Television specification entitled "*AdPoint® Advanced Advertising Platform*" dated Mar. 2008 2 pages.
Tom Butts, "Israeli Defense Technology Fuel's Vsoft's Software", pp. 1-2, http://www.vsoft.com/prints/israeli.sub.--defence.htm, Feb. 1, 1999.
Vsoft Launches Videoclick .Copyrgt. Home at IBC 2000, pp. 1-2, http:/www.vsoft.com/press2000o.htm, Sep. 8, 2000.

\* cited by examiner

METHODS AND APPARATUS FOR ENHANCED ADVERTISING AND PROMOTIONAL DELIVERY IN A NETWORK

RELATED APPLICATIONS

This application is related to co-owned U.S. patent application Ser. No. 11/811,953 filed Jun. 11, 2007 and entitled "METHODS AND APPARATUS FOR PROVIDING VIRTUAL CONTENT OVER A NETWORK", which claims priority to U.S. Provisional Application Ser. No. 60/813,479 filed Jun. 13, 2006 of the same title, and co-owned U.S. Provisional Application Ser. No. 60/995,655 filed Sep. 26, 2007 and entitled "METHODS AND APPARATUS FOR USER-BASED TARGETED CONTENT DELIVERY", each incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data and content-based networks. More specifically, the present invention relates in one exemplary aspect to methods and apparatus for delivering programming content along with alternate targeted advertisements (including promotions and other similar types of content) via a cable television network.

2. Description of Related Technology

In cable television networks, advertisements are usually statically interspersed within a given broadcasted program. In this manner, every CPE in a local service area which is currently tuned to the same program channel will receive the same advertisements at approximately the same time and in the same order.

In content-based networks, advertisements (including without limitation promotions, commercials, and short segments) that are viewed by subscribers can be controlled in several ways. Generally, two categories or subdivisions of these techniques exist: (i) national- or high-level insertion, and (ii) local- or low-level insertion.

Under national level insertion, national networks (such as NBC, ABC, etc.) are responsible for determining the advertisements or promotions that are resident in a given program stream. The pre-configured stream is delivered to the network operator (e.g., MSO), and the MSO merely then delivers the stream (content and advertisements) to the relevant subscribers over their network.

Under local-level insertion, the MSO (and even broadcast affiliates) can insert locally-generated advertisements or commercials and other such segments into remotely distributed regional programs before they are delivered to the network subscribers.

Advertisement time is typically priced based upon an associated program's popularity (and hence its time slot). Such prices are commonly based on Nielsen Television Ratings, which are ratings determined by measuring of the number of unique viewers or households tuned to a television program at any one particular time.

The Nielsen system has also recently been expanded from only program content to advertising (i.e., Nielsen ratings may be provided for advertisements themselves).

Nielsen Television Ratings are gathered in one of two ways. One method involves asking viewers of various demographics to keep a written record of the television shows they watch throughout the day and evening. Another method involves using "Set Meters," which are small devices connected to televisions in selected homes. These devices electronically gather the viewing habits of the home and transmit the information nightly to Nielsen over a connected phone line.

There are several disadvantages with employing a Nielsen-like approach to pricing statically interspersed cable advertisements. The first is that the sample of viewers selected may not be fairly representative of the population of cable viewers as a whole. For example, in a cable network comprising four million cable viewers, a sample of any 100,000 viewers may exhibit different average viewing habits than the averages associated with the other 3,900,000 cable viewers who are not in the sample.

A second disadvantage is that static delivery makes it difficult to perfectly target an audience known to be in the market. For example, suppose that the ideal target for a sports car advertisement is the set of all consumers who like and would be interested in buying sports cars. If all that is known from Nielsen data is that 10% of the sample group has watched the auto-racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

The aforementioned prior art "Nielsen" approach is also program-specific, and this is a problem from several aspects. First, the efficacy of the advertising is tied to the accuracy of the demographic model for that particular program; i.e., that most 18-30 year old females in fact do actually watch American Idol. As a limiting case, if the demographic model used had 0% correlation with actual behavior, then advertising used based on that demographic model would have a correspondingly low (or no) effect on the target demographic (e.g., 18-30 year old females), since none of them would be watching American Idol when the advertising was broadcast. Stated simply, the prior art program-coupled approach is only as good as the underlying demographic correlation model.

Also, the aforementioned demographic model is often limited to one particular program. Hence, the 18-30 year old females discussed above may tune in dutifully to American Idol each broadcast (e.g., Monday at 8:00 pm), but may not have any interest in watching the program immediately preceding or following American Idol, and hence may tune away (or delay tuning to that channel until the start of American Idol). The demographic model for that particular program accordingly may have little or no correlation to periods (programs) before or after it, and thus a new demographic model (which may cater to a heterogeneous demographic from the first, e.g., 40-65 year-old males) would be needed. This has the effect of, inter alia, artificially segmenting or imposing boundaries on the continuity of advertising or promotions; i.e., a given "theme" or demographic cannot be reliably targeted significantly beyond the program boundaries unless the same demographic or theme continues in the programming itself. The network operator, network, or other entity must effectively tailor advertisements/promotions on a per-program basis in some cases if their advertising/promotion is to have maximum efficacy.

A number of other different approaches have been described in the prior art which attempt to facilitate effective targeted advertising or promotional content delivery. For example, United States Patent Application Publication No. 20070113243 to Brey published May 17, 2007 entitled "TARGETED ADVERTISING SYSTEM AND METHOD", incorporated herein by reference in its entirety, discloses a targeted advertising system comprising an interface unit configured to receive broadcast transmissions, a primary broadcast stream for broadcast programming, a secondary broadcast stream for targeted advertising content, and a storage device for storing the targeted advertising content. The method comprises presenting a targeted advertising content to a user including receiving a primary broadcast stream, receiving a secondary broadcast stream, storing a portion of the secondary broadcast stream in a storage device, and presenting a targeted advertising stream to the user, which may be selected based on a user parameter.

United States Patent Application Publication No. 20070089127 to Flickinger et al. published Apr. 19, 2007 entitled "ADVERTISEMENT FILTERING AND STORAGE FOR TARGETED ADVERTISEMENT SYSTEMS", incorporated herein by reference in its entirety, discloses an advertisement storage and filtering system for selectively identifying targeted advertisements to be stored in the memory of the STB. This storing of the selected advertisements can be accomplished in a number of ways. In one embodiment, the advertisements, in real-time and as they are received at the STB, are processed by the STB and only those advertisements with the appropriate characteristics are stored on the hard drive. This may require some buffering of the advertisements in the STB memory as the STB processes and determines whether or not to store the advertisement. The information required to determine whether or not to store the advertisement could also be sent in advance, e.g., as a data service in an advertisement channel. Alternatively, the STB may store incoming advertisements in a memory temporarily and subsequently determine whether or not to retain the stored advertisements.

United States Patent Application Publication No. 20060277569 to Smith published Dec. 7, 2006 entitled "DVR-BASED TARGETED ADVERTISING", incorporated herein by reference in its entirety, discloses a system for DVR-based targeted advertising. In an embodiment, a targeted advertisement system includes a DVR, an advertisement data store, and an advertisement manager. The DVR records media content, maintains the recorded media content for on-demand viewing, and provides the recorded media content for viewing when requested. The advertisement manager designates advertisement region(s) in the recorded media content as the media content is being recorded, where an advertisement region includes a first boundary and a second boundary to designate the advertisement region in the media content. The advertisement manager monitors a first data stream of the recorded media content when it is rendered for viewing to detect that a playback position of the first data stream has crossed an advertisement region boundary, and to initiate that an advertisement obtained from the advertisement data store be provided as a second data stream to render the advertisement for viewing.

United States Patent Application Publication No. 20060253864 to Easty published Nov. 9, 2006 entitled "SYSTEM AND METHOD FOR HOUSEHOLD TARGETED ADVERTISING", incorporated herein by reference in its entirety, discloses a targeted television advertisement system comprising a customer premises equipment at a household and coupled to a television set, the customer premise equipment, which comprises a server operable to access a media storage device and demand-pull advertising elementary streams customized for a viewer of the household, and a splicer operable to receive a program elementary streams and splice the demand-pulled advertising elementary streams into the program elementary streams.

United States Patent Application Publication No. 20060253328 to Kohli et al. published Nov. 9, 2006 entitled "TARGETED ADVERTISING USING VERIFIABLE INFORMATION", incorporated herein by reference in its entirety, discloses a system and a method to match advertisement requests with campaigns using targeting attributes, and campaigns are selected for fulfillment of the advertisement request according to a priority algorithm. The targeting uses end user information that is verifiable, and which the user has granted permission to use, improving the granularity and accuracy of the targeting data. The algorithm includes load balancing and campaign state evaluation on a per campaign, per user basis. The algorithm enables control over the frequency and number of exposures for a campaign, optimizing the advertising both from the perspective of the user and the advertiser.

United States Patent Application Publication No. 200602483555 to Eldering published Nov. 2, 2006 entitled "TARGETED ADVERTISING THROUGH ELECTRONIC PROGRAM GUIDE", incorporated herein by reference in its entirety, discloses a mechanism for matching Electronic Program Guide (EPG) advertisements to subscribers or groups of subscribers and delivering those advertisements within the EPG. The subscribers are initially characterized in different groups by using commercially available data, such as demographic data. Furthermore, the groups of subscribers may be formed according to their characteristics. These characteristics may be derived from, but are not limited to, demographic data, geographic information or individual subscriber selection data. Subsequent to the formation of the groups, suitable advertisements to be placed in the EPG avails are selected, based on the matching of the advertisement characteristics to the characteristics of the groups, wherein the EPG avails are the advertising opportunities available within the EPG. Different versions of the EPG having targeted advertisements may be created, and the different versions may be placed on a download server for transmission over an access system to the subscriber. At the subscriber end, the different versions of the EPG may be received and the subscriber end, being assigned to a particular group, may receive the EPG which corresponds to that group. The subscriber end generally comprises a suitable subscriber interface, such as, a set-top box (STB) or a cable-ready television having a unique identification.

U.S. Pat. No. 7,228,555 to Schlack issued Jun. 5, 2007 entitled "SYSTEM AND METHOD FOR DELIVERING TARGETED ADVERTISEMENTS USING MULTIPLE PRESENTATION STREAMS", incorporated herein by reference in its entirety, discloses a system and method for delivering channels of presentation streams carrying targeted advertisements in a television service network environment. The system includes a generator for generating a set of presentation streams for each of programming channels, each of the presentation streams in each set having same programming data but different advertisements directed to advertiser-specific market segments of different advertisers. A plurality of local routing stations receives the generated sets of presentation streams. At least one local routing station processes the sets of presentation streams and selectively switches between the presentation streams in each set to output one presentation stream for a programming channel. As a result, a presentation stream carrying the most appropriate advertisement is provided to a viewer at any given time for at least one programming channel.

U.S. Pat. No. 6,738,978 to Hendricks, et al. issued May 18, 2004, entitled "METHOD AND APPARATUS FOR TARGETED ADVERTISEMENT", incorporated herein by reference in its entirety, discloses a network controller for use with a digital cable headend capable of monitoring and controlling set top terminals in a television program delivery system. The invention relates to methods and apparatus for a network controller that manages a configuration of set top terminals in a program delivery system. The invention is particularly useful in program delivery systems with hundreds of channels of programming, a menu driven program selection system, and a program control information signal that carries data and identifies available program choices. Specifically, the invention modifies a program control information signal at the cable headend before the modified signal is transmitted to each set top terminal. This signal is used with polling methods to receive upstream data from the set top terminals. The invention initiates such upstream data retrieval, gathers all data received and compiles viewer demographics information and programs watched information. The invention processes this data and information to generate packages of advertisements, as well as account and billing reports, targeted towards each set top terminal. The invention uses upstream data reception hardware, databases and processing hardware and software to accomplish these functions.

U.S. Pat. No. 6,718,551 to Swix, et al. issued Apr. 6, 2004 entitled "METHOD AND SYSTEM FOR PROVIDING TARGETED ADVERTISEMENTS", incorporated herein by reference in its entirety, discloses a method and system for providing targeted advertisements over a networked media delivery system, especially interactive television networks, the system comprising tracking and storing viewer selections, analyzing the selections, and delivering targeted advertisements that appeal to the particular subscriber making the selections. The system includes a merge processor, a file server, a profile processor, and a broadcast server contained in a head end in communication with a plurality of set-top boxes through a distribution network. Based on a subscriber's viewing habits and account information, the invention delivers different, customized advertisements to different viewers watching the same program or channel. The advertisements are delivered as either still frame bit maps or as video streams advertisement insertion in a playlist or a broadcast media program.

U.S. Pat. No. 6,463,585 to Hendricks, et al. issued Oct. 8, 2002 entitled "TARGETED ADVERTISEMENT USING TELEVISION DELIVERY SYSTEMS", incorporated herein by reference in its entirety, discloses a multiple channel architecture designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The operations center or the cable headend generate a group assignment plan that assigns the television terminals to groups, based on factors such as area of dominant influence and household income. A switching plan is then generated that instructs the television terminals to remain with the program channel or to switch to one of the alternate feeder channels during the program breaks. The television terminals record which channels were viewed during the program breaks, and report this information to the cable headends and the operations center. The reported information is used to generate billing for commercial advertisers, and to analyze viewer watching habits. The invention uses upstream data reception hardware, databases and processing hardware and software to accomplish these functions.

U.S. Pat. No. 6,002,393 also issued to Hite, et al. Dec. 14, 1999, entitled "SYSTEM AND METHOD FOR DELIVERING TARGETED ADVERTISEMENTS TO CONSUMERS USING DIRECT COMMANDS", incorporated herein by reference in its entirety, discloses a system and method for targeting TV advertisements to individual consumers by delivering a plurality of advertisements to a display site. A command signal is sent to the display site commanding the display of a selected advertisement suited for the individual consumer. In another embodiment, a predetermined advertisement is delivered upon command from a control center to a viewing site intended for the particular consumer.

U.S. Pat. No. 5,774,170 to Hite, et al. issued Jun. 30, 1998 entitled "SYSTEM AND METHOD FOR DELIVERING TARGETED ADVERTISEMENTS TO CONSUMERS", incorporated herein by reference in its entirety, discloses advertising by targeting, delivering and displaying electronic advertising messages (commercials) within specified programming in one or more pre-determined households (or on specific display devices) while simultaneously preventing a commercial from being displayed in other households or on other displays for which it is not intended. Commercials are delivered to specified homes or displays via either over-the-air or wired delivery systems.

Digital Video Recording and Playback

Numerous types of modern electronic devices are adapted to receive and record broadcast or on-demand content delivered over cable or satellite networks. Such devices include, e.g., personal video recorders (PVR's), digital video recorders (DVR's), TiVo's™, etc. In addition to the ability of these devices to store content, such devices are also adapted to enable a user to perform so-called "trick mode" functions including without limitation pausing and rewinding "live" or real-time TV, and fast-forwarding, pausing, and rewinding programs previously recorded to the devices' hard drive or flash memory.

With the advent of such video recording and "trick mode" technology, a viewer may fast-forward through any portion of a previously recorded program (e.g., movie, sporting event, etc.). Thus, viewers are able to avoid viewing commercial advertising altogether. However, when doing so, a viewer must in effect make an educated guess (using any available visual cues) at when a commercial has ended and the program has started again. This leads to the viewer spending time fast-forwarding, rewinding and fast-forwarding again to find the exact moment when the recorded content begins.

Further, although permitting viewers to skip commercials permits the viewer no significant interruption of the program they are viewing (thereby ostensibly enhancing subscriber satisfaction), it also deprives the network operator of a valuable source of advertisement-based revenue, since the number of "impressions" of network subscribers for a given advertisement or promotion is significantly reduced. Stated differently, the easier it is for a subscriber to bypass an advertisement, generally the less demographic penetration or effect that advertisement will have.

Consequently, a number of approaches have been developed in the prior art which attempt to discourage viewers from being able to completely skip advertisements. For example, U.S. Pat. No. 6,909,837 to Unger, issued Jun. 21, 2005 and entitled "METHOD AND SYSTEM FOR PROVIDING ALTERNATIVE, LESS-INTRUSIVE ADVERTISING THAT APPEARS DURING FAST FORWARD PLAYBACK OF A RECORDED VIDEO PROGRAM", incorporated herein by reference in its entirety, discloses a digital video recorder which can be used to allow users to fast forward through segments of a recorded video signal, such as commercial breaks, while still allowing the advertiser a limited opportunity to present an advertising message. Frames from the commercial recorded with the video signal are electronically tagged. When the processor of the digital video recorder finds a tagged frame or frames during a fast forward operation, the processor may display the tagged frame as a static image during the fast forward operation or may play the series of tagged frames at normal speed as a condensed video clip during the fast forward operation. Thus, through a static image or a condensed video clip, an advertiser can present an advertising message, while the user may still skip the full-length commercials as quickly as before.

U.S. Pat. No. 7,280,737 to Smith, issued Oct. 9, 2007 and entitled "METHOD AND APPARATUS FOR DISCOURAGING COMMERCIAL SKIPPING", incorporated herein by reference in its entirety, discloses an apparatus which is adapted to discourage the use of commercial skipping recorder devices by inserting extraneous signals into a sequential program segment. A commercial skipping device recognizes program segments comprised of sequential program segments, commercial segments, and segment dividers delimiting the program and commercial segments. The incorporation of extraneous signals inserted into the segments will cause the device to identify the program and commercial segments incorrectly, so that, at least in some instances, they do not correspond to the actual program and commercial segments. Now, when the viewer elects to operate the recorder to play the program without the commercials, the recorder will play a sequence of modified segments that are incomplete in that some portions of the program segments are cutoff and/or include at least part of the unwanted commercial segments. As a result, the viewer may become frustrated with the operation of the recorder and will no longer operate the recorder in an automatic commercial skipping mode.

United States Patent Application No. 20020144262 to Plotnick, et al., published Oct. 3, 2002 and entitled "ALTERNATIVE ADVERTISING IN PRERECORDED MEDIA", incorporated herein by reference in its entirety, discloses a method of presenting viewers with an alternative brief version of a recorded advertisement when they choose to fast-forward through or skip (or any other trick play event) the recorded advertisement. The alternative advertisement may be displayed instead of or in conjunction with the recorded advertisement (i.e., fast-forwarding advertisement is displayed in one portion of the screen (i.e., background or portion of a split screen) and the alternative brief version is displayed in another portion). The alternative brief version of the advertisement (trick play advertisement) may be a marketing message that is a static screen presenting a logo or a portion of the recorded advertisement, or may be a condensed version of the actual advertisement. The trick play advertisements may be targeted. An alternate or entirely unrelated advertisement can also be displayed as the trick play advertisement.

United States Patent Application No. 20020191950 to Wang, Xiaoling, published Dec. 19, 2002 and entitled "APPARATUS AND A METHOD FOR PREVENTING COMMERCIAL SKIPPING", incorporated herein by reference in its entirety, discloses a system, apparatus, and method which enable or disable all manual and automated skipping functions of a video recording and playback device based on a content classification signal which is associated with a video signal. The content classification signal may be comprised of a plurality of portions each of which indicate whether commercial or non-commercial content is in a particular portion of a video signal. The manual and automated skipping functions may include all functions that allow fast forward with and without video content display, fast forward with different speeds, fast forward with varying speed, one-button skipping functions with at least one preset skipping time or length interval, and smart skipping functions that skip only to a certain end point set automatically or manually. The system and the method according to the invention offers also possibilities to selectively disable or enable the skipping functions based on a set of management parameters such as television channel identification, television program identification, television program class identification, date and time identification, as well as subscription related information.

In United States Patent Application No. 20030037330 to Makofka, published Feb. 20, 2003 and entitled "METHODS AND APPARATUS FOR THE DISPLAY OF ADVERTISING MATERIAL DURING PERSONAL VERSATILE RECORDER TRICK PLAY MODES", incorporated herein by reference in its entirety, a display engine is provided which is associated with the one or more memory devices for providing display output. A motion control engine is used to direct the display engine to merge the advertising material with the program material during PVR trick play modes such that the advertising material is displayed, e.g., on a display device. The merging of the advertising material and the program material may be accomplished by alpha blending the advertising material with the program material. By alpha blending the advertising material with the program material, the advertising material can be displayed over the programming material such that the programming material is either not visible or partially visible underneath the advertising material. The merging may be performed such that the advertising material is displayed in a picture-in-picture format. In the alternative, the merging of the advertising material and the program material may result in the advertising material being displayed as one of a banner or a border. The program material may be at least partially visible during said trick play modes.

United States Patent Application No. 20050273828 to Barton, published Dec. 8, 2005 and entitled "METHOD FOR ENHANCING DIGITAL VIDEO RECORDER TELEVISION ADVERTISING VIEWERSHIP", incorporated herein by reference in its entirety, provides a method wherein the first or last number of seconds of a commercial break are carefully authored to provide a "teaser" to entice the viewer to watch multiple commercials during the commercial break instead of skipping the commercial break using the fast forward or jump functions of the DVR. A bookending function displays an advertisement before and/ or after a program that has been recorded on the DVR's storage device is played to the viewer. The viewer selects a recorded program from the DVR's storage device to playback. Before the program is played back, an advertisement is retrieved from the storage device and is displayed before the program is run. Another advertisement is retrieved and then played after the program is over.

United States Patent Application No. 20060222321 to Russ, published Oct. 5, 2006 and entitled "TRICK PLAY RESISTANT AD INSERTION", incorporated herein by reference in its entirety, discloses trick play resistant advertisements. According to the invention, specified commercials could be recognized by the software in set-top boxes to prohibit the use of trick play for the duration of the commercial. The commercials would also be precluded from trick play when played in a multi-room system or when recorded to a DVD.

United States Patent Application No. 20060031892 to Cohen, published Feb. 9, 2006 and entitled "Prevention of advertisement skipping", incorporated herein by reference in its entirety, discloses a method for delivering digital media including transmitting a stream of the digital media to be played by a client at a predefined play speed, the stream comprising main content and, in predetermined intervals, differentiated content. In response to a request from the client to pass over a portion of the stream at a speed different from the play speed, the client is permitted to pass over the main content in the portion of the stream at the different speed, but is constrained to play the differentiated content in at least one of the intervals in the portion at the play speed.

United States Patent Application No. 20070150919 to Morishita, published Jun. 28, 2007 and entitled "CONTENT RECEIVING, RECORDING AND REPRODUCING DEVICE AND CONTENT DISTRIBUTION SYSTEM", incorporated herein by reference in its entirety, provides a recording and reproducing device having a CM skip function, which prevents reductions of advertising effects and user-friendliness. In the case where the contents recorded on the recording and reproducing device include a commercial portion, a viewing history flag is assigned to the commercial portion. If the commercial has been reproduced, the viewing history flag relevant to the commercial is set at 1 to control viewing history of each individual commercial portion. In the case where there is a request for reproduction of the contents, it is determined whether or not the commercial yet to be viewed is more than a predetermined amount to secure convenience for the user by imposing no operational limit until reaching the predetermined amount. If the predetermined amount is reached, an operational limit is imposed so as to urge viewing of the commercial.

Despite the foregoing approaches which attempt to frustrate commercial skipping via "trick modes" or other techniques, there is a need for a user-friendly mechanism for viewing content and advertisements which both eliminates the guess-work and imprecision associated with skipping commercials via manual fast-forwarding through recorded content, and presents a viewer with options regarding the type and content of advertisements to view.

Such methods and apparatus would also allow for decoupling of advertising or promotions from a particular previously recorded program, thus affording the network operator flexibility to insert advertising content options, which a viewer may choose between, in a dynamic fashion based on inter alia changing network conditions, and/or cost/benefit decisions. This approach would also permit use of a new more flexible business method (pricing model) for network operators and content sources.

The ability to replace dated or expired advertisements stored remotely would also be highly desirable.

Subscriber anonymity or privacy (i.e., no use of personally identifiable information) would also ideally be maintained where desired.

SUMMARY OF THE INVENTION

The present invention addresses the foregoing needs by providing methods and apparatus for enabling selective delivery of advertisements and promotions by a network operator or other content provider.

In a first aspect of the invention, a method of a method of providing advertising content to a selected one or more of the users of a network is disclosed. In one embodiment, the network comprises a content-based network such as a cable television network, and the method comprises: initiating a triggering event; indicating available advertisements; selecting one or more of the available advertisements; and providing the one or more selected advertisements to at least one of the users.

In one variant, the triggering event comprises a discontinuity in a real-time broadcast.

In another variant, the triggering event comprises at least one marker disposed within a real-time broadcast.

In yet another variant, the triggering event comprises beginning a period of prescribed duration within a real-time broadcast program.

In still a further variant, the triggering event comprises beginning or recommencing the playback of a recorded program.

In yet an additional variant, the triggering event comprises fast-forwarding a recorded program at a certain point in the program.

In a further variant, the act of selecting one or more of the available advertisements is accomplished at least in part by a computer program. One or more available advertisements are selected based at least in part on a determination of the length of at least one of the available advertisements.

Alternatively, the act of selecting comprises: accessing metadata associated with at least one of the available advertisements; and evaluating the metadata with respect to program descriptive information. For example, the program descriptive information comprises metadata associated with a program substantially with which the at least one available advertisement will be provided.

In another variant, the act of selecting comprises: assessing metadata associated with at least one of the available advertisements; and evaluating the metadata with respect to user descriptive information. The user descriptive information comprises e.g., information enabling determination of whether a user belongs to a particular demographic or psychographic.

In still another variant, the method further comprises: enabling a user to enter one or more advertisement selection criteria; comparing metadata associated with at least one of the available advertisements to the criteria; and selecting at least a subset of the available advertisements based at least in part on the act of comparing.

In a further variant, the act of providing one or more selected advertisements comprises displaying the one or more selected advertisements temporally proximate with non-advertising program content, for example at one or more prescribed insertion points within the content.

In another variant, the method further comprises: obtaining a user response to the one or more selected advertisements; accessing metadata associated with at least one of the available advertisements; evaluating the correlation of the metadata with the user response; and providing a listing of available and correlated advertisements.

In yet a further variant, the act providing the one or more selected advertisements comprises sending information relating to the one or more selected advertisements to an electronic mail account. Alternatively, the act of providing one or more selected advertisements comprises saving the one or more selected advertisements to a storage device of a recording apparatus. The storage device comprises e.g., at least one of a hard disk drive (HDD) or NAND flash memory, and the recording apparatus comprises a digital video recorder (DVR).

In still another variant, the method further comprises providing an option for selecting none of the available advertisements for delivery during a recorded program playback.

In a second aspect of the invention, a computer-readable apparatus is disclosed. In one embodiment, the apparatus comprises a storage medium adapted to store a computer program thereon, the computer program comprising a plurality of instructions which, when executed: generate a list of advertisements available for display; display the list of advertisements to a user; enable selection of one or more of the advertisements; and cause delivery of the selected one or more advertisements to at least the user.

In one variant, the computer-readable apparatus is disposed on a client premises device within a cable network, and the act of generating a list of advertisements comprises obtaining metadata from a network server.

In another variant, the program is adapted to enable a user to exit or terminate the one or more advertisement during display thereof.

In yet another variant, the program is adapted to enable a user to view the one or more advertisement and simultaneously record a real-time broadcast program.

In still a further variant, the computer program is adapted to obtain a user input relating to the one or more advertisement. For example, the program is adapted to: compare the user input to metadata relating to the available advertisements; and generate a second list of available advertisements based at least in part on the comparison.

In another variant, the delivery to at least the user comprises storing the selected advertisements on a consumer premises device.

In a further variant, the method of delivery comprises storing the selected advertisements on a network server accessible to a consumer premises device of the at least user.

In an additional variant, the program is adapted to: enable a user to enter one or more advertisement criteria; evaluate metadata associated with the list of available advertisements; and generate a second list of available advertisements that at least partly correlate with one or more of the criteria.

In yet another variant, the computer program is adapted to: provide a user interface, the interface adapted to enable a user to enter user information; save the user-entered preference information as a user profile; evaluate metadata regarding the available advertisements; and generate the list of available advertisements based at least in part on the user information in the user profile. For example, the user information might comprise at least one of: (i) name; (ii) age; (iii) gender; (iv) marital status; (v) household income; (vi) hobbies; (vii) zip code; and (viii) occupation.

Alternatively, the user information comprises user selection or de-selection of advertisement themes.

In another variant, the program is adapted to: utilize metadata to determine an expiration date of the available advertisements; identify one or more of the available advertisements that have expired; request and receive updated advertisement content from a content source; replace the expired advertisements with the updated advertisements; and generate an updated list of available advertisements.

In still a further variant, the selection of one or more of the available advertisements is performed by the computer program based at least in part by inputs received from the user regarding at least one user preference, the computer program adapted to evaluate metadata associated with at least one of the available advertisements relating to the at least one preference. The evaluation of metadata associated with at least one of the available advertisements comprises for example performing at least one of: evaluating the length of at least one of the available advertisements; evaluating the correlation of the metadata with program descriptive information; or evaluating the correlation of the metadata with viewer supplied information.

In another variant, the storage medium comprises a hard disk drive (HDD) of a consumer premises recording device, the computer program adapted run on the computer premises recording device.

In a further variant, the storage medium comprises a storage device of a network server.

In a third aspect of the invention, an apparatus adapted for advertisement delivery is disclosed. In one embodiment, the apparatus is for use in a content based network, and comprises: a processor; a network interface; a storage device in data communication with the processor; and a software process operative to run on the processor. The software process is adapted to: request and receive information from a network entity related to available advertisements; generate a list of available advertisements; receive a selection of one or more of the available advertisements; and deliver the selected one or more available advertisements.

In one variant, the apparatus comprises a consumer premises device.

In another variant, the apparatus comprises a broadcast switched architecture (BSA) controller.

In yet another variant, the apparatus comprises a VoD server.

In a further variant, the delivery comprises storing advertisement content of the one or more selected advertisements on the storage device.

Alternatively, the delivery comprises sending advertisement content to a designated network address or location.

As yet another alternative, the delivery comprises displaying advertisement content of the one or more selected advertisements on a display device in data communication with the apparatus. The software process is further adapted to: obtain viewer feedback after the display of the one or more selected advertisements; and utilize the viewer feedback and metadata of the one or more displayed advertisements to generate a viewer-specific list of available advertisements.

In another variant, the software process is further adapted to: receive input relating to one or more advertisement criteria; and utilize the input and metadata of the available advertisements to generate a custom list of available advertisements. The software process is also further adapted to store the imputed advertisement criteria as a user profile stored on the storage device.

In a fourth aspect of the invention, a system for the delivery of advertisements in a communications network is disclosed. In one embodiment, the system comprises: a processing apparatus, the processing apparatus being adapted to generate a list of available advertisements; a user interface enabling a viewer to select one or more available advertisements; a mechanism adapted to allocate a carrier to deliver advertisement content for the selected one or more advertisements; and a receiving apparatus, the receiving apparatus adapted to receive the advertisement content.

In one variant, the processing apparatus comprises a headend server.

In another variant, the processing apparatus is located substantially on a consumer premises device. The receiving apparatus comprises e.g., the hard disk drive of the consumer premises device.

In yet another variant, the receiving apparatus comprises a display apparatus.

Alternatively, the receiving apparatus comprises an e-mail server.

In a fifth aspect of the invention, a method of operating a content delivery network is disclosed. In one embodiment, the method comprises: delivering program content to at least one user of said network, said user having a storage device in communication with said network; providing said at least one user with an option to process advertising content associated with said program content in at least one of a plurality of ways; receiving input from said at least one user as to their preference for said option; and providing said advertising content to said at least one user at least according to said preference.

In one variant, the content delivery network comprises a cable television network, and said storage device comprises a DVR.

In another variant, said option to process in at least a plurality of ways comprises: a first option to have said advertising content delivered to said storage device for at least later viewing; and a second option to have said advertising content or information relating thereto, sent via at least a packetized IP-based network to a particular network address. The packetized IP-based network comprises e.g., the Internet, and said particular network address comprises an e-mail account designated by said at least one user.

In yet another variant, said program content and said advertising content are recorded on said storage device, and said option is presented to said at least one user upon the user fast-forwarding through at least a portion of said advertising content. The option to process in at least a plurality of ways comprises for example: a first option to view at least a portion of said advertising content; and a second option to not view at least portions of said advertising content.

In another variant, the method further comprises: accessing at least a portion of metadata associated with said advertising content; and presenting said at least one user with said option based at least in part on said accessed metadata. Presenting said at least one user with said option comprises for example presenting said user with a list of one or more advertisements that comprise said advertising content, and said receiving input comprises receiving input from said user as to whether they wish to view one or more of said advertisements or not.

In a sixth aspect of the invention, a method of doing business is disclosed. In one embodiment, the method comprises: exchanging consideration between at least one advertisement content source and a service provider; providing a storage device for the storage of the advertisement content; and providing user access to a computer program running on a processor. The program is configured to: generate a list of available advertisements; and enable a user to select one or more of the available advertisements; and provide a mechanism for the delivery of the selected one or more advertisements to the user.

In one variant, at least one of the storage device and the processor is located at a cable network headend.

In another variant, the computer program is adapted to enable the user to select delivery of none of the available advertisements if desired.

In yet another variant, the consideration comprises at least listing of the advertisement content as an available advertisement on the list of available advertisements.

In a further variant, the delivery comprises display of the advertisement content.

In still another variant, the method further comprises providing a preferred level of advertising, the preferred level comprising: exchanging consideration between a preferred advertisement content source and the service provider; and displaying advertisement content from the preferred source during at least one instance where advertisements are required to be displayed.

Alternatively, the method further comprises displaying advertisement content from the preferred source during instances where a user fails to select one or more of the available advertisements, and the user further does not select an option requesting the delivery of none of the available advertisements.

As yet another variant, the delivery comprises storage of the advertisement content of the selected one or more advertisements on the storage device, or alternatively to an electronic network address.

In another embodiment, the network operator collects subscriber advertising preference and feedback data using a computer program (e.g., AC), and the data is provided to one or more advertisers for consideration.

In a seventh aspect of the invention, computer-readable apparatus comprising a storage medium is disclosed. In one embodiment, the storage medium comprises an advertising controller (AC) program having a plurality of instructions which, when executed on a computer, implement advertising evaluation and selection functions.

In an eighth aspect of the invention, an apparatus adapted for advertisement delivery to a user of a content-based network is disclosed. In one embodiment, the apparatus comprises: a processor; a network interface; a storage device in data communication with the processor; and a software process operative to run on the processor. The software process is adapted to: distribute information related to available advertising content to a user within the network; receive input from the user regarding at least one preference relating to the advertising content; store at least one of: (i) the advertising content, or (ii) links to a first storage location where the advertising content is stored, to a second storage location, the second location being substantially specific to the user.

In one variant, the apparatus comprises a network server, and the information comprises a list of available advertisements. The list further comprises for example an option for a viewer to view at least some of the available advertisements as a group and eliminate commercial interruption during playback of a recorded program.

In another variant, the first location comprises a network storage location, and the second location comprises a storage device at the user's premises.

Alternatively, the first and second locations may comprise a storage device at the user's premises.

The links each may comprise e.g., a hyperlink to at least one URL address associated with an advertiser.

In another variant, the storage at least one of: (i) the advertising content, or (ii) links to a first storage location where the advertising content is stored, comprises storage of the links, and the software process is further adapted to display a list of the links automatically upon a user accessing the second storage location.

In a ninth aspect of the invention, a method of operating a content-based network is disclosed. In one embodiment, the method comprises: receiving information relating to one or more preferences of a user of the network; evaluating a plurality of available advertisement content based at least in part on the one or more preferences; and providing the user with a user-specific list of available advertisement content, the content on the list being selected based at least in part on the evaluation.

In one variant, providing a user with a user-specific list comprises downloading one or more URLs associated with the advertisement content on the list to a recording device of the user.

In another embodiment, the method comprises: showing at least one first user an advertisement; receiving input from the at least one first user as to the advertisement; providing at least one second user a plurality of advertising options from which they may choose via a user interface, the options comprising the advertisement; and providing the at least one second user the input via the user interface.

In one variant, the input comprises a user-assigned rating of the advertisement, the rating comprising at least one rating selected from a predetermined rating scale; and the providing the input comprises providing input from a plurality of users.

In a further aspect of the disclosure, a method of providing advertising content to a plurality of users associated to a respective plurality of user devices in a content delivery network is disclosed. In one embodiment, the method includes: (i) receiving a plurality of requests to view primary content from the plurality of user devices; (ii) presenting to the plurality of users a list of a plurality of available advertisements for selection; (iii) providing to the plurality of users one or more selectable options for viewing and/or delivering the plurality of available advertisements; (iv) enabling the plurality of users to select one or more of the plurality of available advertisements for viewing and/or delivering according to the one or more selectable options; (v) when none of the one or more of the plurality of available advertisements is selected by the plurality of users within given time period, automatically adding one or more other ones of the plurality of available advertisements for viewing and/or delivering so as to fit within a duration of time before the primary content is set to begin; (vi) providing a multicast of the requested primary content to the plurality of user devices, the multicast comprising only the primary content without any secondary content inserted therein; and (vii) providing to individual ones of the plurality of user devices respective individual ones of the automatically added one or more other ones of the plurality of available advertisements according to the viewing and/or delivering options.

In one variant, a triggering event is associated with the primary content. In another variant, one or more other ones of the plurality of available advertisements are automatically added for viewing and/or delivering via evaluating metadata associated with at least one of the plurality of available advertisements with respect to information descriptive of the primary content.

In another aspect of the disclosure, a system for delivery of advertisements in a communications network is disclosed. In one embodiment, the system includes: (i) a processing apparatus; (ii) a user interface adapted to enable a viewer to select from two or more options; (iii) a mechanism adapted to allocate a carrier to deliver advertisement content for the selected one or more advertisements; and (iv) a receiving apparatus.

In one variant, the processing apparatus is adapted to process a real-time broadcast primary content stream to identify one or more markers disposed therein, the markers configured to indicate that one or more advertisements must be selected, and generate a list of available advertisements. In another variant, the two or more options are implemented to allow the viewer to: (i) select one or more of the list of available advertisements and identify when during playback of the real-time broadcast primary content the selected one or more advertisements will be viewed, and (ii) select that one or more of the list of available advertisements be delivered to the viewer at a time after the playback of the real-time broadcast primary content. In yet another variant, the receiving apparatus is adapted to receive the advertisement content.

In another aspect of the disclosure, a method of providing primary and secondary content to a plurality of users in a content delivery network is disclosed. In one embodiment, the method includes: (i) receiving a request to view primary content from a user device; (ii) in response to the request, identifying a plurality of secondary content; (iii) causing at least information relating to the identified plurality of secondary content to be stored at a storage entity associated with the user device; (iv) upon a user's instantiation of a trick mode functionality at the user device, prompting the user with a plurality of options; and (v) causing display and/or delivery of the selected ones of the one or more items of the identified plurality of secondary content according to the selected one or more display and/or delivery options.

In one variant, the secondary content is identified based at least in part on a relationship of a context thereof to one or more attributes of a user associated with the user device. In another variant, the plurality of options include: (i) selecting one or more items of the identified plurality of secondary content and selecting one or more display and/or delivery options, and (ii) selecting none of the one or more items of the identified plurality of secondary content.

In another aspect of the disclosure, a computerized apparatus for providing advertising content to a user device associated with a content delivery network is disclosed. In one embodiment, the apparatus includes: (i) a processor; (ii) a data interface in data communication with the processor; and (iii) a storage device in data communication with the processor.

In one variant, the storage device includes at least one computer program with logic configured to, when executed: (i) receive via the data interface a request to view primary content initiated from the user device; (ii) cause presentation via the user device of a list of a plurality of available advertisements for selection; (iii) cause provision via the user device a selectable option for delivery of the plurality of available advertisements other than presentation with the primary content, thereby enabling selection of one or more of the plurality of available advertisements for delivery according to the selectable option; (iv) when one or more of the plurality of available advertisements is selected via the user device within a given time period, cause delivery of the one or more selected advertisements via the selectable option; or (v) when none of the plurality of available advertisements is selected via the user device within the given time period: automatically add one or more other advertisements for delivery, the automatically added one or more other advertisements selected so as to fit within a duration of time before the primary content is set to begin, the selection based at least on an evaluation of metadata associated with the one or more other advertisements with respect to information descriptive of the primary content; (vi) cause provision to the user device of the automatically added one or more other advertisements during the duration of time; and (vii) cause provision of a multicast of the primary content to the user device.

In one implementation, the multicast includes only the primary content. In another implementation, the selectable option includes delivery via e-mail.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
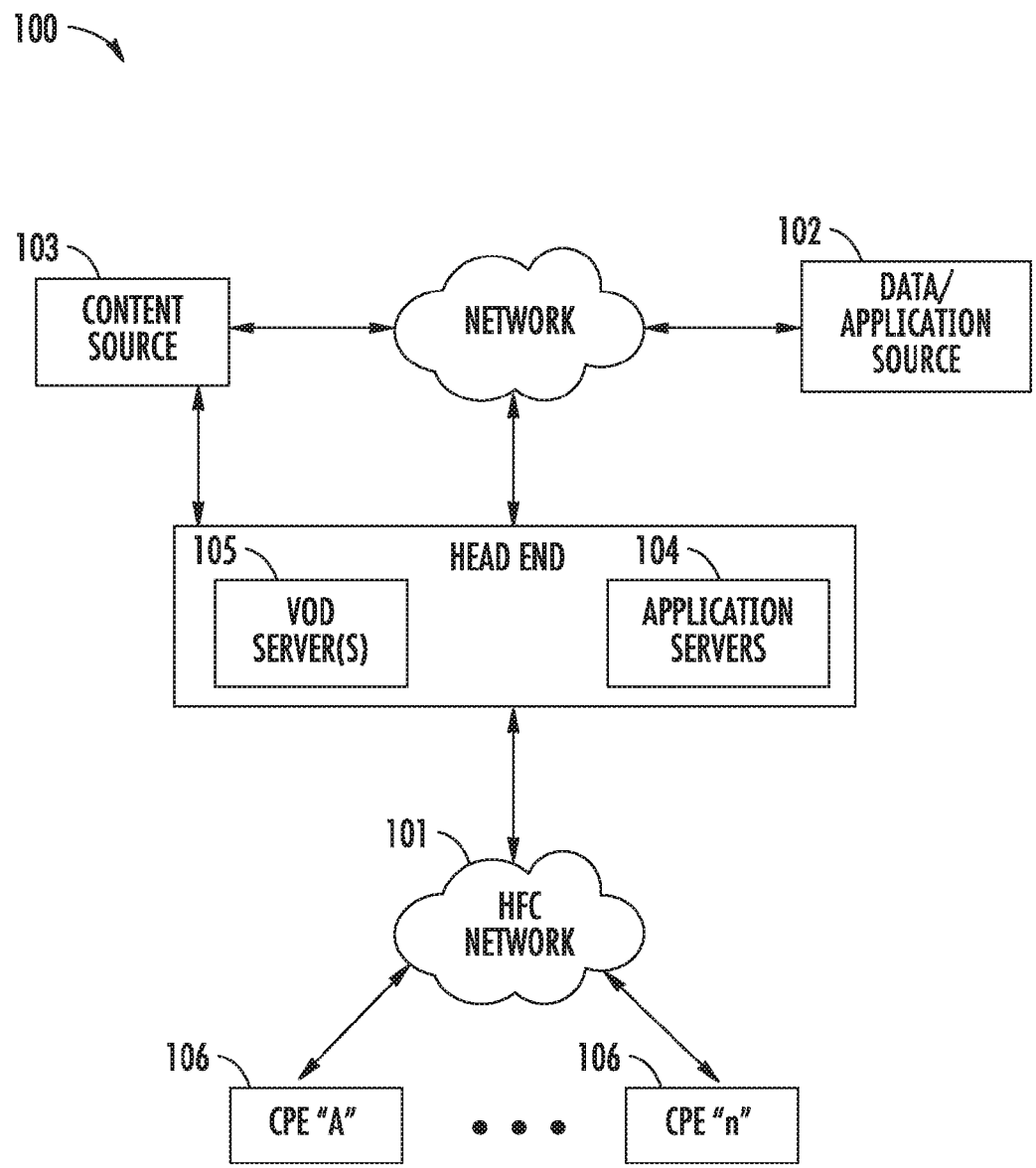
FIG. 1 is a functional block diagram illustrating an exemplary HFC cable network configuration useful with the present invention.

Reference is now made to the drawings, wherein like numerals refer to like parts throughout.

As used herein, the term "advertisement" and similar forms refers without limitation to any audio, visual, or promotion, message, or communication, whether for-profit or otherwise, that is perceptible by a human. Examples of advertisements include so-called "bumper" advertisements (advertisements inserted before or after a client requested program), "pause" advertisements (presented when a client sends a pause control command to a video server or the like), or additional and replacement advertisements.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

As used herein, the term "consideration" refers without limitation to a payment, incentive, option, forbearance of a debt, credit, or any other thing or act which conveys monetary or any other type of value between two or more parties, such as for example cash or credit/debit payments, credits to account, erasure of debt, exchanges, barters, options or rights of first refusal.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVR" (digital video recorder) refers generally to any type of recording mechanism and/or software environment, located in the head-end, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multimedia specific operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MOCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "on-demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, head-end event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for enhanced advertising selection and delivery in a communications network such as a cable television network. The present invention provides a substantially user-friendly mechanism for viewing content and advertisements which both eliminates the guess-work and imprecision associated with skipping commercials via manual fast-forwarding through recorded content, and presents a viewer with options regarding the type and content of advertisements to view. Advertisers and network operators are also provided with more avenues for reaching subscribers with advertising or promotional content.

In one embodiment, the aforementioned network comprises a cable television network, and the methods and apparatus enable a viewer to individually preview and select the advertisements that they will view during real-time broadcast programming, as well as during "trick mode" operation in recorded program settings. In one variant, the preview function leverages metadata that is found in the advertisements. These advertisements may be stored for example on the subscriber's DVR (or on the network, such as via a networked PVR (nPVR system)) for selective retrieval or insertion.

In another embodiment, an advertising controller (AC) is utilized to select choices on the subscriber's advertising "playlist" based on, e.g., correlation between the advertising metadata and metadata associated with the programming content being viewed or recorded by the subscriber.

In another aspect, decoupling of advertising or promotions from a previously recorded program is advantageously provided, thus affording the network operator flexibility to insert various advertising content options in a dynamic fashion based on inter alia changing network conditions, and/or cost/benefit decisions, or selectively replace dated, expired or under-performing advertisements, or those having less correlation to a current program content stream.

In another variant, advertising or commercial skipping is substantially frustrated by presenting a viewer with several viewing options of potential interest, and/or imposing one or more minimum viewing policies.

The invention also permits the use of a new more flexible business method (pricing model) for network operators and content sources; valuable data on user preferences, habits and impressions is advantageously generated by the MSO during operation, and this information can be used for any number of purposes including further refinement of advertising targeting, as well as sale to advertisers to help them better understand the subscriber behavior in the network (and across the general population).

In other variants, subscriber anonymity or privacy (i.e., no use of personally identifiable information) is also maintained where desired though use of a cryptographic has function or other comparable means, thereby allowing for collection of data by the network operator, and sale of this data to third party advertisers, without fear of compromising subscriber privacy.

In another aspect, network or relational links (such as URLs) can be downloaded and saved on a subscriber's CPE (e.g., DVR) for later access by the subscriber. The URLs can be downloaded for example as part of a live or real-time program stream and related thereto such as via descriptive metadata, or pulled by the CPE/DVR from a network storage location (e.g., web server) based on one or more user-specified preferences.

In another aspect of the invention, advertisement content can be downloaded and saved on a subscriber's CPE (e.g., DVR), and links or pointers to the content are displayed on a list or otherwise made accessible to the user. The listing of advertising content may be displayed at the beginning of the program content, at the first commercial break (or every commercial break) in the recorded program. The link list may be displayed automatically upon playback of the recorded program. The user is given the opportunity to tailor how and when they will watch the selected advertisements. According to another variant, the viewer may also be given an option to view all of the available advertisement content as a group, and thereby eliminate commercial interruption during playback of the recorded program.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Moreover, while the primary embodiments described herein describe predominantly advertisement or promotion insertion, other types of content (whether other programs, instructional videos, musical content or videos, games, emergency warnings or alerts, etc.) can be inserted using the techniques of the present invention.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Bearer Network Architecture—

FIG. 1 illustrates a typical content-based network configuration with which the enhanced advertising apparatus and methods of the present invention may be used. The various components of the network 100 include (i) one or more data and application origination points 102; (ii) one or more content sources 103, (iii) one or more application distribution servers 104; (iv) one or more VoD servers 105, and (v) customer premises equipment (CPE) 106. The distribution server(s) 104, VoD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VoD server 105 comprises a computer system where on-demand (OD) content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
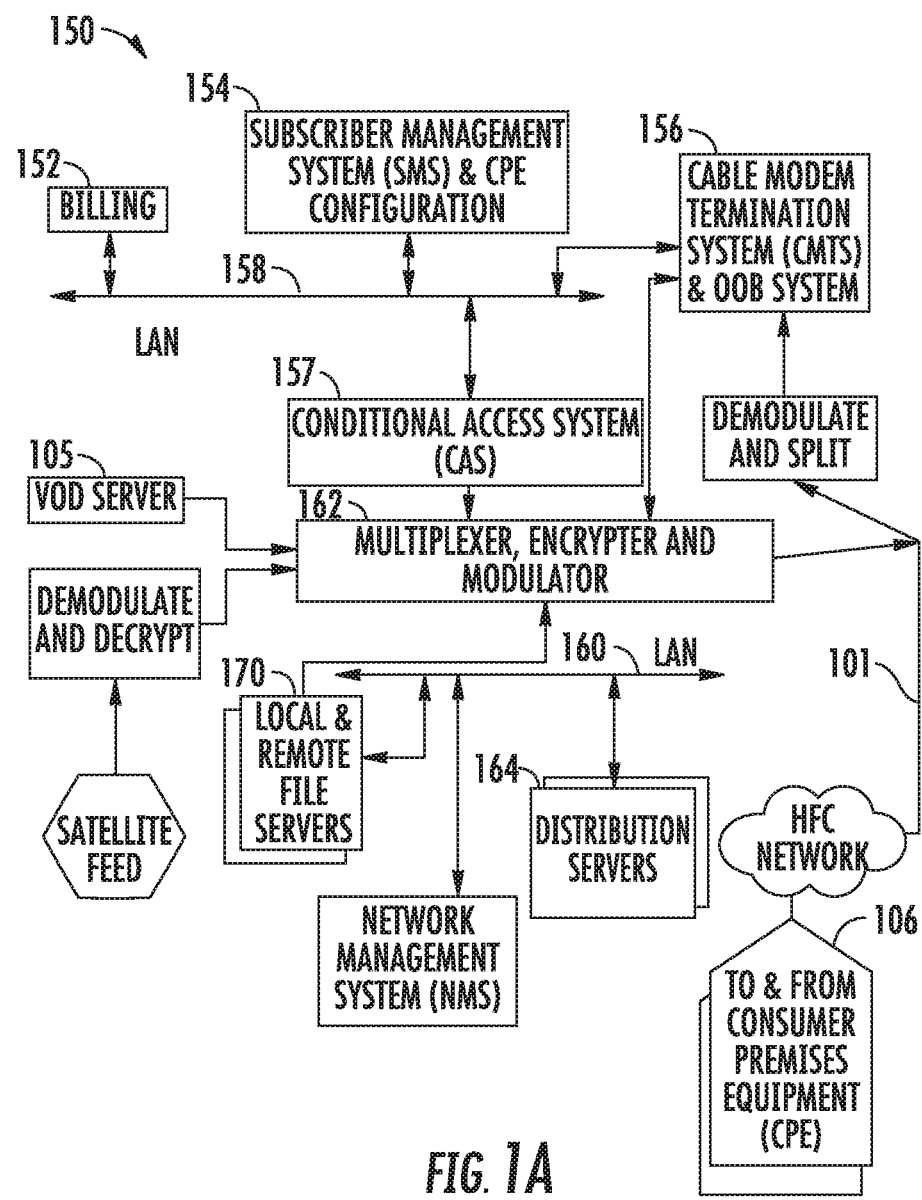
FIG. 1a is a functional block diagram illustrating one exemplary HFC cable network head-end configuration useful with the present invention.

Referring now to FIG. 1*a*, one exemplary embodiment of headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1*a* is high-level, conceptual architecture and that each MSO may have multiple headends deployed using custom architectures.

Figure 1B:
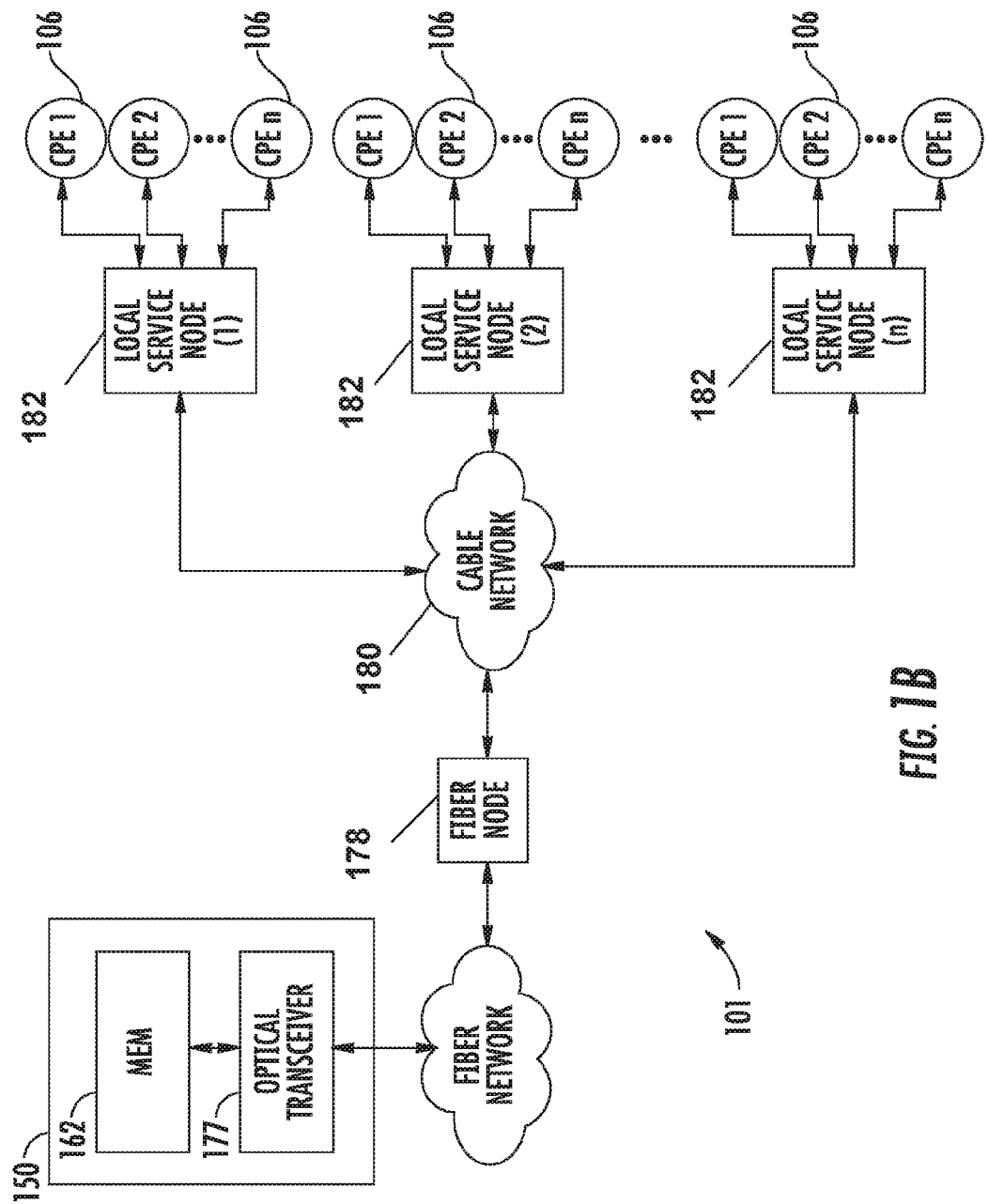
FIG. 1b is a functional block diagram illustrating one exemplary local service node configuration useful with the present invention.

The exemplary architecture 150 of FIG. 1*a* further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1*b*) via a variety of interposed network components.

Figure 1C:
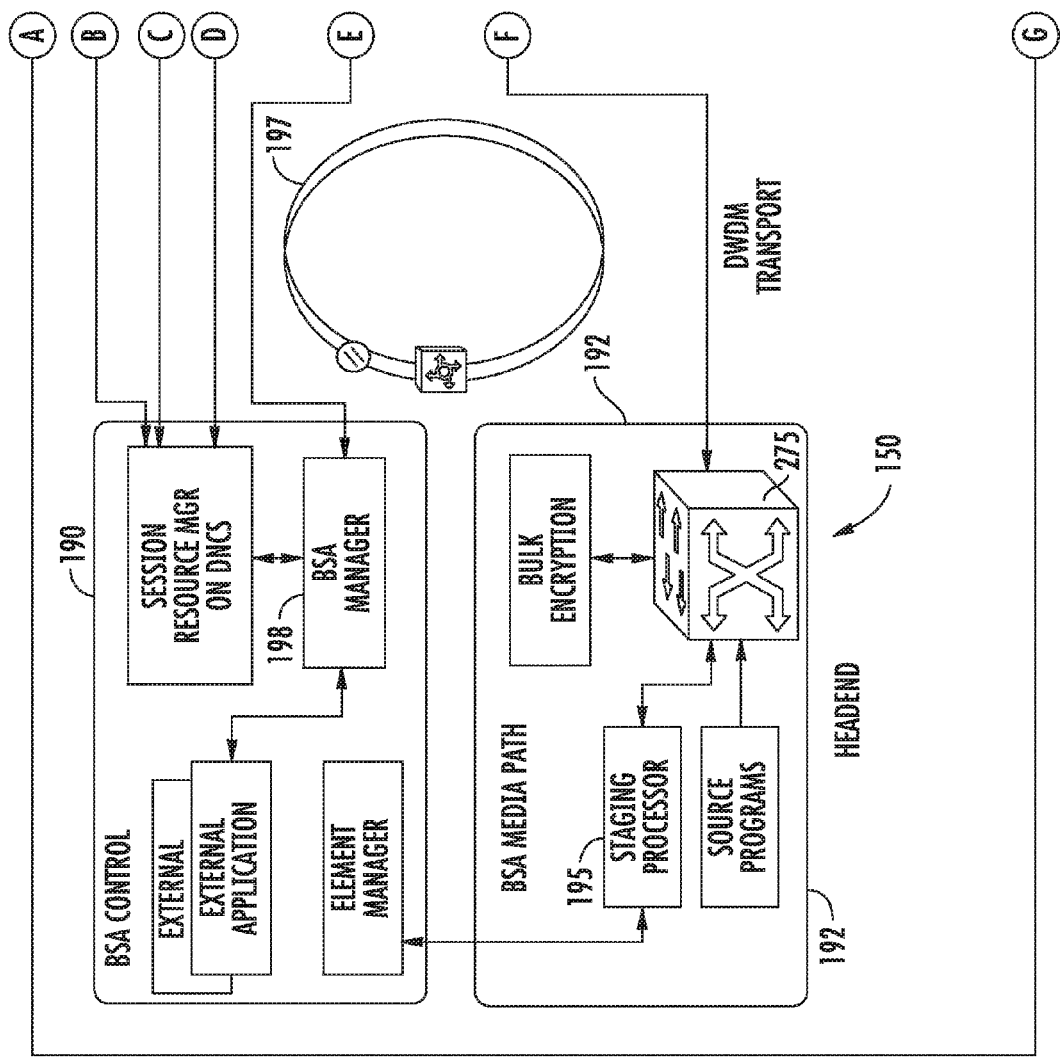
FIG. 1c is a functional block diagram illustrating one exemplary broadcast switched architecture (BSA) network useful with the present invention.
Figure 1C:
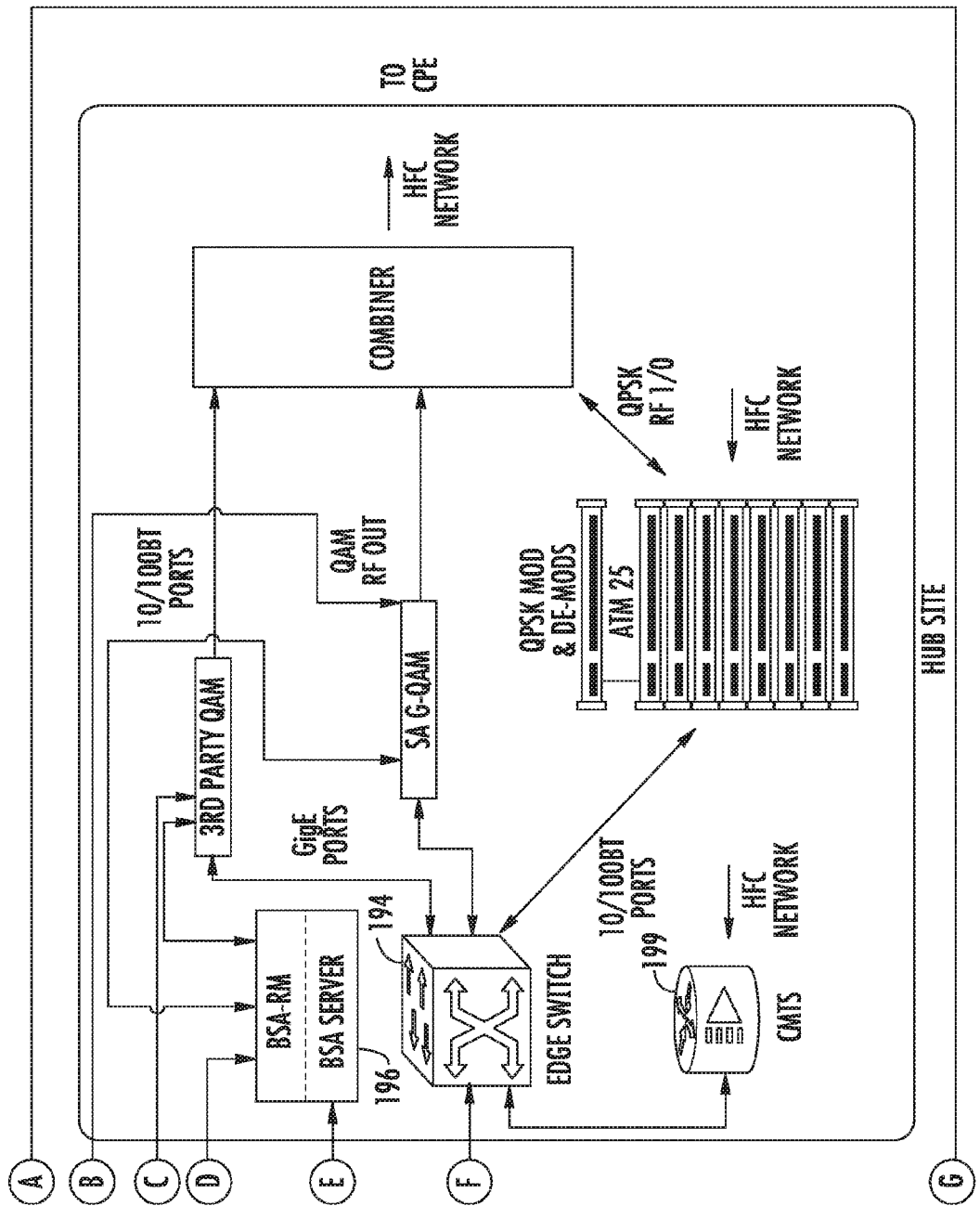

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1*c* provided subsequently herein). As yet another alternative, a multi-location or multi-stage approach can be used, such as that described in co-owned U.S. patent application Ser. No. 11/048,334, entitled "APPARATUS AND METHODS FOR MULTI-STAGE MULTIPLEXING IN A NETWORK", and issued as U.S. Pat. No. 7,602,820 on Oct. 13, 2009, incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1*c* illustrates exemplary switched network architecture also useful with the enhanced advertising apparatus and methods of the present invention. While a so-called "broadcast switched architecture" or BSA network is described as the content delivery mechanism in one embodiment of the invention, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VoD) systems, BSA programs are streamed to a service group (contrast: switch) only when being viewed. Unlike VoD, many viewers can view the same stream. Typically, only real-time linear programs are included in BSA broadcasts. Since there is no storage involved, the "VCR" controls (e.g., trick mode functions) common to VoD are not available. In this regard, BSA is much simpler than VoD. Commercials or other programming segments cannot be skipped, and program bitrates can be treated as in more conventional systems.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VoD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Methods—

Figure 2:
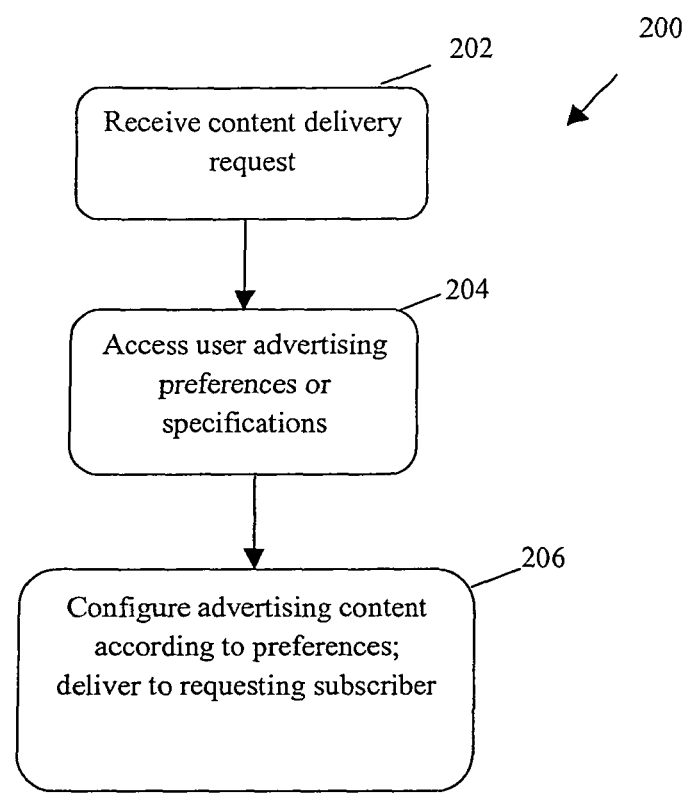
FIG. 2 is a flow diagram illustrating an one exemplary embodiment of the generalized method of advertisement selection and delivery according to the present invention.
Figure 2A:
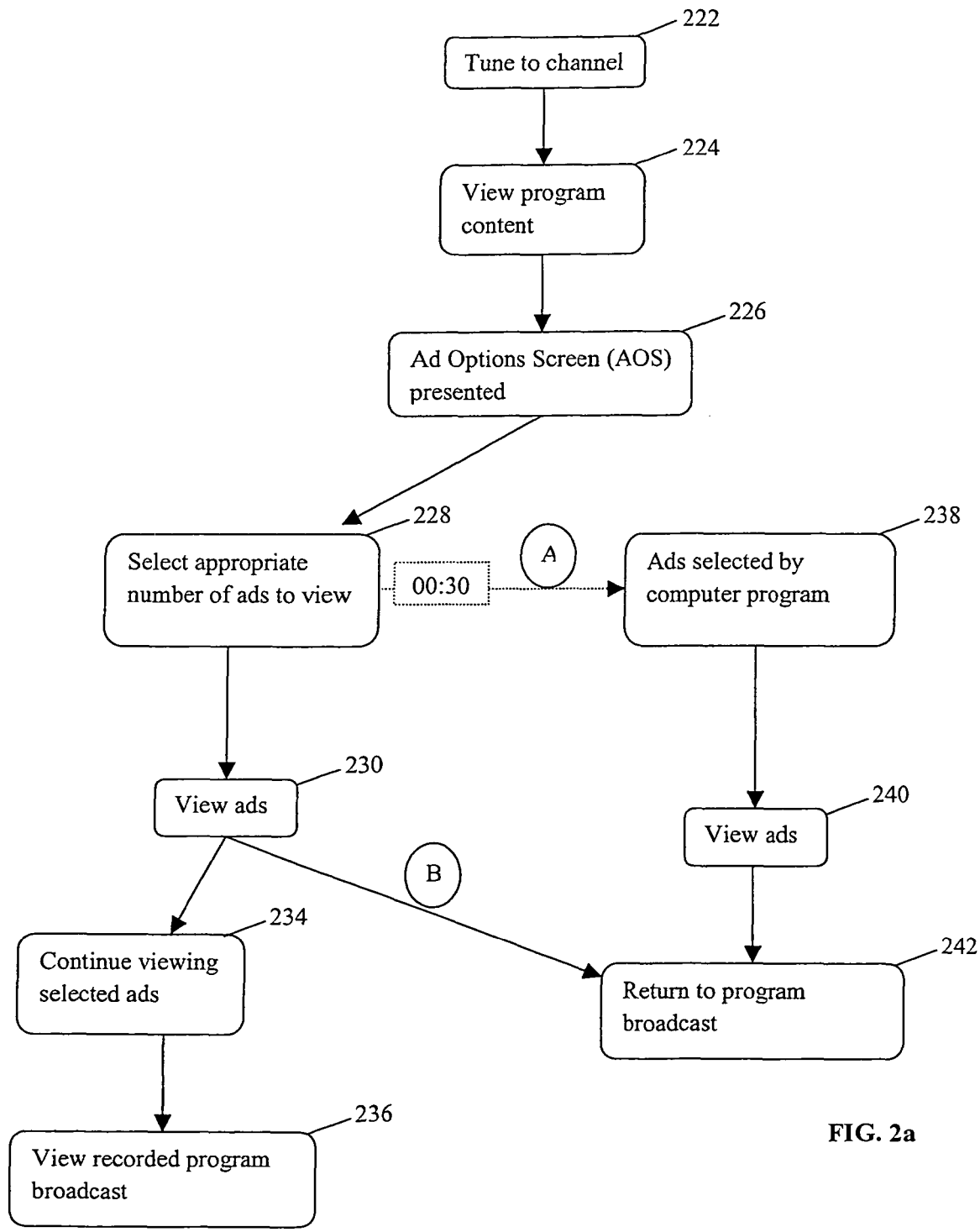
FIG. 2a is a flow diagram illustrating an exemplary method of advertisement selection and delivery in a real-time broadcast setting.
Figure 2B:
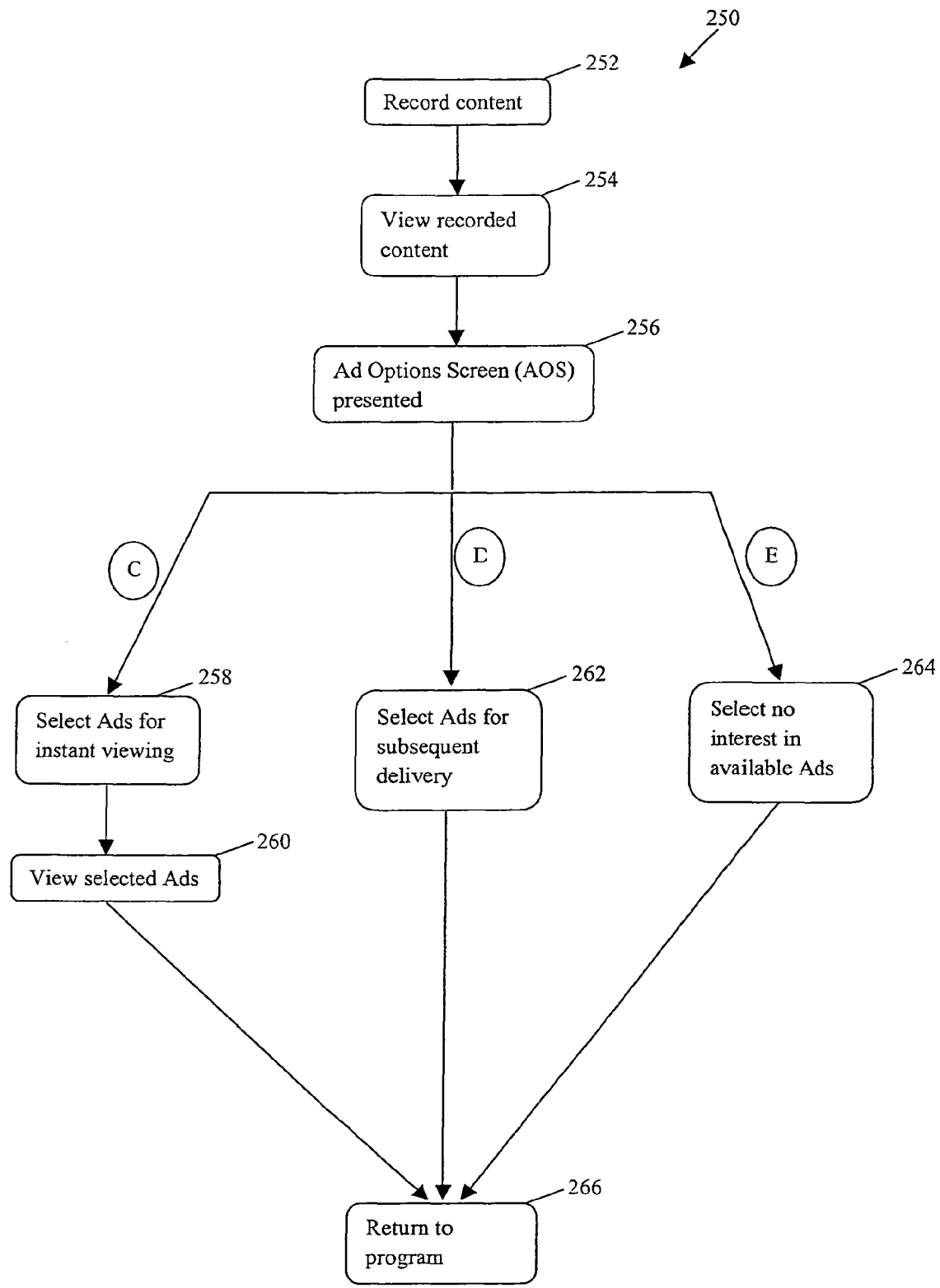
FIG. 2b is a flow diagram illustrating an exemplary method of advertisement selection and delivery in a recorded broadcast setting.
Figure 2C:
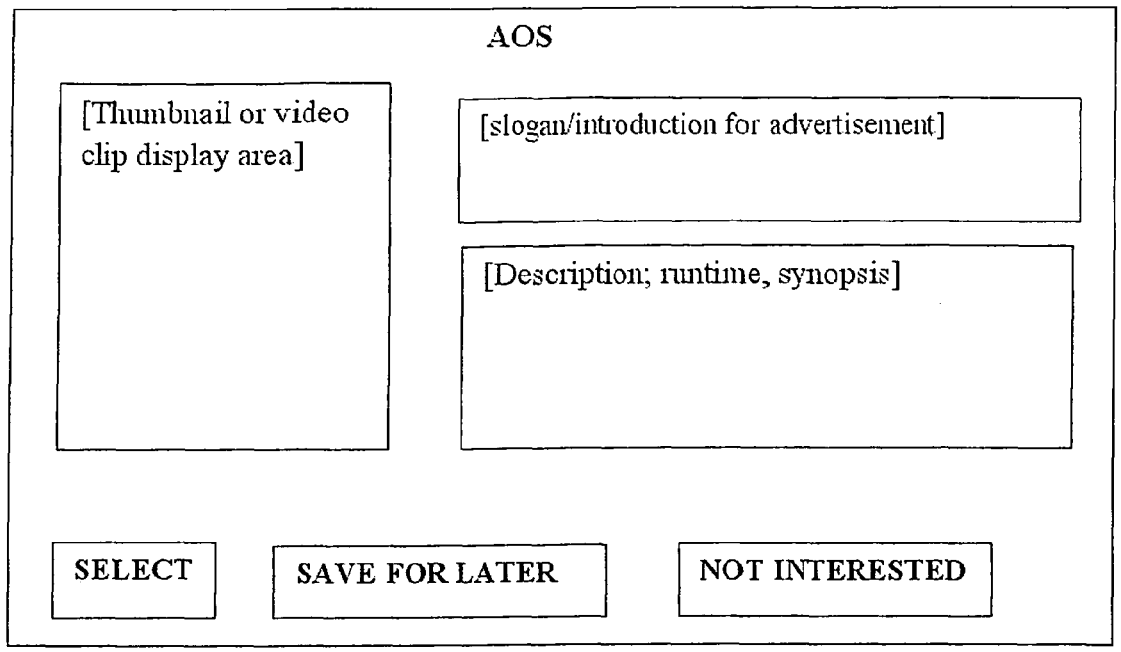
FIG. 2c is a graphical representation of one exemplary embodiment of an AOS (advertising options screen) according to the invention.

Referring now to FIGS. 2-2c, exemplary embodiments of the methods of enhanced advertisement selection and delivery according to the invention are described.

FIG. 2 is a flow diagram illustrating one embodiment of the generalized methodology of advertisement delivery according to the invention. As shown in FIG. 2, the method 200 comprises first receiving a request for content delivery, such as by a subscriber tuning to a broadcast channel, initiating a VoD session, or other mechanism (step 202). The content includes one or more placement opportunities for an advertisement such as e.g., at certain periodicities, at the beginning, at the end, and so forth. These placement opportunities may be denoted by a certain chronological or frame number reference and associated duration, certain types of frames being embedded in the program content, or any number of other techniques well known to those of ordinary skill for identifying insertion points for advertisements.

Next, per step 204, user input or preferences are used to configure and schedule the delivery or presentation of advertising content associated with the program content. For example, in one variant, the user is given a list of advertisements that are available for viewing in the various insertion points of the program content, and the user selects one or more of these advertisements to view. The selected advertisements are then presented to the subscriber at the appropriate points during the content. These preferences may be received contemporaneously with the display of the content (e.g., at the beginning of the program), or in advance of the program delivery or playback.

Lastly, per step 206, the content and advertisement(s) are delivered according to the configuration and preferences determined as part of step 204.

It will be recognized that the generalized methodology of FIG. 2 lends itself to any number of different content and/or advertising delivery paradigms and temporal relationships. For example, in one variant of the methodology, the content being delivered comprises broadcast content to be delivered in real time, and the advertisements are delivered as part of the broadcast stream created at the head-end or server hub, such as in the case where a unique or individual BSA program stream is instantiated for a given subscriber, with the user's preferences accessed in advance (such as from a prior existing file or other stored data structure accessible to the headend or BSA server controller) to splice in or populate the various insertion opportunities within the broadcast with user-specific advertisements. The "user input" may also be entirely passive; e.g., selections made by an advertising controller (discussed in greater detail subsequently herein) based on user demographics such as income, geographic location, tuning habits, etc.

In another paradigm, the content is broadcast or delivered on-demand, yet the advertisements are inserted in real-time from a storage location, based on contemporaneous user inputs. For instance, the user might be queried at the start of the program or establishment of the VoD session which advertisements or types of advertisements (e.g., genre) they would like to see during that program, or the foregoing "passive" approach is employed, and the selected advertisements are inserted into the content from the storage location. The advertisements may be stored remotely from the subscriber (e.g., at a headend or BSA server hub), or even locally to the subscriber (such as on their premises DVR in a designated directory or storage area). Accordingly, the insertion logic necessary to select and insert the selected advertisements may be disposed at any of the foregoing locations as applicable. The advertising content may be pre-positioned at the storage location, or alternatively transmitted at any time after the start of the program but before the designated point of insertion (e.g., in a just-in-time fashion).

The foregoing local storage approach (e.g., DVR) also allows the opportunity for the broadcast program content stream to be the same for every subscriber wanting to watch that program (thereby conserving on bandwidth, since unique streams will not need to be generated for each subscriber based on their differing preferences), and the user-specific advertising content can be spliced in locally at each CPE or associated DVR.

In yet another variant, the program content stream is delivered to the subscriber and recorded (e.g., on the aforementioned DVR), and the advertising content is similarly delivered and stored on the local repository (which may be the same or different than that used for the program content). These two elements (program content and advertising content) are delivered as separate components or series of components, and hence are not intrinsically tied to one another in terms of delivery or use.

In still a further variant, the program and advertising content are delivered as a unified "nominal" stream (i.e., not as separate components as described above), and recorded to the DVR or other storage device. The advertisements in the nominal stream may be replaced as required by those specifically selected by the subscriber from a repository stored locally (or, as another option, stored on a web server or the like).

The techniques described herein are also directly applicable to nPVR (network PVR) or nDVR delivery paradigms. As is well known, nPVR/nDVR functionality provides a user with the ability to control delivery of the content similar to a VoD session, yet for broadcast or live programs. And unlike traditional DVR/PVR approaches, the subscriber need not maintain a recording device within their premises. The MSO or other entity in effect maintains the recorder for the subscriber at the headend or distribution node. So, for example, the user might want to pause a live broadcast of a given television show for a period of time, and then start it back up, without losing any of the content during the pause. Accordingly, the nPVR/nDVR functions effectively as a more traditional PVR/DVR for the purposes of this discussion, with the exception that the content (whether program or at least the "nominal" advertising of the original broadcast) is not stored locally to the subscriber.

Yet other approaches will be recognized by those of ordinary skill given the present disclosure.

The insertion points for such ancillary content need not be discrete in nature either; for instance, the techniques described herein may be used to select and insert caption data, financial or news tickers, etc. that play contemporaneously with the primary (program) content. In one such case, the user might be given the opportunity to select caption data in a different language, which may be transmitted to the subscriber by the MSO or its proxy and pre-stored locally. When the subscriber selects "French" language, the DVR inserts the caption data in French into the real-time or playback program stream for display.

FIG. 2a is a flow diagram illustrating an exemplary implementation of the method 200 of FIG. 2. The implementation of FIG. 2a is described in the context of a real-time or live television broadcast. According to this embodiment, the viewer first tunes to a particular channel per step 222. In response, the network supplies the broadcast programming requested, and the viewer is able to view the program content per step 224. At a first instance of a break in the programming, the viewer will be shown an "Ad Options Screen" (or "AOS") per step 226. It will be appreciated that in other embodiments, the AOS may be displayed either before or after the program content is played and/or at every instance of a commercial break. The AOS is a user interface resulting from the compilation of metadata regarding the scheduled commercials by a computer program running on the viewer's CPE or headend entity. The AOS will be comprised of a playlist, as described below; and the viewer is prompted to select from the playlist advertisements to view (step 228).

In this embodiment, in order to keep the viewer up to speed with the real-time programming broadcast, the viewer will be required to select an appropriate number of commercial advertisements so as to fill the commercial break (or breaks) in the real-time broadcast.

Per step 230, the viewer selected advertisements are played, filling the prescribed period of time. After viewing the viewer selected commercials air, the viewer will be directed back to the broadcast program via pathway B. If the real-time broadcast is set to begin before the viewer selected commercials have ended, the viewer will be prompted to select whether he would prefer to be directed back to the real-time broadcast of the program via pathway B, or continue viewing the commercials selected per step 234. If the viewer selects to continue viewing the commercials (or in one embodiment fails to select any option), the commercials will continue and the real-time broadcast will be recorded as it airs. The viewer will be directed to the recorded program broadcast per step 236 once the selected commercials have ended.

Alternatively, if the viewer does not select any advertisements within a set period of time of arriving at the AOS, 00:30 seconds in the illustrated example, the computer program running on the viewer's CPE (or network entity) will, via pathway A 238, select a set of commercials to fit the time necessary until the broadcast program is set to begin. The commercials selected may be chosen based on temporal considerations (e.g., to fit within the remaining time), and/or randomly from the commercials of paid advertisers. Alternatively, a system may be in place for the showing of a particular set of paid advertisers, as discussed in greater detail below. These computer-selected commercials are viewed by the viewer per step 240. Once these computer selected advertisements have finished, the viewer will be directed back to the selected broadcast program per step 242.

In an instance where a viewer tunes to a channel in a real-time broadcast situation and that channel is currently experiencing a commercial break, the viewer will join the method at step 226 and be immediately presented with the AOS. This is also true in instances where a viewer has decided to switch away from a channel that has broken for commercial. If the channel to which the viewer has switched to is currently showing content, that content will be available to be viewed; however, if the channel is currently showing a commercial, the AOS will appear in this embodiment.

An exemplary method 250 of the enhanced advertisement delivery system in a recorded content setting is illustrated in FIG. 2b. According to this embodiment, the viewer or MSO sets a recording entity or device to record particular content per step 252. The recording entity or device which records the broadcast may be a DVR, PVR, nPVR system, or other similar device. After the recording entity has recorded some portion of the requested content, the viewer is able to view at least that portion of the program content which has been recorded per step 254. According to this embodiment, at the first instance of a viewer command to fast-forward or otherwise skip a portion of the content determined to be a commercial or advertisement (such as via an embedded marker frame, time stamp, etc.), the viewer will be shown the "Ad Options Screen" (or "AOS") per step 256.

As described above, the exemplary embodiment of the AOS is a computer-program generated user interface (UI) which gives a viewer a list of scheduled or otherwise available commercials which the viewer may select to view. The list is, in this embodiment, produced from the viewer's CPE 106 or recording device (or a network device in the case of advertising content stored off-premises) generating a compilation of metadata regarding the scheduled commercials. As previously discussed, this compilation may also be generated by a headend server or other network entity if desired.

In one embodiment, the AOS contains images (e.g., "thumbnails") or short video and/or audio segments which refer to or capture a scene from the commercial advertisements they represent; see FIG. 2c. In another embodiment, the images may also be accompanied by a text description of the product or service offered, or a summary of the commercial itself. Alternatively, the text description may be the only indicator of the commercial or advertisement presented. This information may be drawn directly from the metadata associated with the individual advertisements, stored in a local repository accessible by the AOS generation program (e.g., a separate directory on the DVR hard drive), or even obtained from a network server in a just-in-time fashion when assembling the AOS. Many different configurations of AOS will also be appreciated by those of ordinary skill.

Once the AOS screen as been presented per step 256, the viewer will have three alternatives. In the first alternative (C), the AOS presents the viewer an option to select the specific advertisement(s) that the viewer would like to view immediately per step 258; those advertisements are then played per step 260. Once the selected advertisements have completed, the viewer is returned to the recorded program per step 256.

In the second alternative (D), the viewer may choose, at the AOS screen, to have selected advertisements subsequently delivered 242. According to this alternative, a viewer may either select to have the advertisement (or a similar advertisement): (i) made available after the program which is currently being viewed has ended, (ii) e-mailed or otherwise forwarded to the viewer, or (iii) saved into a separate folder on the viewer's CPE (or at a headend entity such as a network PVR server as discussed below) for subsequent perusal at the viewer's leisure. The viewer would then be returned to the recorded program at step 266.

In third alternative (E), the viewer may choose the option indicating that he/she is not interested in viewing or saving any of the available advertisements per step 264. Once this option has been chosen, the viewer will be returned to his selected program at step 266. At a minimum, this third option (E) ensures that a viewer would at least need to acknowledge that they are not interested in any of the available advertisements giving the advertiser at least that much of the viewer's attention where they might otherwise receive none. This can be thought of as a "mini-impression" of sorts; for example, using the AOS configuration of FIG. 2c, the viewer is at least presented with the content and description of goods/services involved in the advertisement, and perhaps a thumbnail image or short video clip. Additionally, advertisers may also be provided with data regarding advertisements where the viewer elected the third option (E). This information can be valuable to marketers and advertisers as well as MSOs in evaluating the efficacy, view rate, and value of particular advertisements. Hence, while not a complete impression (i.e., view from start to finish), it is better than no impression from an advertising perspective, and can yield at least some useful information as described in greater detail elsewhere herein.

It will be appreciated that although the prior descriptions place the AOS in a particular step of the methodology for delivering advertisements, the AOS may be viewed at various times (including multiple times) during the viewing of real-time or recorded content. For example, the AOS may appear at the beginning of the playback of a recorded session from the consumer's recording apparatus. Likewise, the AOS may appear at the beginning of a real-time broadcast. This pre-presentation scheme enables a viewer to control the advertisements which will be shown throughout the program, and in the recorded broadcast setting, enables the uninterrupted delivery of program content subsequent to viewing the selected advertisements. Further, and as discussed in more detail below, the viewer or a computer program may tailor these advertisements to the particular viewer's preferences.

The AOS may also be presented at the end of the playback of a recorded session, or at the end of the real-time broadcast of a program. In the recorded broadcast setting, this post-presentation scheme enables a viewer to enjoy uninterrupted playback of recorded content. The AOS, when presented at the end of either the recorded or real-time broadcast of a program, enables a viewer to make note of products or services displayed in the program (such as by product placement) during a program, and view advertisements regarding those products or services afterwards.

The AOS may also be offered to a viewer at the first encounter of a commercial advertisement and/or at every encounter of a commercial advertisement as previously discussed. Note also that different types or configurations of AOS may be utilized within a given program or series of programs. For example, in one variant of the invention, a first type of AOS is used at the beginning (and/or end) of a program, whereas a second type of AOS (e.g., more abbreviated in content and features, yet faster to use) is used for advertisements placed mid-stream in the program content. Also, the invention contemplates user-configurable AOS, such as where the user can specify the level of features and content displayed or available in the AOS, thereby allowing them to customize their AOS utilization experience.

The above described methods are merely exemplary in nature and do not represent the full range of implementations of the AOS of the present invention; other implementations will be readily recognized by those of ordinary skill given the present disclosure.

Advertisement Options Screen (AOS) and AOS Playlist—

The advertisement options screen or AOS (see exemplary configuration of FIG. 2c) is a user interface which is adapted to provide a viewer with a "playlist" of advertisements the viewer may choose to view, hereinafter the "AOS playlist". The functionality and appearance of an exemplary configuration of the AOS will now be described in detail.

The exemplary AOS playlist may be configured such that a viewer may use his/her remote control to scroll through the various advertisement options; the user is able to select and de-select one or more advertisements from the AOS playlist as desired. The AOS playlist may be comprised of e.g., advertisements from advertisers who have previously paid for slots in this particular program, as well as computer-selected advertisements based on inter alia targeted advertisement content delivery methods discussed below.

The AOS playlist may also optionally incorporate functionality frustrating a viewer's ability to view fewer than a specified number of advertisements, or a certain number per unit time of program content watched, etc. This functionality is somewhat similar to that of prior art Internet radio providers, which do not allow a listener to deselect more than a prescribed number of artists or bands from that radio station's playlist. This functionality may be particularly useful in the real-time broadcast setting for temporal alignment purposes, because a real-time broadcast is timed to include a certain number and length of commercial interruptions. Failure to spend a prescribed amount of time in a commercial break may result in a viewer's misalignment with the broadcast timing. These timing issues are not a concern in a recorded broadcast setting; however, the minimum commercial requirement may be utilized in this and any other settings as well.

The minimum advertising or commercial requirement described above is enforced in one variant by frustrating a viewer's ability to leave the AOS without choosing an appropriate number and/or length of commercial advertising. This can be accomplished by numerical number, time of viewing, etc. In one variant of the AC, this function is enabled by algorithms that indicate to the viewer a required "quota" that they must meet in order to fulfill their minimum advertising viewing requirements. The AC tracks this time amount through the use of metadata from the broadcast program's provider. The AC permits the user to fill the time by selecting a minimum number of advertisements from the advertisement playlist.

Alternatively, the minimum commercial requirement may be enforced by insertion of one or more randomly or purposely-selected commercials to fill the time associated with a given commercial break. These inserted commercials may be intermixed with, or may be placed either before or after viewer-selected commercials, if any. The insertion of non-randomly selected commercials includes for example situations where content providers are paid fees by advertisers to have their commercials inserted in instances where the minimum requirement of commercials has not been selected. Additionally, advertisements can be selected to fill such breaks using any number of different analytical schemes including inter alia: (i) based on a correlation between the program content (as may be determined from MSO or content-source metadata associated with the program content) and the advertisement content (based on the metadata previously described); e.g., a program having golf as a main theme would be highly correlated to advertisements about golfing equipment; (ii) based on the demographics of the subscriber or sub-population of the network to which the subscriber belongs (e.g., all premium-tier subscribers), such as e.g., their income, geographic location/zip code, retirement status, etc., and their actual or assumed relationship to a particular advertisement, such as where affluent premium-tier retiree subscribers living near country clubs would have a good probability of having interest in golfing advertisements; (iii) based on historical tuning data for that subscriber or a population to which they belong (e.g., the user historically has spent 50% of their total viewing time tuned to the Golf Channel); and/or (iv) to meet certain timing requirements (e.g., only 30-second advertisements for a 30-second slot).

In instances where a viewer did not select any commercials, the entire commercial break may be randomized, or the break may incorporate the abovementioned non-randomly or deterministically selected commercials.

The AOS minimum commercial requirement function may be selectively disabled as well, such that, for example, at the first instance of a commercial the viewer may have an option of not viewing any commercials. This mechanism may be enhanced or supplemented by providing the viewer with a subsequent opportunity to view commercials after the recorded program has ended.

As discussed above, the AOS playlist permits the viewer to select among various available advertisement or commercial options. These options may be represented for example by icons or images (e.g., thumbnails). The icons/images may be still-shots from the commercials themselves, or may be logos or other images which viewers may associate with the products or services offered in the advertisements (e.g., a Coca-Cola® logo), the company who's products or services are offered, or characters often utilized by a particular company. Alternatively, the AOS playlist of advertisements may be formed by a list of text descriptions. The text may inform the viewer of the products or services offered by the advertisers, or may describe the story line or plot of the commercial. The text description may be particularly useful for advertisements which develop a storyline over several commercials, so that a viewer may read the description in order to determine whether or not he has already viewed this installment of the growing story. The AOS, in some instances, may incorporate both an image or icon and a text description as discussed above.

The icon or description or both may be adapted such that when the viewer's selector (e.g., cursor associated with a computer mouse or other pointing device, selection window or cursor such as used with electronic programming guides, etc.) is stationed on the particular icon or description of the AOS, the image and/or text become larger or "blown up" in size. The placement of the selector over a particular icon or description may also trigger an audible describer, such as a jingle or other related sound cue. The placement of the selector over a particular icon or description may further trigger a shortened form of a commercial intended to entice a viewer to view the entire commercial, e.g., a "teaser". Each of these embodiments may be used separately, or in concert with one another in any given AOS. These embodiments further offer an MSO or other party of interest novel schema for multi-tiered charging of advertisers for advertisement placement on the AOS, depending on which features are enabled or presented to the user (and/or which are actually selected by the user, somewhat akin to "click-throughs" in the well known Internet advertising context).

The advertisement options screen (AOS) may further provide viewers with the ability to end an advertisement once it has begun. This function may be accomplished in a manner similar to the "x" graphic located at the top corner of a computer program window screen, such that when a viewer places the selector on the "x" and selects it, the advertisement is stopped and the viewer is returned to the AOS. Other embodiments of ending an advertisement once it has begun are contemplated herein as well, such as, inter alia, a prompt appearing on the screen, a macrofunction, or soft or fixed function key on the remote control linked to closing an advertisement. In any case, the closing of an advertisement will in the exemplary embodiment cause the viewer to be returned to the AOS, where the viewer is offered an opportunity to view other advertisements, or return to the real-time or recorded broadcast as the case may be.

Viewer-Selected Criteria for AOS Ad Playlist—

Figure 3:
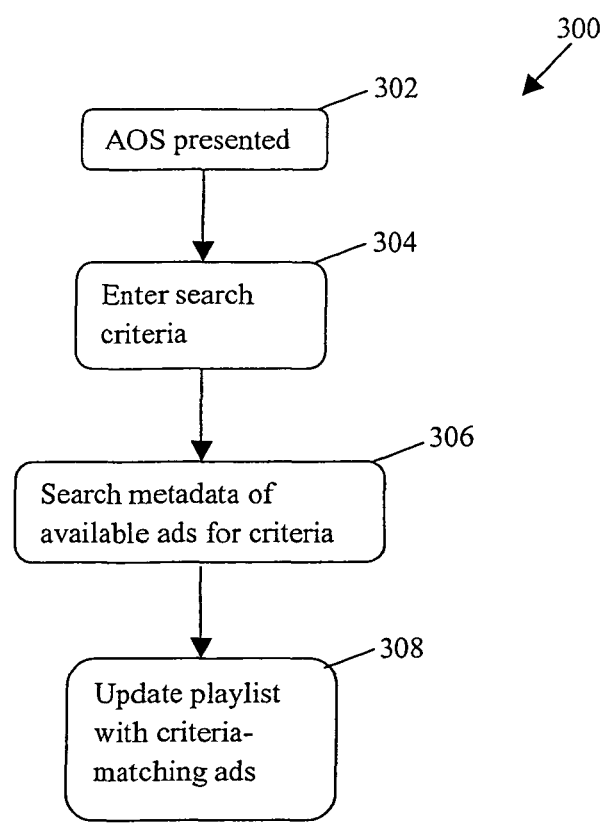
FIG. 3 is a flow diagram of one exemplary method by which the AOS may provide viewers the ability to search all available advertisements based on one or more search criteria.

FIG. 3 demonstrates an exemplary method 300 by which the AOS (and the advertising controller or AC, described subsequently herein with respect to FIGS. 6a and 6b) may provide viewers the ability to search all available advertisements based on one or more criteria. According to this embodiment, a viewer is presented with an AOS per step 302. The viewer may enter search criteria at this screen per step 304. The viewer may, for example, designate that he/she would like to view all commercials regarding a particular product or service the viewer is interested in purchasing or gaining more knowledge about. Other examples include where the viewer selects commercials which are funny, heart-warming, relate to a particular company (such as a department store), or regard a television series or station, genre, etc. The CPE- or network-based computer program (e.g., AC) would be adapted to search the metadata for all of the available advertisements and determine which advertisements meet the designated criteria per step 306.

Different types of search term generation may be utilized consistent with the present invention. In one embodiment, search terms are selectively stripped out of the metadata file associated with the content (see discussion of metadata presented subsequently herein). In another embodiment, the metadata contained in the file is sent en masse to the search process (e.g., AC). In yet another embodiment, the metadata extracted from the file is processed to produce derivative search terms or query strings.

The CPE- or network-based computer program is also adapted to deliver those advertisements which match the viewer-specified criteria to an updated advertisement playlist per step 308. At this point, depending on whether the viewer is in a real-time broadcast setting or a recorded broadcast setting, the viewer may have several alternatives.

In one alternative, in a real-time or live broadcast setting, the viewer may select and view an appropriate number of advertisements to view; or, after a set amount of time, the computer will select an appropriate number of advertisements to show (as described with respect to FIG. 2a above). As discussed above, if the viewer-selected commercials finish prior to the beginning of or resuming of a real-time broadcast, the viewer may be prompted to select more advertisements, or advertisements may be inserted to fill the time on a random, deterministic, head-of-the-line, or other basis. If the viewer-selected commercials have not finished prior to the time set for beginning or resuming of a real-time broadcast, the viewer may be prompted to either finish viewing the commercials (and record the real-time broadcast) or go straight to the content of the broadcast.

Other alternatives will be available in a recorded broadcast setting, and are described with respect to FIG. 2b above. In the first ("C" of FIG. 2b), the viewer selects advertisements from the updated playlist for instant viewing. These advertisements are played and when completed, the viewer is returned to the selected program.

The second alternative ("D" of FIG. 2b), is for the viewer to select that the advertisements be delivered at a later time. The viewer may select to have the advertisements made available after the program, or have the advertisements delivered to the viewer's e-mail or via another communication channel, and ultimately to the viewer's CPE/DVR hard disk for subsequent examination. The viewer is then returned to the selected program.

Finally, in the third alternative ("E" of FIG. 2b), the viewer may select the option indicating no interest in any of the available advertisements, and the viewer may return to the selected program.

AOS Feedback and User Input Mechanism—

In another embodiment, the advertisement options screen (AOS) is configured to enable a user to record opinions or preferences regarding the available advertisements, those recorded opinions enabling subsequent advertisements to be tailored to the viewer's opinion.

Figure 4:
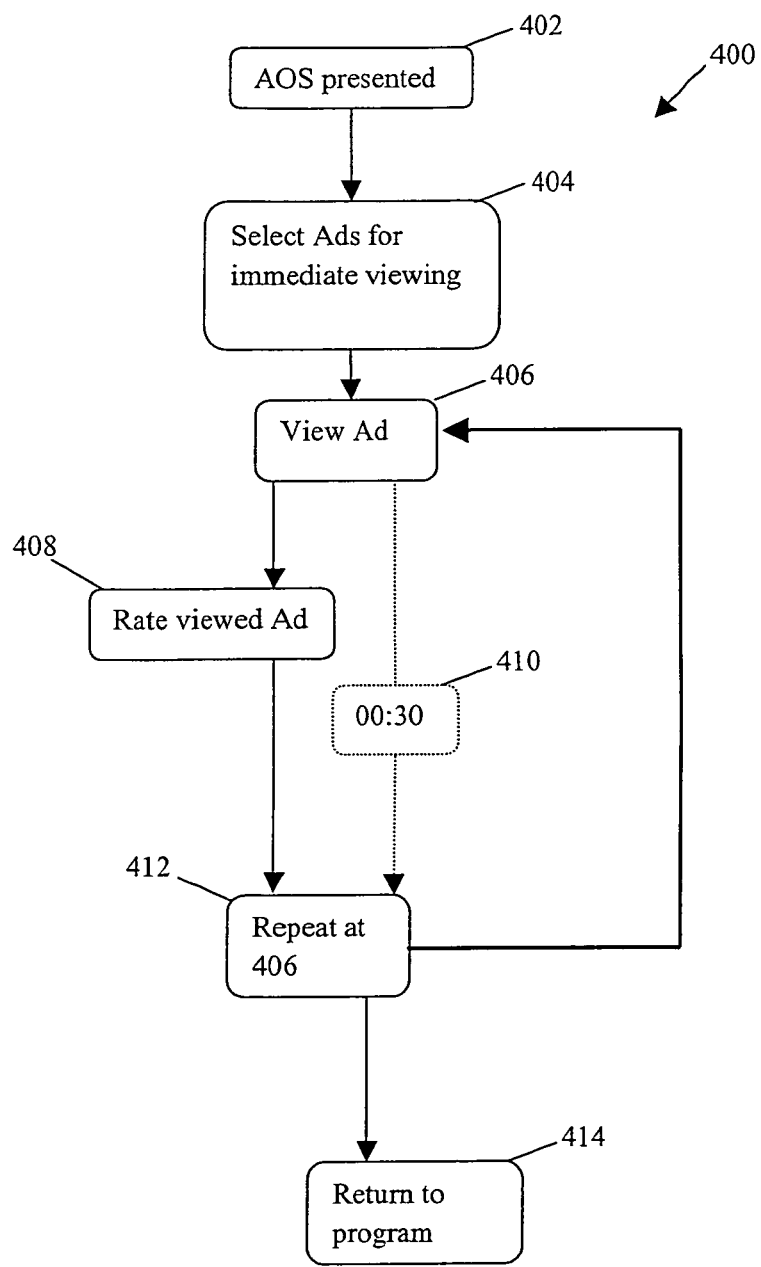
FIG. 4 is a flow diagram illustrating an exemplary method of eliciting viewer feedback or input regarding an advertisement.

An exemplary methodology designed to elicit viewer feedback is illustrated in FIG. 4. Per step 402, the viewer is presented with the advertisement option screen (AOS). As discussed above, this screen may appear at a various times during the viewing experience either in a recorded or real-time broadcast setting. The viewer is prompted at this screen to select advertisements for immediate viewing (step 404). The viewer may choose advertisements from the presented AOS playlist, or may choose advertisements after first searching the available advertisements based on certain criteria and receiving an updated playlist as described with regard to FIG. 3 above. The selected advertisements are then viewed per step 406. It is noted that the viewer may also chose to end an advertisement once it has begun via the above-described methods (including selecting an "x" located within the advertisement window). When the advertisement has ended, the viewer will be prompted to rate the advertisement per step 408 according to a predetermined rating scale or criteria. The rating system or criteria may include for example an option for the viewer to never view this advertisement or this type of advertisement again (e.g., "Don't show me again"). For example, if a viewer was shown a commercial for a Ford Mustang, the viewer may indicate that: (i) he/she liked the advertisement, and optionally would like to view other advertisements similar to it, or (ii) did not like the advertisement, and optionally would not like to view other advertisements similar to it. In one embodiment, the viewer may specify which themes, aspects or genre of the advertisement the viewer did or did not like. For example, the commercial for the Mustang may be themed as: (a) a car commercial, (b) a humorous commercial, and (c) a commercial employing a famous persona such as an actor or race car driver. After viewing the commercial, the viewer may determine that he would not like to view further car commercials, but would be (or continues to be) interested in humorous commercials, and those with that same persona. The exemplary computer program (AC) will then take the appropriate steps to evaluate the viewer's opinion or preferences, and implement this as a policy for future advertising for that particular subscriber. This includes removing and/or adding commercials to the user's playlist and suggesting other commercials which the viewer may be interested in, based on an algorithm within the AC which evaluates the user's preferences, demographics, or historical activity. Alternatively, when an advertisement has ended, if the viewer fails to respond to the prompts that permit the viewer to rate the commercial within a set period (00:30 seconds in the illustrated example), the program will automatically cause the next commercial to be played per step 410.

Moreover, the AC may be configured to receive user input as to their subjective rating of a given advertising or promotional element. This input may be used to inter alia generate a display or iconic representation of the collective or aggregate ratings of all users (or subsets thereof, such as all users in the same service group, the same zip code, matching the same demographic, etc.) which can be provided on the AOS or along with the advertisement itself, so as to assist users in selecting appropriate advertisements to view. For instance, in one variant, a user is presented with a rating window or screen, such as within the AOS, which allows them to rate the advertisement on a given scale (e.g., one through five stars) as to overall desirability, and optionally even submit more detailed input such as comments, or ratings one a plurality of aspects of the commercial (e.g., how humorous they thought it was, how well they liked the characters/famous persona, how interested they were in the product or service being advertised, etc.). This information may be stored locally and also transmitted upstream to a network server or other processing entity (even that of a third-party advertiser) in order to populate a database or the like with similar ratings from other users, somewhat akin to prior art web-based techniques for on-line ratings of various products and services. The accreted user rating data may be distributed dynamically to each user in the network (or at least those requiring an AOS screen or entry for that particular advertisement), and displayed iconically or otherwise on their display area, so as to in effect apprise that user of what everyone else who viewed the advertisement thought of it.

Such information can be of great utility from a user's perspective, since if they are fairly "mainstream" or nominal in their likes/dislikes, they can somewhat reasonably rely on the opinions of others generally similarly situated to avoid wasting time on viewing undesirable advertisements. Curiously, this disincentive may also work in reverse; i.e., if most everyone rates a given advertisement as very undesirable, then certain users may actually select it for viewing based thereon, i.e., "it must be SO bad that I have to watch it."

The user may also optionally be given an opportunity via the AOS or other user interface to select the pool or demographic from which their rating data is derived, so as to at least ostensibly derive as much benefit as possible from the ratings due to similar views of the chosen demographic. For example, in one variant a white female user may select other white female users as their rating pool. Alternatively, the aforementioned female user who is interested in fashion may select other users (irrespective of race or gender) who have also expressed an interest in fashion as her pool. In this manner, the user can adjust their pool based on the degree of correlation between how they rate certain advertisements and how their chosen pool rates them. If the correlation is poor, the user can select a new pool in an attempt to increase the correlation. The pool may also be selected automatically for the user; in one variant, the AC is adapted to automatically select a pool based on user demographics and/or historical data (e.g., types of interests, commonly watched programs, advertisement selections, etc.).

Additionally, the aforementioned user-based rating data is potentially of great value to advertisers or content providers, since it gives direct feedback from users as to how they perceive a given advertisement. Generally speaking, those who rate a given advertisement will have viewed at least part of it ("impression"), and therefore the advertiser can determine how well the advertisement was received within different sub-populations of a cable or satellite network's subscribers. This rating data can also be correlated with specific user demographics (whether anonymously or otherwise, as previously discussed) so that the advertiser can know for example how their advertisement performed with 20-30 year-old females for example. The MSO or network operator may also sell this information back to advertisers under one exemplary business model.

Per step 412, the computer program will repeat to step 406 for each commercial which is to be viewed; that is, the computer program will enable the next commercial to be viewed, and then prompt once again for the viewer's feedback. Once all of the commercials have been viewed and/or rated, the viewer will be returned to the recorded or real-time broadcast program per step 414.

AOS Profiles—

Figure 5:
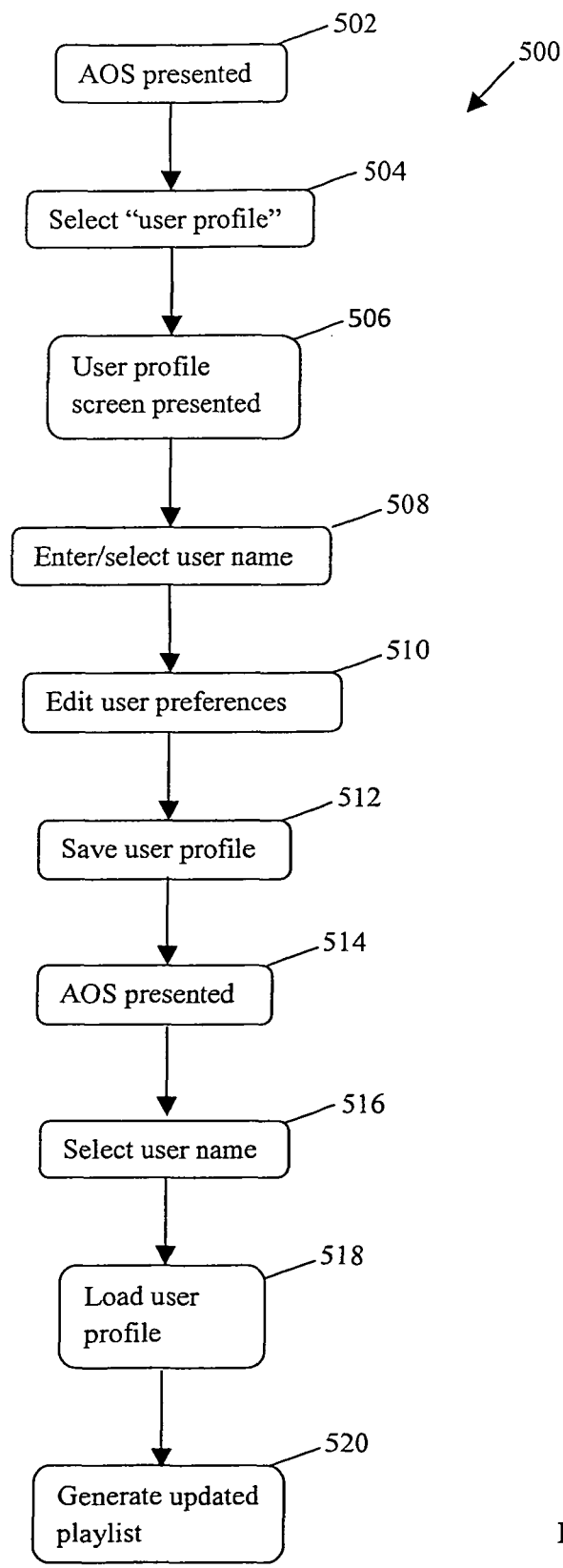
FIG. 5 is a flow diagram illustrating one embodiment of the method by which a viewer establishes a user profile, and the viewer's user profile is utilized to generate a playlist of targeted advertisements.

Another model for specifically tailoring or targeting the advertisements that are available to a viewer may include incorporation of viewer entered profiles, the method for which is now described with respect to FIG. 5.

FIG. 5 is a block diagram illustrating one exemplary method 500 by which a viewer establishes a user profile. According to this method 500, a viewer is presented the advertisement options screen (AOS) per step 502. As discussed above, the AOS may appear at various times during a viewer's session including before the real-time or recorded broadcast program, after the real-time or recorded broadcast setting, at the first instance of a commercial, and/or at every instance of a commercial. The AOS is in this embodiment adapted to include a "user profile" option, which, per step 504, the viewer may select. The viewer is then taken to the user profile screen per step 506. The user profile screen is adapted to permit a user to enter a user name per step 508. However, it will be appreciated that other methods of recognizing a user may be implemented, such as an image, a password, or other identifier. Moreover, the user can be anonymously identified if desired via their CPE; see the discussion presented subsequently herein regarding preserving subscriber anonymity.

In the user edit mode, the viewer will have previously entered a user name (or other identifier) and saved a profile. According to this mode, the user will select his/her user name (or other identifier) from a list of previously saved user profiles, rather than entering a user name in step 508. The viewer then, in step 510, proceeds to edit the user preferences. It is in this section that the user may designate the particular commercials he/she would prefer to view and those which he/she would prefer not to view, this designation may be based on the product or service offered, the advertiser itself (i.e. the company), or the theme of the commercial. The user may also enter other information which will be utilized by the advertisement delivery computer program (AC) to generate targeted advertisements. This information may include, inter alia, gender, age, zip code, occupation, household income, marital status, hobbies, recent large purchases, etc. Once the viewer has completely entered/edited the user preferences per step 510, the user may save the information in a user profile per step 512.

Next, the viewer is directed back to the AOS at step 514. The AOS of the illustrated embodiment is adapted to permit a viewer to select, from a list of previously saved user names, his/her particular user name per step 516. This causes the advertising controller (AC) to load the viewer's user profile per step 518 as previously entered (step 510 above). Next, the advertising controller (AC) program utilizes the viewer's user profile to generate targeted advertisements in an updated playlist per step 520. It is at this point that the viewer may determine whether to select any of the advertisements from the playlist for viewing, or subsequent delivery or select the option not to view any of the commercials.

In instances where a viewer has previously entered his/her user name and generated a user profile as described above, the viewer, once directed to the AOS, will effectively be placed at step 514 of the method described above. The viewer is presented with the AOS at step 514; then, the viewer will select his/her previously entered user name per step 516. At this point, the program will load the viewer's user profile at step 518, and generate an updated playlist based on preferences saved to that user profile.

The AC of the present invention may also be configured to utilize two or more profiles, or a composite profile, as a source for generating playlists (or other functions relating to advertisement selection). For example, it may be that two or more people are watching television, such as a husband and wife, each with different preferences and individual profiles. In one embodiment, a multi-person profile can be created (e.g., "Rob & Carol's profile"), wherein input is solicited from multiple parties as to demographics, preferences, opinions, etc. From this information, a composite profile is made wherein the AC attempts to maximize correlation with all of the preferences/demographics for each person. As a simple example, suppose that the aforementioned husband specifies that he prefers sports-related themes. Also, the wife specifies that she enjoys humorous themes. Based on this information, the AC would perhaps select a humorous sports-related commercial for inclusion on the targeted playlist.

To the degree that the profile components for each person conflict (for instance, where the husband specifies that he likes sports themes, and the wife specifies that she specifically does not want to see sports themes), the AC may resolve the contention based on a time-shared approach, such as where the logic of the AC purposely alternates selections between the contending elements so as to attempt to at least partly appease all constituents of the profile.

Obviously, more sophisticated selection algorithms may be employed, including for example those based on statistical models, those based on linear or numeric variables (e.g., subscriber rates preferences on a 1-to-10 scale), or even on fuzzy or similar variables (e.g., "high", "medium", "low", etc.).

In another variant, each user maintains their own profile (no composite profile is created per se), and the AC draws from the two or more profiles designated by the user(s) to generate its selection recommendations based on similar algorithms to those used for the composite profile embodiment (i.e., maximization of correlation to as many elements of each profile as possible).

Multiple and Alternate Delivery Paradigms—

As previously described, when the viewer selects a particular advertisement to view, the content of that advertisement is delivered to the viewer's television or other viewing apparatus. In one embodiment, the content which is accessed by selection of a particular advertisement by a viewer is stored on the hard disk drive (HDD) or flash memory (e.g., NAND flash) of the viewer's recording apparatus (DVR, PVR, etc.), whether it is used in the recorded broadcast setting or in the real-time broadcast setting. Alternatively, the content may be stored at a headend or other network apparatus (e.g., hub server), such as in the co-owned U.S. application Ser. No. 11/811,953 filed Jun. 11, 2007, entitled "METHODS AND APPARATUS FOR PROVIDING VIRTUAL CONTENT OVER A NETWORK", and issued as U.S. Pat. No. 8,024,762 on Sep. 20, 2011, which claims priority to U.S. Provisional Application Ser. No. 60/813,479 filed Jun. 13, 2006 of the same title, each incorporated herein by reference in their entirety. As described therein, virtual content management architecture (VCMA) comprising one or more servers is utilized to provide a remote and physically secure storage facility which is helpful in, inter alia, preventing the theft or surreptitious access to the copyrighted and valuable content owned by the users/purchasers. The VCMA structure is also helpful in maintaining the availability of the hard drive of the consumer's device for consumer selected recorded content rather than advertisements.

Stored Links—

In another aspect of the invention, advertising content stored on the user's DVR or similar recoding device (or alternatively a network storage device such as a nPVR function or web server) is linked to a graphical user interface (GUI) or other such user interface which allows a user to select the advertisement for viewing directly. These links, which may comprise for example a simple directory or network reference (e.g., URL hyperlink) allow the user to directly access advertising content when they want to view it, or obtain more information. This linking information can be personalized and segregated as to a particular user (e.g., "My Links"), and stored within a directory on the DVR or network storage device specific to that user or account.

In one embodiment, the exemplary "My Links" function is adapted to download and store advertisement content to a designated storage device including, inter alia, the user's DVR, a network PVR entity, etc. According to this embodiment, the content is logically connected to a link which appears in the AOS playlist. The "My Links" content would also be adapted to be self-updating when the stored content has "expired" or become obsolete or defective/corrupted.

In one example, when a viewer views a recorded program (or a program retrieved from an nPVR or VOD server), a set of advertisement content is automatically retrieved and stored based on user preferences. In other words, when the viewer requests that content be recorded or a program be obtained from an nPVR or VOD server, the viewer is presented with an AOS screen which enables related network (e.g., headend) entities to determine which advertisements should be simultaneously sent to the viewer. The advertisement content is automatically stored to the user's DVR or other storage device associated with the CPE (or stored in a user-specific areas of the network storage device for retrieval by the viewer).

If the viewer has established a user profile, that profile may be used to generate the advertisements that accompany the content as described elsewhere herein.

Alternatively, metadata embedded in the program content may be utilized to extract advertisements related to the content of the program.

In yet another alternative, the advertisements may be specifically selected by the user at the AOS screen; the advertisements presented at the AOS screen may be selected based on the aforementioned criteria as well. In the instance where the viewer does not select any advertisements at the AOS screen, the AC may randomly generate an appropriate number of advertisements. Then, when the viewer views the program, the viewer is confronted with the AOS screen once again; this may occur at the beginning of the playback, at the first commercial break, and/or at every instance of a commercial break. At this screen, the user is able to directly interact with the advertisements by selecting one or more of the "My Links" listed. Selection of a link connects the customer with the previously stored advertisement content and display of that content begins.

The abovementioned embodiment may also be advantageously used to require a viewer to view any number of the available advertisements before the viewer may view the recorded content. Accordingly, the viewer must select the appropriate number of links to view. After the advertisements have been viewed, the viewer may be given an option to seamlessly view the entire recorded content without further commercial interruption.

In another example, while a viewer is viewing a live broadcast, the user's selection of which advertisements to view at the AOS screen triggers the automatic download of URLs and/or advertisement content to the "My Links" section of the viewer's storage device (or network storage device). Alternatively, the system may require the user to affirmatively agree to the download of the URL and/or content to the storage device. This mechanism effectively gives the viewer at least two instances to view the advertiser's materials, first during the viewing of the advertisement during the live broadcast, and then a second time when browsing the "My Links" section of the storage device. It is further contemplated by the present invention that the storage device may be adapted to automatically display the "My Links" section previously described prior to admitting a user to access other stored content; e.g., a menu or pop-up display window that shows the user information such as that shown on the AOS previously described (e.g., thumbnails, text descriptions, the link itself, etc.). There again, the viewer would be brought into contact with the advertiser's content to at least some degree.

In another embodiment, when a viewer selects a particular advertisement to view (such as via the aforementioned AOS), the viewer is taken (whether immediately or at a later time, such as when that advertisement is played), via an Internet or other network connection, to a web page or site. The viewer may navigate the page as well as view a commercial or advertisement for a particular product. In one embodiment, the URL may be a link to the advertiser's home page, or to a separate commercial containing page, or a video storage location. See, e.g., co-owned U.S. patent application Ser. No. 11/198,620, entitled "METHOD AND APPARATUS FOR CONTEXT-SPECIFIC CONTENT DELIVERY" filed Aug. 4, 2005, and issued as U.S. Pat. No. 9,286,388 on Mar. 15, 2016, incorporated herein by reference in its entirety, wherein methods and apparatus for providing contextually-related "secondary" content (e.g., advertising messages, useful informational links, etc.) in association with other primary content selected by the user, is disclosed. In one exemplary embodiment, the aforementioned methods and apparatus further improve over prior art network access and advertising techniques by providing a seamless visual integration/transition from the primary content (e.g., movie) to the secondary content (e.g., advertising or informational links). In one embodiment, instead of placing the returned secondary content in an ancillary position around the primary content (e.g., video player window), the secondary content is placed within the display context of the primary content itself. The two different contents (e.g., encoded video & XML advertising) further are configured to appear as a single, integrated and seamless visual experience. This approach increases user satisfaction in a number of ways, and increases the effectiveness of the parent network site and secondary advertising content, thereby increasing revenue to the MSO.

The advertising controller (AC) may also be adapted to automatically cause the download of URL and/or advertisement content to a viewer's storage device when the viewer establishes his/her user profile. The downloaded links or advertising content may be related to the various user preferences discussed above.

Further, the AC software may also be advantageously adapted to automatically update the downloaded URL and/or advertisement content stored: (i) as a particular viewer changes his/her user preferences; (ii) as user demographics or subscription level changes; (iii) as the content/links expire or become topically dated (e.g., advertisements related to sports events which have only a short lifetime) or their network location changes; or (iii) the MSO decides to alter the version of an advertisement already downloaded (e.g., to extend it, shorten it, present it in a different encoding or format, etc.).

Use of Metadata—

As previously indicated, metadata of the type well known in the computer programming arts may be utilized in the various embodiments of the present invention to allow for even more precise targeting of one or more subscribers according to the correlation between different types of content (e.g., program content and advertisements), the subscriber's demographic or psychographic profile, historical data, etc.

Generally speaking, "metadata" comprises extra data not typically found in typical primary content (or at least not visible to the users of the network). For each component of primary content (e.g., video/audio program stream) and/or advertising, one or more metadata files are included that specify the relevant search terms or primitives for that content. This metadata can be provided with the content from its source or provider (e.g., a network studio or station, advertiser, third party marketing firm, etc.), or alternatively added by the network operator or MSO. Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

The metadata information of the exemplary embodiment is packaged in a prescribed format such as XML, and associated with the program and/or advertising content to be delivered. The exemplary metadata comprises human-recognizable words and/or phrases that are descriptive of or related to the content of the program or advertisement in one or more aspects ("contextually related") to the content. In the illustrated embodiment, the metadata is made human-readable to facilitate easier generation and searching; however, this is not a requirement. For example, in some cases, it may be desirable to encrypt the metadata so as to prevent unauthorized access. Alternatively, unencrypted but non-human readable data can be used, such as where the metadata is encoded in hexadecimal or binary, or any other number of different coding schemes.

The metadata may, depending on its application, include inter alia data indicating the length of the commercial, coded format, themes of the advertisement, and the useful lifetime ("shelf life") of the commercial. For example, certain topical advertisements that relate to current events or the like will only have a limited lifetime, and if aired too far before or after the relevance of the current event, may actually detract from user satisfaction and cause a negative or deleterious effect on the advertiser's penetration.

In one embodiment, a metadata file resides at the location of each requested program or advertising content element, such as on a subscriber's DVR within a related directory. Alternatively, the metadata may located at a different place, such as a network server or storage device.

The naming convention of the exemplary metadata file is optionally standardized so that it is easily locatable. All of the metadata files are rendered in the same format type (e.g., XML) for consistency, although heterogeneous file types may be used if desired. If metadata files are encrypted, then encryption algorithm information of the type well known in the art is included. The foregoing information may be in the form of self-contained data that is directly accessible from the file, or alternatively links or pointers to other sources where this information may be obtained.

Exemplary uses of the aforementioned metadata in the context of advertisement selection are described in co-owned U.S. Provisional Application Ser. No. 60/995,655 filed Sep. 26, 2007 and entitled "METHODS AND APPARATUS FOR USER-BASED TARGETED CONTENT DELIVERY", incorporated herein by reference in its entirety. As described therein, information regarding a particular viewer may be obtained a myriad of ways. The information may include personal attributes or characteristics, such as without limitation name, address, age, race, ethnicity, gender, anatomical dimensions such as weight or height, physical or mental conditions, marital status, family size, number of dependents, sexual orientation, religious persuasion, political affiliation, net worth, income, types and number of automobiles owned, country of citizenship, languages spoken, occupation, hobbies, and personal preferences. The information may also include psychographic or behavior-centric information. Advertising or promotional content is then matched or selected for potential use via its metadata to a particular user or set of users. The MSO can further optimize the efficacy of the targeting process by evaluating metadata associated with program content that is broadcast at the proposed channel/time coordinates to determine if there is tangency or correlation to the content of the advertisement ("context matching"), as previously referenced herein.

Metadata of the commercials or advertisements may also be utilized to target advertisements to particular viewers via information entered directly by the viewer, see for example discussion of FIG. 5 above. As discussed above, a viewer may indicate that he would or would not like to receive advertisements for particular goods or services, or from a particular company. The advertisement delivery computer program (AC) would then utilize the viewer criteria and metadata associated with paid advertisers' commercials to match advertisements to the viewer criteria. A playlist is then generated from which the user may select advertisements to view tailored to his entered criteria. Likewise, the viewer may select or choose to have blocked particular advertisements based on the other themes associated with the advertisement, for example adult-theme commercials, sad or heartwarming commercials, holiday commercials, and movie trailers, etc. The AC similarly utilizes the viewer-entered theme criteria and metadata associated with paid advertisers' commercials to match advertisements to the viewer theme criteria in order to generate a playlist from which the user may select advertisements.

The metadata of advertisements in a real-time broadcast setting may be compiled at any time prior to the broadcast, because advertiser's slots will generally have been paid for ahead of the broadcast, and a schedule of advertisements will be known. Further, combinations of random and purposely selected commercials to fill predetermined breaks may be formed prior to broadcast as well.

The metadata of advertisements in a recorded broadcast setting, on the other hand, may be compiled as the content is recorded, at any time prior to recording, or at the time of playback. Also in a recorded broadcast setting, metadata regarding the lifetime of a commercial may be used by the enhanced advertisement delivery computer program to indicate when a commercial is no longer temporally relevant and thus must be updated. The AC may assess the metadata regarding lifetime of the commercials in a playlist; or, in another embodiment, prior to generating a playlist. The AC utilizes this information to determine whether a commercial may be added directly to a viewer playlist, or whether the commercial must first be updated.

In one variant, the exemplary advertising controller (AC) periodically or situationally polls the DVR for metadata or file data (e.g., file creation or modification date, etc.) to determine whether a given advertisement is outdated or needs replacement. This information can also be retained by the AC at time of delivery, thereby relieving it and the DVR from having to establish a communication channel and utilize bandwidth and other resources to communicate. However, the former approach has the advantage of knowing the actual condition of the DVR at the time of request; e.g., the subscriber may have deleted the advertisement files in the interim, thereby making the AC-retained information inaccurate as to the current status and contents of the DVR.

As yet another alternative, the DVR can periodically log its content and/or changes to a local or remote log file, such as one maintained by the AC, a third party server, or even the CPE 106, and the AC can access this log file irrespective of the DVR condition or status.

As an illustrative example of the foregoing content replacement functionality, assume a commercial with metadata indicating a lifetime of three (3) months from inception or creation date on the playlist of a program which a viewer recorded on January 1st. Each time the viewer plays the recorded program and the AOS is displayed, the AC will assess the commercial's 'expiration date' and will choose to add the commercial to the AOS playlist if it has not yet expired (assuming all other criteria are met). Thus, if the viewer plays the program on February 1, the commercial will be inserted in the playlist.

However, when the viewer decides to play the recorded program on April 1, the AC will determine that the commercial has expired. In this instance, the AC will inform other headend or network entities that the commercial has expired and request an update (and/or search for an updated version in local storage if appropriate). Once the commercial is updated, the updated advertisement will be placed on the AOS playlist. If the update cannot be completed in real time for assembly of the playlist, then a suitable substitute will be identified by the AC (e.g., something of similar genre, content, manufacturer, etc.).

The foregoing commercial updating method may also be advantageously utilized in situations where commercial advertisements were saved by a viewer to a separate file on the viewer's CPE 106 (e.g., DVR) as per the descriptions of alternatives D and G in FIGS. 2b and 3 respectively.

Control and Tracking of Impressions—

As described elsewhere herein, the network operator utilizing various embodiments of the present invention can also optionally control and track the type of viewer experience or impression for a given advertisement, such as using the methods and apparatus described in the co-owned U.S. Provisional Application Ser. No. Ser. No. 60/995,655 entitled "METHODS AND APPARATUS FOR USER-BASED TARGETED CONTENT DELIVERY, previously incorporated herein. As described therein, the MSO can track the behavior of one or more viewers during the broadcast of the advertisement using any number of different approaches. Thus, if the viewer changes channels or pauses (e.g., VoD or nPVR) in the middle of the advertisement, this is perceived by the operator (and hence advertiser ultimately) to indicate somewhat affirmatively that the viewer is not interested in the advertised or promoted product or service (although the pause or change may be due to other circumstances such as emergency, accident etc.).

Another salient advantage is the ability (if desired) to utilize feedback or indirect information relating to user impressions that varies in confidence level, and the ability of the MSO and/or advertiser to make use of this information. For example, an affirmative channel switch during an advertisement is considered a reliable and high-confidence indication of no interest by that viewer in the material broadcast. The converse, however, is much lower confidence; i.e., that fact that the viewer did not switch the channel during the advertisement does not necessarily mean that the viewer is interested; they may have simply been distracted, ambivalent, or too lazy to pick up the remote and change it. In this instance, other indicia of a user actually viewing an advertisement (impression) versus merely being tuned to it and having no cognizance thereof, may be utilized consistent with the invention, such as e.g., an interactive client application such as the client portion of the AC.

Specifically, in one embodiment, the AC logs all subscriber selections or inputs to the AC client portion for contemporaneous or subsequent transmission up to the network (e.g., the network portion of the AC). For instance, the user entering a "don't show me this again" command via their CPE midstream in a given advertisement may be considered an affirmative indication that (i) the user actually viewed at least part of the advertisement, and (ii) had no interest in, or even a negative reaction to, the advertisement. This type of information is highly valuable to the advertiser (as well as the MSO), the latter being able inter alia to sell such information back to the advertiser for consideration.

Conversely, if the subscriber repeatedly watches an advertisement (e.g., hits "rewind" during the advertisement and watches it again), this is affirmative data indicating an impression, and the advertiser/MSO may even divine that the user has some level of interest in the product or service being offered (or at least they found some aspect of the advertisement compelling).

Similarly, information as a given subscriber's preferences for what they want to see is valuable data for the advertiser (and MSO) as well. By logging all of the subscriber's inputs to the AC client portion, and also logging all tuning (channel change) events, power up/down events, VoD session requests and trick mode commands, etc., the MSO can much more accurately determine a given subscriber's preferences and actual impressions of certain advertisements. The MSO and/or advertiser in effect know much more definitively what a specific user's preferences/interests are, rather than passive approach where MSO attempts to divine what the subscriber's interests are based on evaluation of their tuning habits, demographic information (e.g., age, income, etc.) alone.

For example, under the prior art approach, an MSO or advertiser might conclude with a high level of confidence that a given subscriber would enjoy subject matter (advertising, programs, etc.) associated with golf, since that subscriber's demographic profile indicates that they have a very high income, live proximate to several country clubs, are retired, etc. However, that same subscriber may actually have no interest in golf whatsoever, and hence the passive prediction techniques of the prior art would yield an erroneous result. In contrast, the "active" approach of the present invention (i.e., where the subscriber actually selects which types of advertisements or promotions they wish to view and not view) provides a more error-free result; if the subscriber affirmatively indicates that they want to see golf advertisements, the assumption that they in fact do enjoy golf is much more reliable.

Subscriber Anonymity—

It will be recognized that various aspects of the present invention are best implemented by having user/CPE-specific data. To the degree that the AC or optimization process utilizes subscriber-specific or CPE-specific data in its operation (such as for receiving subscriber preference data for playlists, determining the aforementioned demographic/psychographic profile of a CPE/subscriber on the network, and gathering historical tuning or other operational data such as power on/off times, CPE capabilities, VoD session commands, etc.), such data can optionally be protected so as to maintain subscriber privacy. For example, the MSO might use a mechanism to anonymously identify and associate the aforementioned data with particular CPE (and hence individual subscriber accounts). In one embodiment, subscriber identities are optionally protected by hashing or encryption of the tuner address or the like prior to logging and storage. The stored "hashed" address or other parameter (e.g., TUNER ID) and associated events are therefore not traceable to a particular user account. The resulting obscured tuner address is repeatable so the necessary tuning location and user activity tracking may be performed while still maintaining complete anonymity. Alternatively, all or portions of the user-specific (albeit anonymous) information may be stripped off before storage of the activity or configuration data within the historical database. See, e.g., co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, for exemplary implementation of such anonymous mechanisms. Accordingly, the MSO (or AC itself) can evaluate individual CPE 106 according to an activity, preference, or configuration analysis gleaned from that particular CPE (i.e., on a per-CPE basis) if desired. The targeted advertising previously described can also advantageously be performed anonymously; i.e., the MSO or AC may know that a given CPE 106 identified by a given hash is requesting a program stream or advertising content, and that per the MSO database, the CPE with that hash is in the over-40, golf-watching, white male demographic, but not who the particular subscriber is or where there premises is located.

Advertising Controller (AC) and Software Architecture—

Figure 6A:
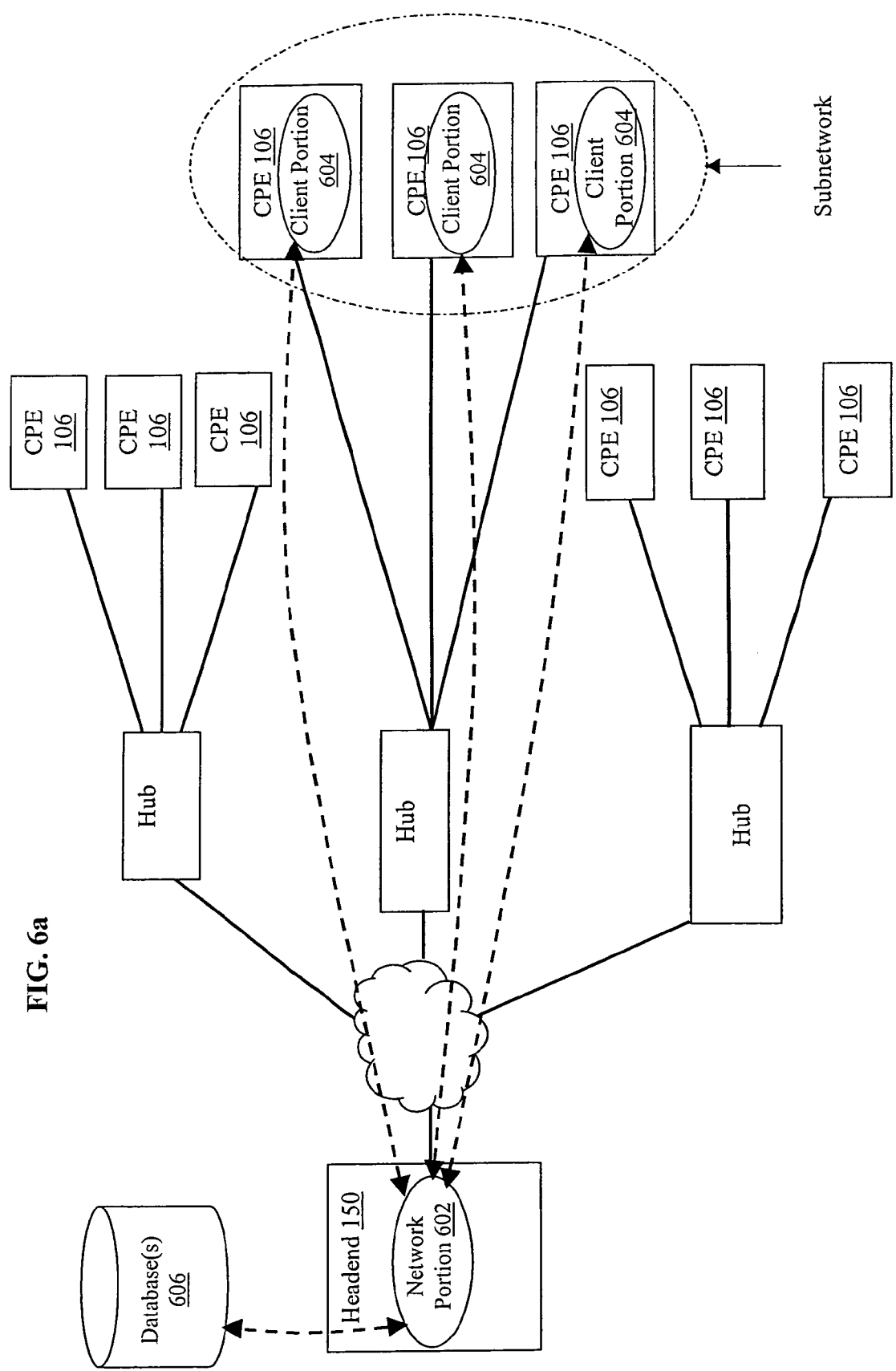
FIG. 6a is a block diagram illustrating a first exemplary embodiment of a network software architecture according to the present invention.
Figure 6B:
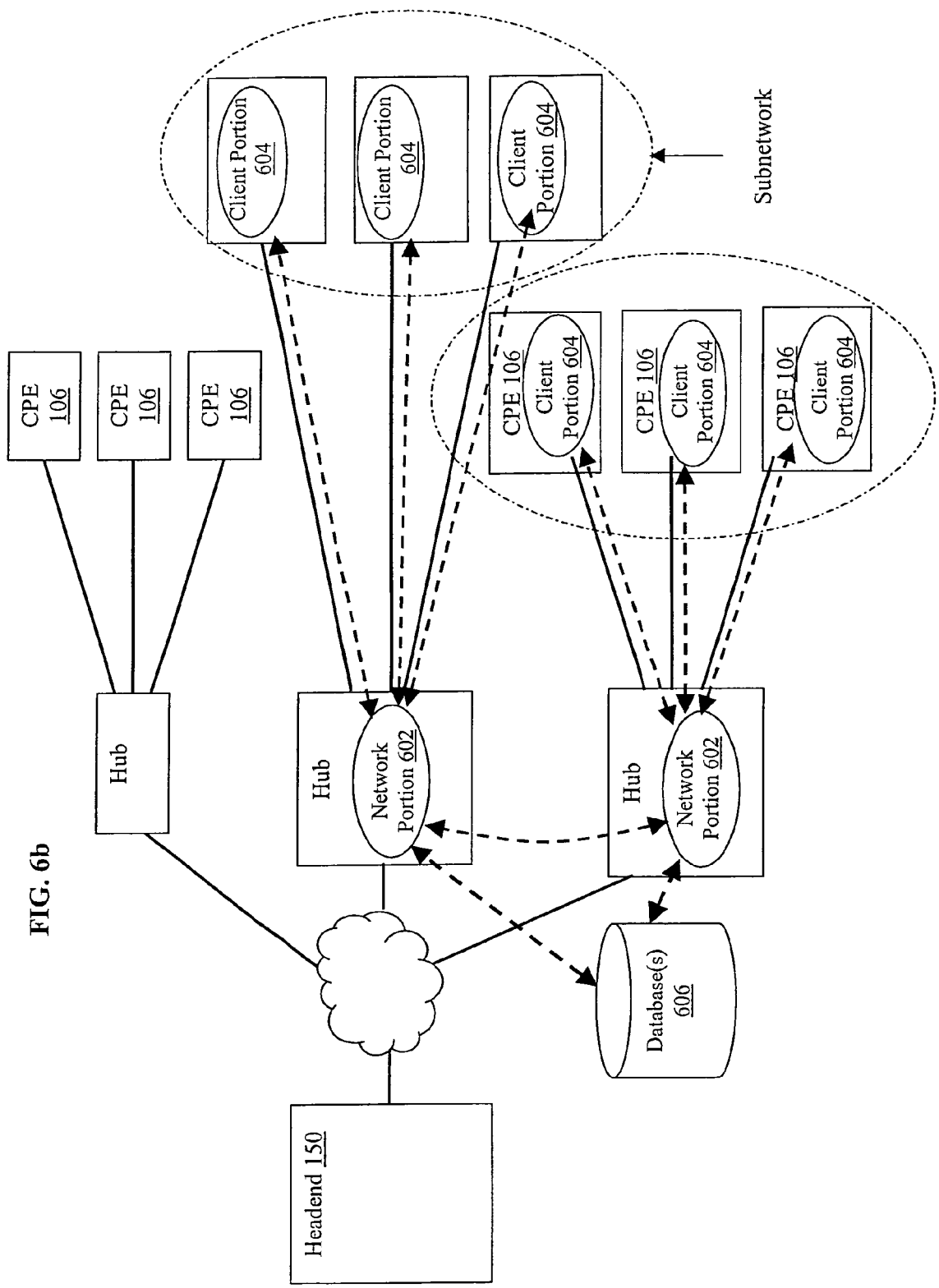
FIG. 6b is a block diagram illustrating a second exemplary embodiment of a network software architecture according to the present invention.
Figure 6C:
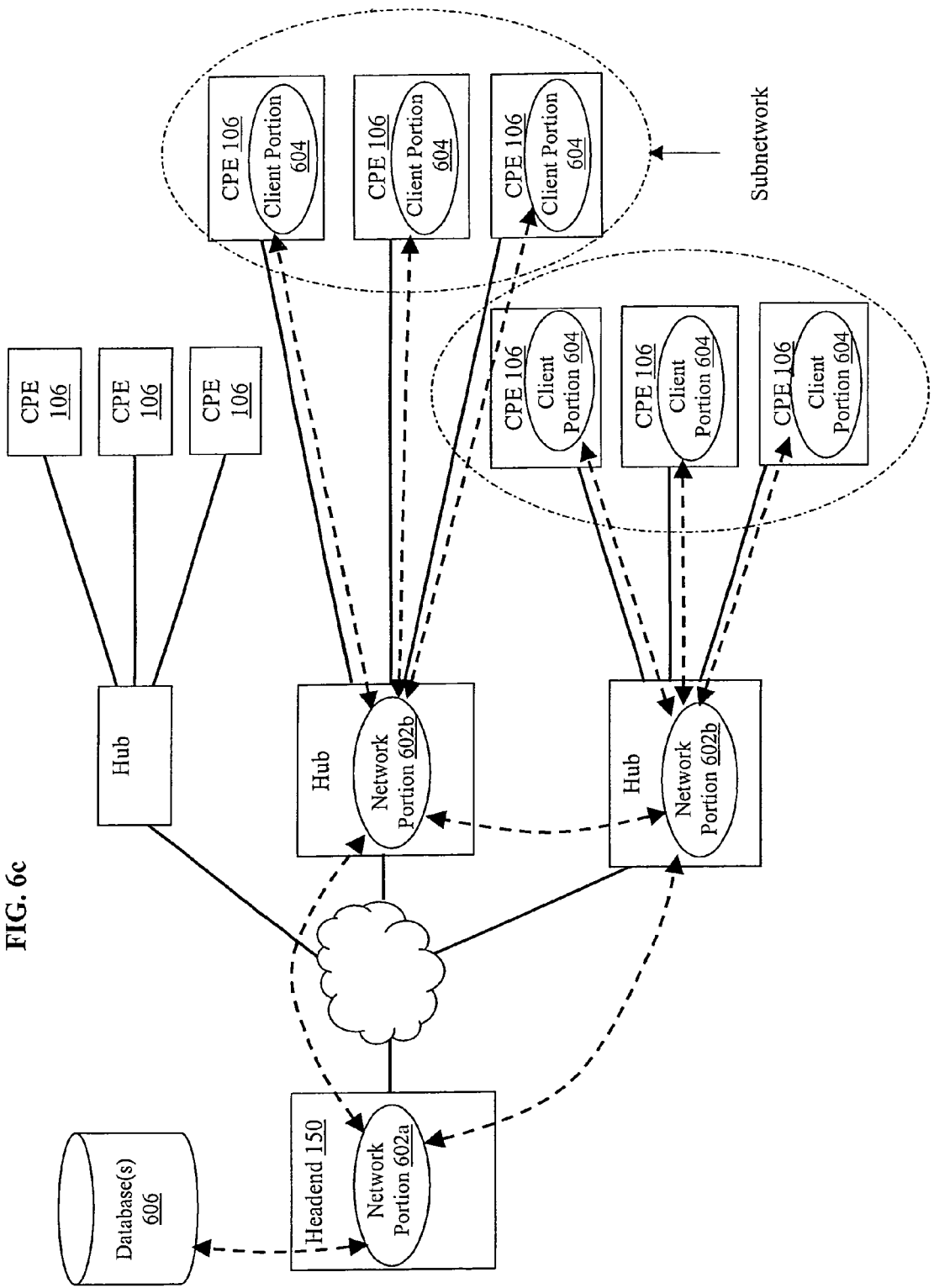
FIG. 6c is a block diagram illustrating a third exemplary embodiment of a network software architecture according to the present invention.

Referring now to FIGS. 6a-6c, various exemplary embodiments of the advertising controller (AC) software architecture are described in detail. It will be recognized that while these exemplary embodiments are described in terms of one or more computer programs, the functionality of the invention may be implemented in software, firmware, and/or hardware as desired, the invention being in no way limited to software running on a computer processor.

Moreover, while four exemplary embodiments are described herein, other variations and combinations of the following architectures may be utilized depending on the desired attributes and network topology in use.

As shown in FIG. 6a, a first embodiment of the architecture comprises a network process 602 of the AC, which effectively functions as a supervisory process, and is in logical communication with one or more databases 606 (e.g., advertising database, subscriber database, etc.), as well as other network equipment and processes (not shown) as well as one or more client processes (AC client portions 604) in order to effectuate the AC process methods and policies as previously described. For example, in one variant, the AC network portion 602 is in direct or indirect communication with a BSA switching hub process, network PVR system, or VoD server (not shown) in order to implement advertising display and replacement policies. The aforementioned network portion 602 may for example be combined with other network management entities (such as a headend VOD server 105 or application server 104, the entity 198 of FIG. 1c previously described), or may be stand-alone in nature.

The headend or network AC portion or process 602 in logical communication with client (e.g., CPE) portions 604 disposed on all or a subset of the CPE within the network. Such subsets may be organized based on subnetwork/node as shown, or using another scheme. These client portions 604 act as remote proxies for the headend AC process 602, allowing the MSO to control at least aspects of the operation of the CPE 106 having such client portions 604, including notably the collection of user preference and inputs regarding advertising, CPE configuration information, as well as historical data and tuning information from the CPE. The AC client portion 604 is also responsible for the generation of the AOS and other support functions which permit the selection and insertion of relevant advertising for the subscriber associated with that CPE 106. This approach has the advantage that the MSO can gather much more accurate and relevant information about an individual subscriber and CPE, including the operation thereof over time. For example, the headend AC process 602 can periodically poll the client portions to determine operational status, what channel is currently being tuned to, advertisement expiration status, any updates to user preferences, recent errors that have been logged (e.g., inability to play a certain format of content, resource contention, etc.), and even invoke corrective action if desired. For instance, such corrective action might constitute download of a new updated advertisement as previously described herein, population of a directory with relevant URLs for associated advertisements (such as "My Links" described above), and/or destruction of an existing advertisement or associated application on the CPE. Modifications or upgrades to the middleware or monitor application can also be performed based on data gleaned from particular CPE. The client portion 604 can also be used to generate notifications, interactive displays or queries on the user's display device or other output device as previously described (e.g., AOS, request for input regarding subscriber preferences, selection options, customer service interfaces such as chat-based help, etc.). Hence, the client portion 604 of FIG. 6a advantageously provides the MSO with a "point of presence" within each CPE.

As shown in FIG. 6a, not all "subnetworks" in the network need be included within the purview of the AC 602; rather, the methodologies previously described may be implemented on a per-subnetwork (or per-node) basis if desired, although clearly the entire network can be included as well.

FIG. 6b illustrates another embodiment of the software architecture of the invention, wherein the network portion 602 (and associated database(s) 606) is disposed at a network hub as opposed to the headend. This approach has the advantage of, inter alia, decentralization of advertising selection and provision functions. In effect, each hub can operate largely independent of the others, and latency in providing information requested by a CPE 106 (e.g., advertising material, URLs, etc.) is reduced. Moreover, failure of certain components such as the AC network portion 602 will not affect other hubs in the network. Each such hub can also be provided its won dedicated database(s) (not shown), which can be smaller and may be more rapidly accessed and utilized by the AC 602. The individual hub portions 602 may also be placed in communication with one another, thereby coordinating efforts or exchanging information if required.

Referring now to FIG. 6c, yet another embodiment of the software architecture is disclosed, wherein both client portions 604 and headend/hub network portions 602a, 602b are utilized. This hybrid approach provides essentially all of the benefits of the embodiments of FIGS. 6a and 6b previously described, yet at the price of somewhat greater complexity. Moreover, in the event of a failure or problem with the headend AC portion 602a, the individual hub portions 602b can continue to operate (and optionally communicate with one another directly), thereby providing a degree of fault tolerance and redundancy.

It will be recognized that in certain implementations of the AC (and other) software processes described above, there is a finite processing time required to process relevant information in order to provide the requisite output (e.g., selection of a particular option, matching of program content metadata to advertisement metadata, evaluation of demographic or user preference data to attempt automatic matching/selection for a subscriber, etc.). However, there is also a desire by the network operator to mitigate any discontinuities or latencies associated with servicing subscriber requests, and hence a tension between servicing the request immediately and performing sufficiently detailed evaluation of the different advertising options so as to make the implemented option(s) as effective as possible from an advertising penetration and impression (and hence revenue/profit) perspective.

Accordingly, in one embodiment, a pre-fetch mechanism of the type well known in the digital processor arts can be employed, such as where subscriber preference, metadata, demographic, etc. data associated with a given advertisement, program or CPE 106 can be fetched and locally cached in advance of an impending advertisement decision point or selection process. For example, a look-ahead function can be used within recorded content to identify portions of the content where an insertion decision will be required by the AC, and the data necessary to make such a decision obtained and pre-processed so as to eliminate any significant latency. Accordingly, the aforementioned data necessary for the AC to perform its evaluation and selection may be fetched and cached for a period of time (or until another event occurs allowing de-caching, such as a power-off event or the like), so as to expedite the AC calculations. Myriad pre-fetch schemes will be recognized by those of ordinary skill provided the present disclosure.

Displaying the Ad Options Screen (AOS)—

The advertisement options screen (AOS), as discussed previously, comprises a user interface generated from inter alia the compilation of metadata regarding the scheduled commercials by the AC running on the viewer's CPE and/or network entity. The exemplary AOS is comprised of (i) an advertisement playlist (the generation of which is described below), (ii) a user profile selection option, and (iii) an advertisement criteria search option.

The AC is also adapted to recognize the selection of "trick mode" functions such as rewind, fast forward, pause, etc. during commercial content. When the AC identifies these events, it triggers the necessary logic as previously described herein with respect to FIGS. 2-2c, etc., including e.g., display of the AOS.

Generating and Displaying Advertising Playlists—

The AC has numerous functional aspects including, inter alia, generating and displaying advertisement playlists. The generation of advertisement playlists is now described with respect to the exemplary embodiments of FIGS. 7a-7b, although it will be appreciated that these embodiments are but one possible implementation of the AC logic.

Figure 7A:
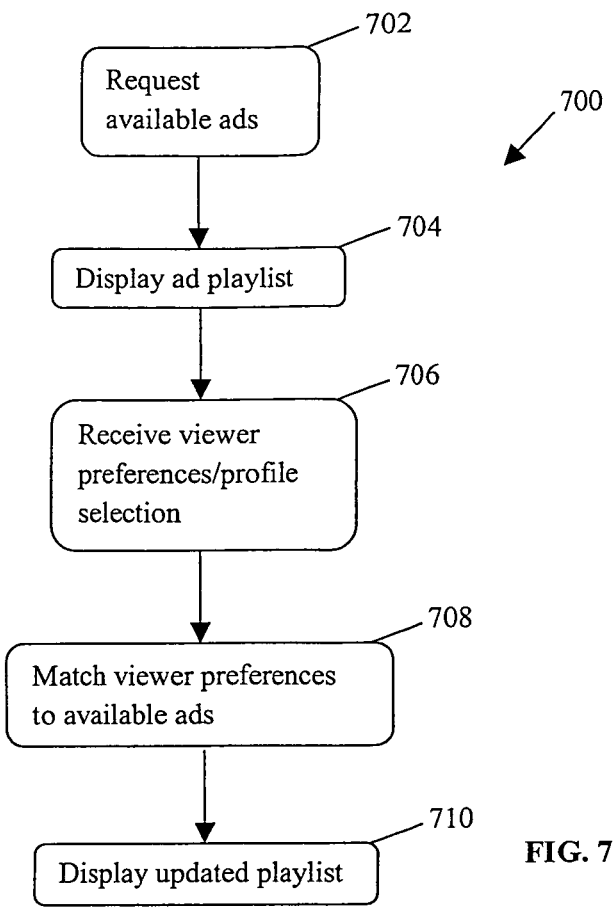
FIG. 7a is flow chart illustrating one embodiment of the generalized method by which the enhanced advertisement delivery controller (AC) generates an advertisement playlist.

FIG. 7a illustrates the general method 700 by which the AC generates the advertisement playlist. Per step 702, the AC requests from a designated source (e.g., headend or hub entity such as an advertising server, third party website, local advertisement repository stored on a DVR, etc.) a list of available advertisements. Next, the AC displays the list of available advertisements as a first advertisement playlist per step 704. In the embodiment presented, the AC subsequently receives one or more viewer-entered preferences and/or a selection of a user profile (with saved viewer preferences) per step 706. However, it will be appreciated that in other embodiments, no viewer preferences are received, or alternatively the viewer preferences are received prior to playlist generation; e.g., as part of a subscriber sign-up profile, subscriber demographic assessment (e.g., "estimated" preferences), or the like. In that case, the first advertisement playlist displayed in step 704 will be the only list generated.

At step 708, the AC next matches the one or more viewer-entered preferences with available advertisements, such as by performing a search of the metadata associated with those advertisements. Finally, an updated viewer-centric playlist of only those advertisements which match the viewer-entered preferences are displayed per step 710.

Figure 7B:
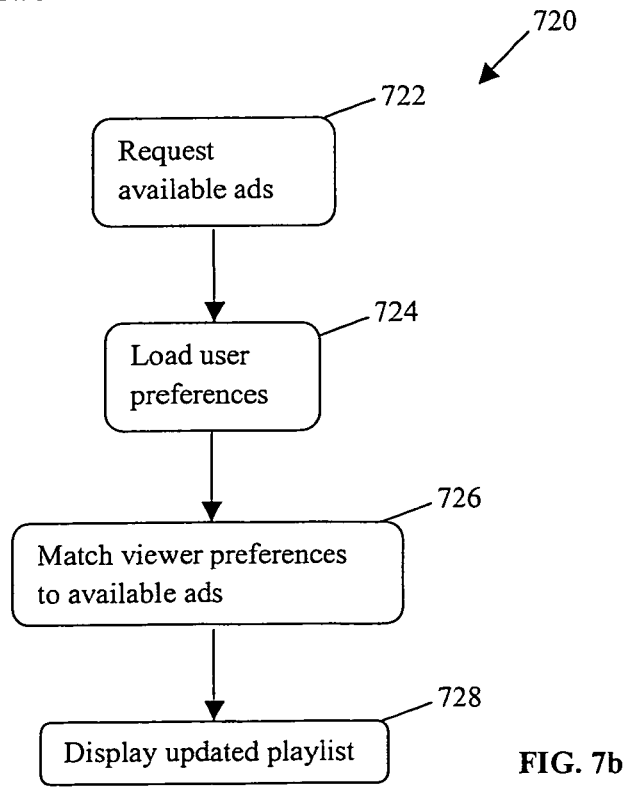
FIG. 7b is a flow chart illustrating an exemplary method of generating an advertisement playlist when a viewer has previously selected a user profile.

FIG. 7b illustrates an exemplary method 720 of generating an advertisement playlist when a viewer has previously selected a user profile. According to this method, the AC requests from a network entity or local repository a list of available advertisements per step 722. The AC then loads the user preferences associated with the user profile selected per step 724. The AC then matches the available advertisements to the preferences associated with the user profile at step 726. Finally, the AC displays a viewer-centric playlist of only those advertisements which match the user profile preferences per step 728.

The AC enabling the display of icons and/or descriptions in the advertisement playlist may be further adapted to incorporate highlighting mechanisms when the viewer's selector (e.g., mouse cursor, remote control selection window, etc.) is stationed on the graphical indicator for that advertisement. In one embodiment, the AC client portion 604 is adapted to increase the size and/or complexity of the image and/or text of an advertisement as a viewer's selector passes over it (e.g., "balloon" image or balloon text). In another embodiment, the placement of the selector over an advertisement indicator triggers the AC to enable an audible descriptor, such as a jingle or other related sound cue. In another embodiment, the AC is adapted to play a "teaser" advertisement or trailer upon the viewer's placement of the selector over an advertisement indicator. It is appreciated that the AC may utilize foregoing embodiments separately, or in concert with one another.

Advertising Insertion Apparatus and Methods—

In content-based networks such as cable television networks, advertisements (including without limitation promotions, commercials, and short segments) that are viewed by subscribers can be controlled in several ways. Generally, two categories or subdivisions of these techniques exist: (i) national- or high-level insertion, and (ii) local- or low-level insertion.

Under national level insertion, national networks (such as NBC, ABC, etc.) are responsible for determining the advertisements or promotions that are resident in a given program stream. The pre-configured stream is delivered to the network operator (e.g., MSO), and the MSO merely then delivers the stream (content and advertisements) to the relevant subscribers over their network.

Under local-level insertion, the MSO (and even broadcast affiliates) can insert locally-generated advertisements or commercials and other such segments into remotely distributed regional programs before they are delivered to the network subscribers.

In terms of technology, three primary variants of advertisement insertion technologies exist: (i) analog; (ii) hybrid analog/digital; and (iii) digital.

Under the analog approach, programs are distributed as NTSC video and include analog cues (tones) to the MSO that signal the local operator to replace the national-level advertisements with locally-generated ones. Insertion equipment includes so-called ad-splicers and storage devices which are typically maintained in the MSO headend or other location. These analog systems, however, have limited capability and do not support advanced functionality such as detecting a program change (e.g., situations where the advertisement lineup should or could be changed due to a change in the content broadcast schedule, such as where a championship sporting event runs into overtime). Moreover, analog systems make targeted/addressable advertising insertion difficult if not impossible.

Under the hybrid approach, advertisements are stored in a digitally compressed or encoded format, e.g., MPEG-2, in local storage. Both the source (network) feed to the headend and the subscriber delivery channel can be either analog or digital. If the network feed is analog, embedded cue-tones are used to cue retrieval and conversion of the digital advertisement to analog. An analog splicer switches input from the network feed to the converted local advertisement. When completed, the splicer switches the input back to the network feed. The analog output of the splicer is encoded to a digital format in the case that the delivery channel to the subscriber is digital. If the channel is digital, the analog output of the splicer is digitally encoded. If the network feed and subscriber delivery channel are both digital, both the program network feed and the advertisement are converted into analog prior to insertion of the advertisement. The analog content is then encoded back to digital before delivery to the subscriber. Unfortunately, the aforementioned conversion from digital to analog, and then back to digital, requires a high processing overhead and cost, and may significantly degrade video quality since the conversions are at least partly "lossy" in nature.

Under the fully digital approach, many of the aforementioned limitations are overcome. Several standards have been developed to implement such digital techniques, including SCTE 35 2001 (formerly DVS253), "Digital Program Insertion Cueing Message for Cable", and SCTE 30

2001 (formerly DVS380), "Digital Program Insertion Splicing API". These standards define splicing of MPEG-2 streams for digital content insertion (including advertisements), and create standardized communication protocols for the insertion of content into any MPEG-2 output multiplex in the splicer.

By keeping the process of local advertisement insertion completely within the digital compressed domain, as well as keeping this content in the compressed domain from the network operator to the subscribers, the quality of the network-supplied video and advertisements is maintained effectively intact.

Advantageously, the present invention can be used with any number of different advertising insertion or splicer architectures, whether analog, digital or hybrid in nature. See, for example, co-owned U.S. patent application Ser. No. 10/662,776 filed Sep. 15, 2003, entitled "SYSTEM AND METHOD FOR ADVERTISEMENT DELIVERY WITHIN A VIDEO TIME SHIFTING ARCHITECTURE", and issued as U.S. Pat. No. 8,214,256 on Jul. 3, 2012, which is incorporated by reference herein in its entirety, for exemplary advertising insertion and splicer apparatus and methods in the context of, e.g., networked digital video recorder (nDVR) or VoD delivery paradigms.

In one variant, advertising insertion is accomplished at the network level by routing the network feed through a splicer. The splicer may be used to create multiple output versions of the network feed for a current advertising zone structure (e.g., CNN_Boulder, CNN_Denver), or for different instantiations of BSA program streams. When an SCTE 35 cue enters the splicer on the network feed, the splicer generates a cue request to the advertising server management section (here, which includes the AC). The advertising server management section determines which advertisement or promotion to play based on various subscriber-driven selection criteria, as previously discussed. The advertising server management section then instructs the splicer to splice a content stream, and instructs a content server to play the selected advertisement or promotion at the designated time according to the schedule.

In the context of an exemplary nPVR (network personal video recorder) VoD architecture that implements splicing, the networks are run through a statistical multiplexer (stat-mux) splicer for two reasons: (i) by always splicing in a default advertisement, a "splice point" is inserted in the compressed MPEG stream and this makes it trivial to split the content at the correct point; and (ii) the stat-mux clamps or adjusts the input feed to VoD encoding standards. The networks are fed to the VoD server (optionally through a device that splits the content into chapters and advertisements). The VoD server treats the input stream as a file once ingested (and may or may not be stored depending on the current acquisition rules for the program).

When a user (or the server in advance of a user request) requires a stream, a "session" is first set up. The difference between this session and a normal unicast on-demand session is that this session is assigned a multicast IP. The multicast IP allows many edge QAMs to join the stream versus directing the stream directly to an edge QAM in unicast IP mode. This session basically is a minimal delay "StartOver" session, essentially passing the real-time network feed through the VoD server. When an SCTE 35 cue is seen on the RTA input section, an SCTE 30 cue is sent to the advertising controller (AC). As is well known, the AC can be implemented externally to the VoD server, or internally to the VoD server. If located internal to the VoD server, the SCTE 30 message is not needed.

The AC then selects an advertisement or promotion to play. In the case of the aforementioned BSA network (FIG. 1c) a DVS/629 or similar mechanism can be used to request a real-time match as to the best asset to play at this instant. This can be based e.g., on the viewer preferences, demographics, geographies, psychographics, or whatever other information is available on the user (or group of users) that this feed is being delivered to, as previously described herein. The AC then instructs the VoD server the name of the selected advertising or promotional content element to splice in. When the VoD server detects the appropriate splice point, timed by the SCTE 35 cue and the previously inserted default advertisement, it performs a playlist diversion between the RTA content and the selected content element. After the advertisement or promotion content finishes, the VoD server playlist diverts back to the RTA stream.

The techniques and apparatus described in U.S. patent application Ser. No. 11/974,700 filed Oct. 15, 2007, entitled "METHODS AND APPARATUS FOR REVENUE-OPTIMIZED DELIVERY OF CONTENT IN A NETWORK", and issued as U.S. Pat. No. 8,099,757 on Jan. 17, 2012, which is incorporated herein by reference in its entirety, may be used as well, so as to inter alia reduce RTA costs associated with advertising acquisition and delivery over the network(s).

Network Device—

Figure 8:
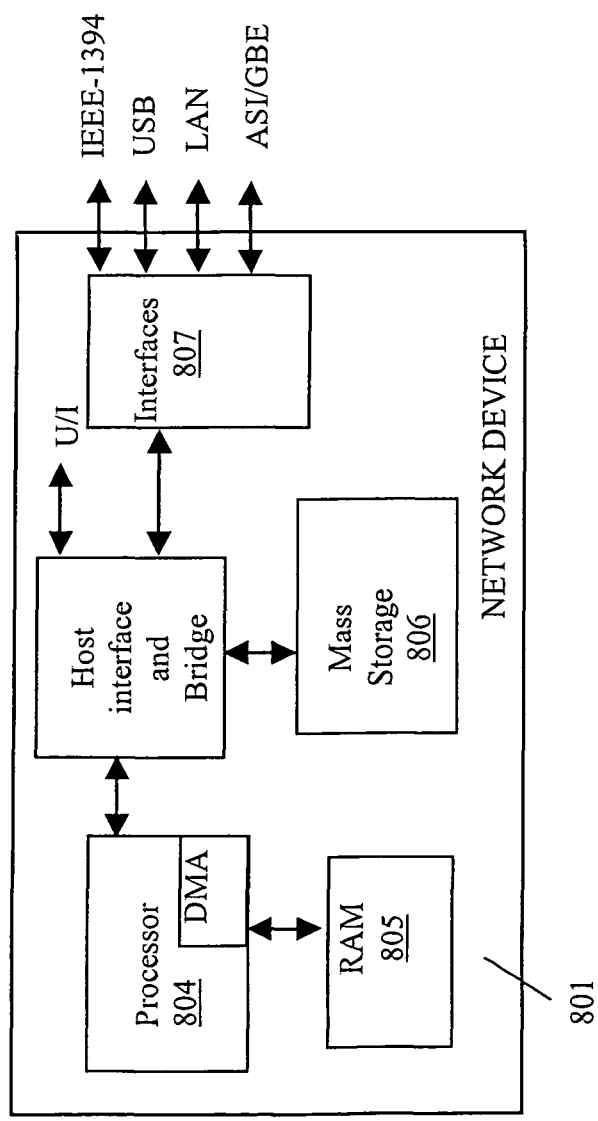
FIG. 8 is a functional block diagram illustrating an exemplary embodiment of a network device with advertisement evaluation and selection functionality according to the invention.

Referring now to FIG. 8, one embodiment of an improved network (e.g., control server) device with advertising controller (AC) capability according to the present invention is described. As shown in FIG. 8, the device 801 generally comprises and OpenCable-compliant network server or controller module adapted for use at the headend or hub site(s) of FIGS. 1-1c, although the server may comprise other types of devices (e.g., VoD or application servers, SRM or other supervisory processes, etc.) within the network as previously described.

The device 801 comprises a digital processor(s) 804, storage device 806, and a plurality of interfaces 807 for use with other network apparatus such as RF combiners, IP routers and other packet network devices, network management and provisioning systems, local PCs, etc. Other components which may be utilized within the network device 801 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the network device 801 and the CPE. The AC process software (e.g., the network portion 602 of s. 6A-6C) is also disposed to run on the server module 801, and can be configured to provide a functional interface with the client processes 604 on the network CPE 106 (where used), or other interposed or remote entities. These components and functionalities are well known to those of ordinary skill in the cable and embedded system fields, and accordingly not described further herein.

The device 801 of FIG. 8 may take any number of physical forms, comprising for example one of a plurality of discrete modules or cards within a larger network headend, edge or hub device of the type well known in the art. The server may also comprise firmware, either alone or in combination with other hardware/software components such as those previously described. Alternatively, the device 801 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The device 801 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the AC and AOS functionality described above may take the form of one or more computer programs (e.g., the network and client processes, 602, 604). Alternatively, such computer programs may have one or more components distributed across various hardware environments at the same or different locations, such as where the network process 602 is distributed across multiple platforms at the hub site and the headend 150 as shown in FIG. 6c herein.

As yet another example, portions of the functionality may be rendered as a dedicated or application specific IC having code running thereon. Myriad different configurations for practicing the invention will be recognized by those of ordinary skill in the network arts provided the present disclosure.

CPE—

Figure 9:
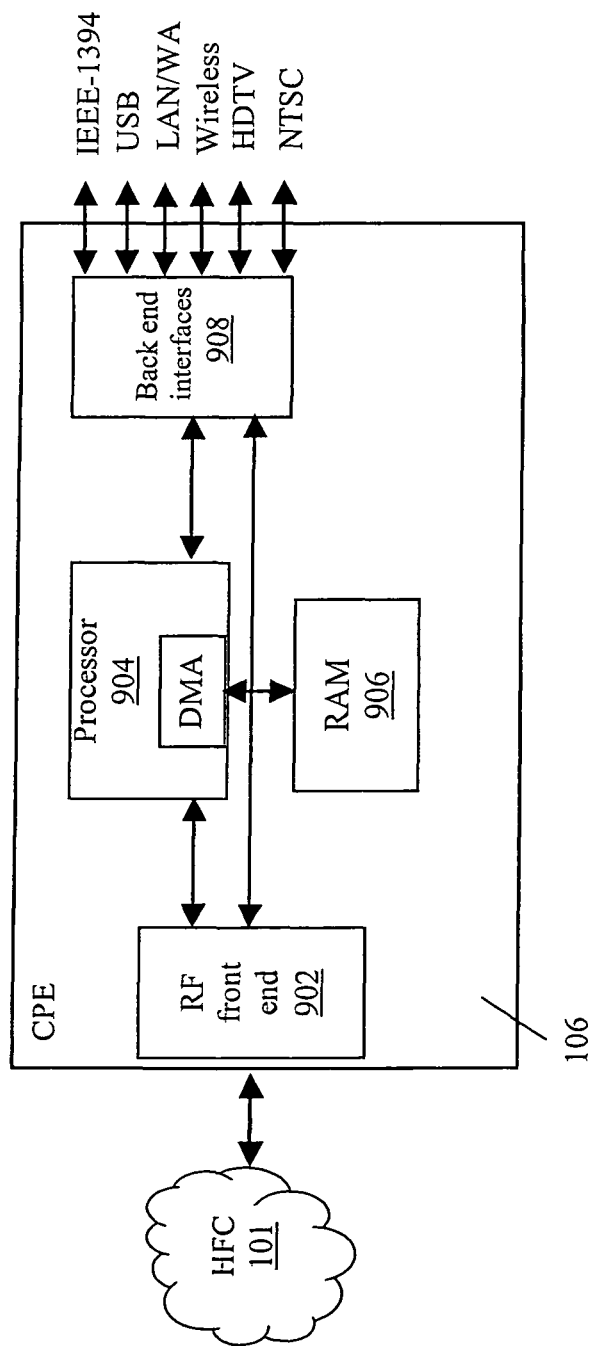
FIG. 9 is a functional block diagram illustrating an exemplary embodiment of CPE adapted to support advertisement evaluation and selection functionality.

FIG. 9 illustrates an exemplary embodiment of the improved CPE 106 according to the present invention. As shown in the simplified diagram of FIG. 9, the device 106 generally comprises and OpenCable (OCAP)-compliant embedded system having an RF front end 902 (including tuner and demodulator/decryptors) for interface with the HFC network 101 of FIGS. 1-1c, digital processor(s) 904, storage device 906, and a plurality of interfaces 908 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 9 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 9 is also provided with an OCAP 1.0-compliant application and Java-based middleware which, inter alia, manages the operation of the device and applications running thereon (including the client process 604 where used). It will be recognized by those of ordinary skill that myriad different device and software architectures may be used consistent with the functions of the present invention, the device of FIG. 9 being merely exemplary. For example, different middleware (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the client process 604 of the AC (see FIG. 6a-6c).

In another embodiment, the CPE 106 comprises a converged premises device, such as for example that described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

Moreover, the foregoing embodiments of the CPE 106 may utilize any number of other methods and apparatus in conjunction with the functionality previously described herein in order to further extend its capabilities. See, e.g., co-owned U.S. patent application Ser. No. 10/723,959 filed Nov. 24, 2003, entitled "METHODS AND APPARATUS FOR HARDWARE REGISTRATION IN A NETWORK DEVICE"; and issued as U.S. Pat. No. 8,302,111 on Oct. 30, 2012; U.S. patent application Ser. No. 10/773,664 filed Feb. 6, 2004, entitled "METHODS AND APPARATUS FOR DISPLAY ELEMENT MANAGEMENT IN AN INFORMATION NETWORK", and issued as U.S. Pat. No. 9,213,538 on Dec. 15, 2015; and U.S. patent application Ser. No. 10/782,680 filed Feb. 18, 2004, entitled "MEDIA EXTENSION APPARATUS AND METHODS FOR USE IN AN INFORMATION NETWORK", and issued as U.S. Pat. No. 8,078,669 on Dec. 13, 2011, each of the foregoing incorporated herein by reference in its entirety. Myriad other combinations and variations of the CPE 106 will also be recognized by those of ordinary skill given the present disclosure.

Business Methods and "Rules" Engine—

In another aspect of the invention, the aforementioned AC process 602, 604 (e.g., rendered as one or more computer programs) optionally includes an operations and/or business rules engine. This engine comprises, in an exemplary embodiment, a series of software routines running on the network device 801 of FIG. 8 or other associated hardware/firmware environment that are adapted to control the operation of the advertising evaluation and selection algorithms previously described. These rules may also be fully integrated within the AC process 602, 604 itself, and controlled via e.g., a GUI on a PC connected to the network device 801 or CPE 106. In effect, the rules engine comprises a supervisory entity which monitors and selectively controls, via the AC process 602 and/or CPE process 604, the advertising selection and display functions at a higher level, so as to implement desired operational or business rules.

The rules engine can be considered an overlay of sorts to the algorithms of the AC 602, 604 previously described. For example, the AC process 602 may invoke certain operational protocols or decision processes based on data received from the CPE 106 (e.g., historical activity data, subscriber preferences, etc.), as well as network operational or historical data, demographic data, geographic data, etc. However, these processes may not always be compatible with higher-level business or operational goals, such as maximizing profit on a network-wide basis (or after consideration of other factors not input to the AC evaluation and selection algorithms, such as advertising revenue, RTA acquisition costs, "costs" of delivering streams based on required bandwidth, taxes, maintenance or repair costs, additional equipment leasing or use costs, etc.), or system reliability and/or flexibility. Moreover, the AC may be operating on a per-CPE or per-request basis (i.e., evaluating each individual CPE effectively in isolation, and generating a decision or recommendation without considering larger patterns or decisions being made in the service group or network as a whole).

Hence, when imposed, the business/operational rules can be used to dynamically (or manually) control the operation of the AC process 602 (and/or client process 604), in conjunction with the advertising selections generated by the AC as part of its evaluation and selection functions previously described.

For example, one rule implemented by the rules engine may comprise selectively servicing (or at least queuing first) advertising requests from certain users first; e.g., those with a higher subscription priority or level under bandwidth-limited cases, and only after this tier of users is satisfied, servicing any remaining content requests. In one variant, subscribers are divided into tiers (a hierarchy), and certain tiers of the hierarchy are serviced to a prescribed level first. For instance, one rule might impose a requirement that all "premium" subscribers have their advertising and program requests serviced before lower-tier subscribers.

As another example, the failure of a network component, or loss of an advertising content source, might render certain options unachievable (or at least undesirable due to factors such as high cost burden, high delivery latency, poor video quality, etc.). Hence, the rules engine can in such cases be used to mask the affected options or inputs to the NOC algorithm during the affected periods of time.

It will also be appreciated that the AC may apply a cost/benefit analysis to advertising selections; e.g., when faced with two generally comparable advertising options for a given placement (which also meet the subscriber's criteria), the AC may apply a revenue or profit analysis to select one over the other so as to maximize revenue/profit for the MSO. In one embodiment, advertisers or even content providers (e.g., studios, networks, etc.) would pay a premium or provide other incentives to the MSO to have particular advertisements or content prioritized over others targeted to the same demographic. For example, where a targeted stream is instantiated, the MSO may program its rules engine to select the more lucrative of various advertiser's content (i.e., the one for which they receive greater payment or other consideration for using).

Similarly, a more incremental approach can be applied, such as where various advertisements or content are "graded" based on profit/revenue and/or operational considerations (i.e., those which earn most and/or give highest user satisfaction, etc. receive a higher grade), and the bitrate allocated based on such grade(s).

Similarly, an "impression" optimization policy or rule may be imposed, wherein all else being equal, a given advertisement with a higher impression rate (i.e., actual view by subscriber) is selected preferentially.

The AC selections and policies can also be manually or semi-manually utilized by network operators, such as in the form of a recommendation rather than a hard and fast decision point. For instance, the AC may present a recommended advertising election to a human operator, thereby letting the operator decide whether to implement it. This variant of the invention allows for the intangible but often important "gut feeling" or intrinsic knowledge of the operator to be factored into the decision process. The operator may also be able to identify trends or patterns in network operation that the AC or rules engine cannot, such as the topical popularity of a given advertisements or themes (e.g., reality-based television), in effect allowing the operator to override the AC when his/her knowledge or intuition says that a different course should be followed.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of providing advertising content to a plurality of users associated to a respective plurality of user devices in a content delivery network, said method comprising:
    receiving a plurality of requests to view primary content from said respective plurality of user devices, a triggering event being associated with said primary content;
    presenting to each of said plurality of users a list of a plurality of available advertisements for selection;
    providing to each of said plurality of users one or more selectable options for viewing and/or delivering said plurality of available advertisements;
    enabling each of said of plurality of users to select one or more of said plurality of available advertisements for viewing and/or delivering according to said one or more selectable options;
    when none of said one or more of said plurality of available advertisements is selected by said plurality of users within given time period, automatically adding one or more other ones of said plurality of available advertisements for viewing and/or delivering so as to fit within a duration of time before said primary content is set to begin, via evaluating metadata associated with at least one of said plurality of available advertisements with respect to information descriptive of said primary content;
    providing a multicast of said requested primary content to said plurality of user devices, said multicast comprising only said primary content without any secondary content inserted therein; and
    providing to individual ones of said plurality of user devices respective individual ones of said automatically added one or more other ones of said plurality of available advertisements according to said viewing and/or delivering options.

2. The method of claim 1, wherein said triggering event comprises a discontinuity or marker disposed within a real-time broadcast.

3. The method of claim 1, wherein said triggering event comprises beginning a period of prescribed duration within a real-time broadcast program.

4. The method of claim 1, wherein said triggering event comprises beginning or recommencing playback of a recorded program.

5. The method of claim 1, wherein said triggering event comprises fast-forwarding a recorded program at a certain point in said program.

6. The method of claim 1, wherein said plurality of available advertisements are identified by a computer program.

7. The method of claim 6, wherein said one or more of said plurality of available advertisements are selected for said presentation based at least in part on a determination of a length of at least one of said available advertisements.

8. The method of claim 1, wherein said information descriptive of said primary content comprises metadata associated with said primary content with which said one or more other ones of said plurality of available advertisements will be provided.

9. The method of claim 1, wherein said act of automatically adding one or more other ones of said plurality of available advertisements further comprises
evaluating said metadata with respect to user descriptive information.

10. The method of claim 1, wherein said act of automatically adding one or more other ones of said plurality of available advertisements further comprises:
enabling a user to enter one or more advertisement selection criteria;
comparing said metadata associated with said at least one of said plurality of available advertisements to said criteria; and
selecting a subset of said plurality of available advertisements based at least in part on said act of comparing.

11. The method of claim 1, wherein said act of providing comprises displaying said automatically added one or more other ones of said plurality of available advertisements temporally proximate with non-advertising program content at one or more prescribed insertion points within said content.

12. The method of claim 1, further comprising:
obtaining a user response to said automatically added advertisements;
accessing said metadata associated with said at least one of said plurality of available advertisements;
evaluating a correlation of said metadata with said user response; and
providing a selectable listing of available and correlated advertisements.

13. The method of claim 1, wherein said viewing and/or delivering options comprises sending said one or more selected advertisements or said automatically added one or more other ones of said plurality of available advertisements to an electronic mail account for viewing at a later time.

14. The method of claim 1, wherein said viewing and/or delivering options comprises saving said automatically added one or more other ones of said plurality of available advertisements to a storage device of a recording apparatus for viewing at a later time.

15. The method of claim 14, wherein said storage device comprises at least one of a hard disk drive (HDD) or NAND flash memory, and said recording apparatus comprises a digital video recorder (DVR).

16. A system for delivery of advertisements in a communications network, said system comprising:
a processing apparatus, said processing apparatus being adapted to process a real-time broadcast primary content stream to identify one or more markers disposed therein, said markers configured to indicate that one or more advertisements must be selected, and generate a list of available advertisements;
a user interface adapted to enable a viewer to select from two or more options, said two or more options being configured to allow said viewer to: (i) select one or more of said list of available advertisements and identify when during playback of said real-time broadcast primary content said selected one or more advertisements will be viewed, and (ii) select that one or more of said list of available advertisements be delivered to said viewer at a time after said playback of said real-time broadcast primary content;
a mechanism adapted to allocate a carrier to deliver advertisement content for said selected one or more advertisements; and
a receiving apparatus, said receiving apparatus adapted to receive said advertisement content.

17. The system of claim 16, wherein said processing apparatus comprises a cable television network headend or switching hub server.

18. The system of claim 16, wherein said processing apparatus is located on a consumer premises device, and said receiving apparatus comprises a hard disk drive of said consumer premises device.

19. The system of claim 16, wherein said receiving apparatus comprises a display apparatus.

20. The system of claim 16, wherein said receiving apparatus comprises an e-mail server.

21. A method of providing primary and secondary content to a plurality of users in a content delivery network, said method comprising:
receiving a request to view primary content from a user device;
in response to said request, identifying a plurality of secondary content, said secondary content being identified based at least in part on a relationship of a context thereof to one or more attributes of a user associated with said user device;
causing at least information relating to said identified plurality of secondary content to be stored at a storage entity associated with said user device;
upon a user's instantiation of a trick mode functionality at said user device, prompting said user with a plurality of options, said plurality of options comprising: (i) selecting one or more items of said identified plurality of secondary content and selecting one or more display and/or delivery options, and (ii) selecting none of said one or more items of said identified plurality of secondary content; and
causing display and/or delivery of said selected ones of said one or more items of said identified plurality of secondary content according to said selected one or more display and/or delivery options.

22. The method of claim 21, wherein said causing at least information relating to said one or more items of said identified plurality of secondary content to be stored comprises storing said one or more items of said identified plurality of secondary content at said storage entity.

23. The method of claim 21, wherein said enabling said user to select one or more items of said identified plurality of secondary content comprises enabling said user to make said selection via said stored information.

24. The method of claim 21, wherein said act of causing display and/or delivery of said selected ones of said one or more items of said identified plurality of secondary content comprises retrieving said secondary content from said storage device.

25. The method of claim 21, wherein said act of causing display and/or delivery of said selected ones of said one or more items of said identified plurality of secondary content comprises retrieving said secondary content from a remote network storage entity.

26. The method of claim 25, wherein said retrieving said selected ones of said one or more of said identified plurality of secondary content from a remote network storage entity comprises providing at least a portion of said stored information to said network storage entity.

27. The method of claim 21, wherein said user device is configured to upon said user's instantiation of said trick mode functionality, halt display and/or delivery of said primary content and cause display and/or delivery of said selected one or more items of said identified plurality of secondary content.

28. The method of claim 21, further comprising receiving one or more requests to view said primary content from one or more second user devices, and creating a multicast of said primary content without any secondary content inserted therein for delivery to said user device and said one or more second user devices.

29. Computerized apparatus for providing advertising content to a user device associated with a content delivery network, said apparatus comprising:
  a processor;
  a data interface in data communication with said processor; and
  a storage device in data communication with said processor and comprising at least one computer program, said at least one computer program comprising logic configured to, when executed:
  receive via said data interface a request to view primary content initiated from said user device;
  cause presentation via said user device of a list of a plurality of available advertisements for selection;
  cause provision via said user device a selectable option for delivery of said plurality of available advertisements other than presentation with said primary content, thereby enabling selection of one or more of said plurality of available advertisements for delivery according to said selectable option;
  when one or more of said plurality of available advertisements is selected via said user device within a given time period, cause delivery of said one or more selected advertisements via said selectable option; or
  when none of said plurality of available advertisements is selected via said user device within said given time period, automatically add one or more other advertisements for delivery, said automatically added one or more other advertisements selected so as to fit within a duration of time before said primary content is set to begin, said selection based at least on an evaluation of metadata associated with said one or more other advertisements with respect to information descriptive of said primary content;
    cause provision to said user device of said automatically added one or more other advertisements during said duration of time; and
  cause provision of a multicast of said primary content to said user device, said multicast comprising only said primary content;
  wherein said selectable option comprises delivery via e-mail.

* * * * *